(12) United States Patent
Noguchi et al.

(10) Patent No.: US 7,499,121 B2
(45) Date of Patent: Mar. 3, 2009

(54) DISPLAY CAPABLE OF INHIBITING INSTABLE OPERATION OF A TRANSITOR RESULTING FROM FLUCTUATION OF THE POTENTIAL OF A CORRESPONDING SHIELDING FILM

(75) Inventors: Yukihiro Noguchi, Gifu (JP); Shoichiro Matsumoto, Ogaki (JP); Naoya Sotani, Kobe (JP); Daisuke Ide, Kobe (JP); Yasutaka Kobayashi, Gifu (JP); Yoshiyuki Ishizuka, Inazawa (JP); Isao Hasegawa, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 441 days.

(21) Appl. No.: 11/314,955

(22) Filed: Dec. 22, 2005

(65) Prior Publication Data
US 2006/0250592 A1    Nov. 9, 2006

(30) Foreign Application Priority Data
Dec. 24, 2004  (JP)  ............................. 2004-372448
Dec. 20, 2005  (JP)  ............................. 2005-365699

(51) Int. Cl.
G02F 1/136   (2006.01)
G02F 1/1333  (2006.01)

(52) U.S. Cl. .......................... 349/44; 349/110; 349/111

(58) Field of Classification Search .................. 349/44, 349/110, 111
See application file for complete search history.

(56) References Cited

U.S. PATENT DOCUMENTS

| 5,605,847 | A  | * | 2/1997 | Zhang ......................... 438/164 |
| 6,665,024 | B2 | * | 12/2003 | Kurashina ..................... 349/39 |
| 6,750,476 | B2 | * | 6/2004 | Katayama ..................... 257/59 |
| 6,838,697 | B2 | * | 1/2005 | Murade ....................... 257/59 |
| 7,112,514 | B2 | * | 9/2006 | Yasukawa .................... 438/459 |
| 7,330,222 | B2 | * | 2/2008 | Shiraki et al. ................. 349/54 |
| 2001/0019130 | A1 | * | 9/2001 | Yamazaki et al. ............. 257/72 |
| 2002/0008240 | A1 | * | 1/2002 | Hirabayashi et al. .......... 257/74 |

FOREIGN PATENT DOCUMENTS

| JP | 10-189999 | 7/1998 |
| JP | 10189999 A * | 7/1998 |
| JP | 10268342 A * | 10/1998 |

* cited by examiner

*Primary Examiner*—Mike Qi
(74) *Attorney, Agent, or Firm*—McDermott Will & Emery LLP

(57) ABSTRACT

A display capable of inhibiting a transistor from an instable operation resulting from fluctuation of the potential of a shielding film and suppressing occurrence of a malfunction is provided. This display comprises a first region including a first transistor, a first shielding film provided on the first region, arranged on a region corresponding to the first transistor and supplied with a first potential, a second region including a second transistor and a second shielding film provided on the second region, arranged on a region corresponding to the second transistor and supplied with a second potential.

11 Claims, 25 Drawing Sheets

DISPLAY CAPABLE OF INHIBITING INSTABLE OPERATION OF A TRANSITOR RESULTING FROM FLUCTUATION OF THE POTENTIAL OF A CORRESPONDING SHIELDING FILM

BACKGROUND OF THE INVENTION

1. Field of the Invention

The present invention relates to a display, and more particularly, it relates to a display including transistors.

2. Description of the Background Art

A display including transistors such as a liquid crystal display or an organic EL display is known in general. In this conventional display, transistors are provided on a pixel part as well as a peripheral circuit part arranged around the pixel part respectively. When external light or light from a backlight constituting the display is incident upon the transistors, the incident light may excite carriers in active layers of the transistors. In this case, current disadvantageously flows between the sources and the drains of the transistors due to the excited carriers also when the display holds the transistors in OFF-states. A display preventing incidence of light upon transistors of a pixel part and a peripheral circuit part by providing shielding films to cover the transistors for solving this problem is known in general, as disclosed in Japanese Patent Laying-Open No. 10-189999 (1998), for example. In this display, the shielding films covering the transistors unintentionally function as gate electrodes, to result in fluctuation of the threshold voltages of the transistors upon fluctuation of the potentials of the shielding films. This disadvantageously leads to instable operations of the transistors. Therefore, the display disclosed in the aforementioned Japanese Patent Laying-Open No. 10-189999 fixes the potentials of the shielding films to the ground potential, in order to suppress this disadvantage.

When the display disclosed in the aforementioned Japanese Patent Laying-Open No. 10-189999 supplies different signal potentials to the drain regions of the transistors provided on the pixel part and the peripheral circuit part respectively, the potentials of the channel regions of the transistors provided on the pixel part and the peripheral circuit part respectively may fluctuate to different levels due to electric fields resulting from the signal potentials applied to the drain regions also when the transistors are in OFF-states. If the display applies the common ground potential to the shielding films corresponding to all transistors provided on the pixel part and the peripheral circuit part respectively, the difference between the ground potential of the shielding film and the potential of the channel region of the corresponding transistor provided on the pixel part and that between the ground potential of the shielding film and the potential of the channel region of the corresponding transistor provided on the peripheral circuit part differ from each other, and hence either the difference between the ground potential of the shielding film and the potential of the channel region of the corresponding transistor provided on the pixel part or that between the ground potential of the shielding film and the potential of the channel region of the corresponding transistor provided on the peripheral circuit part may exceed the threshold voltage of the corresponding transistor. In this case, the transistor may enter an ON-state due to the ground potential supplied to the corresponding shielding film also when the display holds the transistor in an OFF-state. Consequently, the display may disadvantageously cause a malfunction.

SUMMARY OF THE INVENTION

The present invention has been proposed in order to solve the aforementioned problem, and an object of the present invention is to provide a display capable of inhibiting a transistor from an instable operation resulting from fluctuation of the potential of a corresponding shielding film and suppressing occurrence of a malfunction.

In order to attain the aforementioned object, a display according to an aspect of the present invention comprises a first region having a prescribed function and including a first transistor, a first shielding film provided on the first region, arranged on a region corresponding to the first transistor and supplied with a first potential, a second region having a prescribed function and including a second transistor and a second shielding film provided on the second region, arranged on a region corresponding to the second transistor and supplied with a second potential.

The display according to this aspect can fix the first and second shielding films to the first and second potentials respectively by supplying the first and second potentials to the first and second shielding films arranged on the regions corresponding to the first and second transistors respectively, as hereinabove described. Thus, the potentials of the first and second shielding films remain unfluctuant, whereby the display can inhibit the threshold voltages of the first and second transistors from fluctuating following fluctuation of the potentials of the first and second shielding films. Therefore, the display can stabilize operations of the first and second transistors respectively. Further, the display can individually supply potentials to the first and second shielding films provided on the first and second regions having the prescribed functions respectively by supplying the first and second potentials to the first and second shielding films provided on the first and second regions respectively. Thus, when the potentials of the channel regions of the first and second transistors included in the first and second regions respectively reach different values due to different potentials applied to the drain regions of the first and second transistors in OFF-states of the first and second transistors, for example, the display can prevent the potential difference between the first shielding film and the channel region of the first transistor from exceeding the threshold voltage of the first transistor by adjusting the first potential supplied to the first shielding film in response to the potential of the channel region of the first transistor. Further, the display can prevent the potential difference between the second shielding film and the channel region of the second transistor from exceeding the threshold voltage of the second transistor by adjusting the second potential supplied to the second shielding film in response to the potential of the channel region of the second transistor. Therefore, the display can inhibit the first and second transistors from entering ON-states from OFF-states also when supplying the first and second potentials to the first and second shielding films respectively, thereby suppressing a malfunction. Further, the display is provided with the first and second shielding films supplied with the first and second potentials on the first and second regions having the prescribed functions respectively, whereby the number of wires for supplying the potentials to the shielding films etc. can be reduced as compared with a case of providing a shielding film every transistor and individually supplying a prescribed potential every shielding film, and hence the space of the display can be kept unincreased. Thus, the display can be inhibited from size increase.

In the display according to the aforementioned aspect, the first region including the first transistor preferably includes a first circuit part having the prescribed function, and the second region including the second transistor preferably includes a second circuit part having the prescribed function. According to this structure, the display having the first and second transistors provided on the first and second circuit parts having the prescribed functions respectively can easily individually supply potentials to the first and second shielding films provided on the first and second circuit parts having the prescribed functions respectively.

In this case, the first circuit part preferably includes a pixel part having the first transistor, the second circuit part preferably includes a peripheral circuit part, provided around a display part including the pixel part, having the second transistor, the first shielding film preferably includes a pixel part shielding film arranged under the first transistor included in the pixel part, and the second shielding film preferably includes a peripheral circuit part shielding film arranged under the second transistor included in the peripheral circuit part. According to this structure, the display can prevent the potential difference between the pixel part shielding film and the channel region of the first transistor from exceeding the threshold voltage of the first transistor by adjusting the first potential supplied to the pixel part shielding film in response to the potential of the channel region of the first transistor when the potentials of the channel regions of the first and second transistors included in the pixel part and the peripheral circuit part respectively reach different values due to different potentials applied to the drain regions of the first and second transistors respectively in OFF-states of the first and second transistors, for example. Further, the display can prevent the potential difference between the peripheral circuit part shielding film and the channel region of the second transistor from exceeding the threshold voltage of the second transistor by adjusting the second potential supplied to the peripheral circuit part shielding film in response to the potential of the channel region of the second transistor. Thus, the display can inhibit the first and second transistors from entering ON-states from OFF-states also when supplying the first and second potentials to the pixel part shielding film and the peripheral circuit part shielding film in the pixel part and the peripheral circuit part respectively.

In the aforementioned structure including the pixel part shielding film, the first potential supplied to the pixel part shielding film may be identical to a potential applied to the gate electrode of the corresponding first transistor. According to this structure, the first potential applied to the pixel part shielding film reaches a level for turning off the first transistor when the display applies a prescribed potential for turning off the first transistor to the gate electrode of the first transistor. Thus, the display can inhibit the first transistor from entering an ON-state due to the first potential supplied to the pixel part shielding film when holding the first transistor of the pixel part in an OFF-state by applying the aforementioned prescribed potential to the gate electrode. Further, the pixel part shielding film can also function as the gate electrode of the first transistor due to the application of the first potential of the same level as the potential applied to the gate electrode of the corresponding first transistor, whereby the display can drive the first transistor through both of the gate electrode of the first transistor and the pixel part shielding film. Thus, the display can improve drivability of the first transistor.

In this case, the pixel part shielding film is preferably electrically connected to the gate electrode of the first transistor. According to this structure, the display can easily apply the potential of the same level as the potential applied to the gate electrode of the corresponding first transistor to the pixel part shielding film.

In the aforementioned structure including the pixel part shielding film, the first potential supplied to the pixel part shielding film may be identical to a potential applied to either the source region or the drain region of the corresponding first transistor. According to this structure, the potential of the channel region of the first transistor reaches a level corresponding to the potential applied to either the source region or the drain region in the voltage range allowing change of the potential applied to either the source region or the drain region. Thus, the display can control the potential difference between the pixel part shielding film and the channel region of the first transistor in a prescribed voltage range by applying the first potential of the same level as the potential applied to either the source region or the drain region of the first transistor to the pixel part shielding film. When controlling the potential difference between the pixel part shielding film and the channel region of the first transistor in the voltage range of the OFF-region of the first transistor, therefore, the display can easily inhibit the first transistor of the pixel part from entering an ON-state from an OFF-state due to the application of the first potential to the pixel part shielding film.

In this case, the pixel part shielding film is preferably electrically connected to either the source region or the drain region of the first transistor. According to this structure, the display can easily apply the same potential as that applied to either the source region or the drain region of the first transistor to the pixel part shielding film.

In the aforementioned structure having the first circuit part including the pixel part, the pixel part preferably includes a p-channel transistor, and the first potential supplied to the pixel part shielding film arranged under the p-channel transistor of the pixel part is preferably a positive potential applied to the drain region of the p-channel transistor. According to this structure, the potential of the channel region of the p-channel transistor reaches a level in a prescribed range corresponding to the positive potential of the drain region. Thus, the display can control the potential difference between the pixel part shielding film and the channel region of the p-channel transistor in a prescribed voltage range by applying the first potential of the same level as the positive potential applied to the drain region of the p-channel transistor to the pixel part shielding film. When controlling the potential difference between the pixel part shielding film and the channel region of the p-channel transistor in the voltage range of the OFF-region of the p-channel transistor, therefore, the display can easily inhibit the p-channel transistor of the pixel part from entering an ON-state from an OFF-state due to application of the first potential (positive potential) to the pixel part shielding film.

In the aforementioned structure having the first circuit part including the pixel part, the pixel part preferably includes a plurality of first transistors, at least one of the plurality of first transistors of the pixel part preferably functions as a switching element, and the pixel part shielding film is preferably arranged to cover a lower portion of at least the first transistor functioning as the switching element. According to this structure, the display can suppress complication in arrangement of a wire for supplying the potential to the pixel part shielding film by arranging the pixel part shielding film to cover only the lower portion of the first transistor functioning as a switching element, for example, as compared with a case of separately arranging pixel part shielding films under the first transistor functioning as a switching element and another first transistor not functioning as a switching element respectively.

Further, the first transistor functioning as a switching element controls supply of a video signal to the pixel part, whereby the display can suppress occurrence of such inconvenience that the signal potential of the video signal supplied to the pixel part changes due to leakage current resulting from photoirradiation by arranging the pixel part shielding film under the first transistor functioning as a switching element. Also when the crystallinity of a crystal layer formed as an active layer of the first transistor functioning as a switching element is reduced due to reflection of a laser beam employed for crystallizing the crystal layer on the pixel part shielding film, reduction of the characteristics of the first transistor functioning as a switching element can be suppressed since the characteristics of the first transistor functioning as a switching element hardly depend on the crystallinity of the crystal layer (active layer). When arranging the pixel part shielding film to cover only the lower portion of the first transistor functioning as a switching element, therefore, the display can suppress display of images in a gradation other than that responsive to the signal potential of a video signal while suppressing complication in arrangement of a wire for supplying the potential to the pixel part shielding film.

In the aforementioned structure having the first circuit part including the pixel part, the first circuit part preferably includes a plurality of pixel parts each having the first transistor, and a single pixel part shielding film preferably covers lower portions of the first transistors of the plurality of pixel parts respectively. According to this structure, the number of elements such as a wire supplying the potential to the pixel part shielding film can be reduced as compared with a case of providing pixel part shielding films in one-to-one correspondence to the plurality of first transistors in the first circuit part and individually supplying prescribed potentials to the plurality of pixel part shielding films. Thus, size increase of the first circuit part can be suppressed due to the small number of the elements such as the wire, whereby size increase of the display can be suppressed.

In the aforementioned structure having the second circuit part including the peripheral circuit part, the peripheral circuit part preferably includes at least a p-channel transistor, and the peripheral circuit part shielding film is preferably arranged under at least the p-channel transistor. According to this structure, the display can suppress complication of a wire for supplying the potential to the peripheral circuit part shielding film by arranging the peripheral circuit part shielding film to cover only the lower portion of the p-channel transistor when the peripheral circuit part includes an n-channel transistor and the p-channel transistor, for example, as compared with a case of separately arranging peripheral circuit part shielding films under the n-channel transistor and the p-channel transistor respectively. In general, an n-channel transistor having larger carrier mobility than a p-channel transistor is formed to have a smaller gate width than the p-channel transistor. Thus, the n-channel transistor hardly causes a malfunction resulting from incidence of light upon its active layer, due to the small gate width thereof. Therefore, operations of the peripheral circuit part are hardly destabilized also when the peripheral circuit part shielding film is not arranged under the n-channel transistor. When arranging the peripheral circuit shielding film to cover only the lower portion of the p-channel transistor, therefore, the display can suppress instable operations of the peripheral circuit part while suppressing complication in arrangement of a wire for supplying the potential to the peripheral circuit part shielding film.

In this case, the peripheral circuit part preferably includes an n-channel transistor in addition to the p-channel transistor, and the peripheral circuit part shielding film is preferably arranged under the n-channel transistor and the p-channel transistor. According to this structure, the display can suppress instable operations of both of the n- and p-channel transistors of the peripheral circuit part.

The display according to the aforementioned aspect preferably further comprises a first gate insulating film of the first transistor having a first thickness, a first insulating film, provided between the first transistor and the first shielding film, having a second thickness of at least three times the first thickness of the first gate insulating film, a second gate insulating film of the second transistor having a third thickness and a second insulating film, provided between the second transistor and the second shielding film, having a fourth thickness of at least three times the third thickness of the second gate insulating film. According to this structure, the first insulating film (second insulating film) functioning as a gate insulating film has a large thickness when the first shielding film (second shielding film) unintentionally functions as a gate electrode, whereby the channel region of the first transistor (second transistor) is hardly influenced by the potential of the first shielding film (second shielding film) when the display applies the first potential (second potential) to the first shielding film (second shielding film). In this case, an effective voltage supplied to the channel region of the first transistor (second transistor) due to the first potential (second potential) applied to the first shielding film (second shielding film) is substantially ⅓ of a voltage supplied to the channel region when the display applies a potential of the same level as the first potential (second potential) to the gate electrode of the first transistor (second transistor). Thus, the display can reduce change of the threshold voltage of the first transistor (second transistor) resulting from the first potential (second potential) applied to the first shielding film (second shielding film).

In this case, the first gate insulating film and the first insulating film are preferably made of the same material, and the second gate insulating film and the second insulating film are preferably made of the same material. According to this structure, the display can easily set the effective voltage supplied to the channel region of the first transistor (second transistor) due to the first potential (second potential) applied to the first shielding film (second shielding film) substantially to ⅓ of the voltage supplied to the channel region when applying the same potential as the first potential (second potential) to the gate electrode of the first transistor (second transistor).

In the display according to the aforementioned aspect, the first potential is preferably an intermediate potential between a positive potential and a negative potential supplied to the gate electrode of the first transistor, and the second potential is preferably an intermediate potential between a positive potential and a negative potential supplied to the gate electrode of the second transistor. The aforementioned positive and negative potentials denote high and low potentials applied to a signal line respectively. The aforementioned intermediate potentials also include substantially intermediate potentials between the positive and negative potentials. According to this structure, the display can easily control the potential difference between the first shielding film supplied with the first potential and the channel region of the first transistor in the voltage range of the OFF-region of the first transistor while controlling the potential difference between the second shielding film receiving the second potential and the channel region of the second transistor in the voltage range of the OFF-region of the second transistor whether the first and second transistors are p-channel transistors or n-channel transistors. Thus, the display can inhibit the first and second transistors from entering ON-states from OFF-states whether the first and second transistors are p-channel transistors or n-channel transistors. Further, the display can easily generate the first and second potentials through the positive and negative potentials supplied to the gate electrodes of the first and second transistors respectively by setting the first and second potentials to substantially intermediate potentials between the positive and negative potentials supplied to the gate electrodes of the first and second transistors respectively.

In this case, the display preferably further comprises a potential generation circuit part for generating the intermediate potentials between the positive potentials and the negative potentials. According to this structure, the display can easily generate the intermediate potentials between the positive potentials and the negative potentials with the potential generation circuit.

In the aforementioned structure having the first potential of the intermediate potential between the positive and negative potentials supplied to the gate electrode of the first transistor and the second potential of the intermediate potential between the positive and negative potentials supplied to the gate electrode of the second transistor, at least either the first region or the second region includes both of an n-channel transistor and a p-channel transistor. According to this structure, the display can easily control the potential difference between the first shielding film and the channel region of the n-channel transistor in the voltage range of the OFF-region of the n-channel transistor while controlling the potential difference between the first shielding film and the channel region of the p-channel transistor in the voltage range of the OFF-region of the p-channel transistor by applying the intermediate potential between the positive and negative potentials supplied to the gate electrode of the n-channel transistor (p-channel transistor) of the first region to the first shielding film arranged under the n-channel transistor and the p-channel transistor of the first region when the first region includes both of the n- and p-channel transistors. When the second region includes both of the n- and p-channel transistors, the display can easily control the potential difference between the second shielding film and the channel region of the n-channel transistor in the voltage range of the OFF-region of the n-channel transistor while controlling the potential difference between the second shielding film and the channel region of the p-channel transistor in the voltage range of the OFF-region of the p-channel transistor by applying the intermediate potential between the positive and negative potentials supplied to the gate electrode of the n-channel transistor (p-channel transistor) of the second region to the second shielding film arranged under the n- and p-channel transistors of the second region.

In the display according to the aforementioned aspect, the first region including the first transistor and the second region including the second transistor may be provided on a pixel part, the first shielding film may be arranged under the first transistor included in the first region of the pixel part, and the second shielding film may be arranged under the second transistor included in the second region of the pixel part. According to this structure, the display can prevent the potential difference between the first shielding film and the channel region of the first transistor from exceeding the threshold voltage of the first transistor by adjusting the first potential supplied to the first shielding film in response to the potential of the channel region of the first transistor when the potentials of the channel regions of the first and second transistors included in the pixel part differ from each other due to different potentials applied to the drain regions of the first and second transistors respectively in OFF-states of the first and second transistors, for example. Further, the display can prevent the potential difference between the second shielding film and the channel region of the second transistor from exceeding the threshold voltage of the second transistor by adjusting the second potential supplied to the second shielding film in response to the potential of the channel region of the second transistor. Thus, the display can inhibit the first and second transistors from entering ON-states from OFF-states when supplying the first and second potentials to the first and second shielding films respectively in the pixel part.

In this case, the first transistor of the first region and the second transistor of the second region preferably have different conductive types. According to this structure, the display can prevent the potential difference between the first shielding film and the channel region of the first transistor from exceeding the threshold voltage of the first transistor by adjusting the first potential supplied to the first shielding film in response to the potential of the channel region of the first transistor when the pixel part includes the first and second transistors having different conductive types. Further, the display can prevent the potential difference between the second shielding film and the channel region of the second transistor from exceeding the threshold voltage of the second transistor by adjusting the second potential supplied to the second shielding film in response to the potential of the channel region of the second transistor.

In the display according to the aforementioned aspect, the first region may include a pixel part having the first transistor and a first peripheral circuit part having the first transistor, the second region may include a second peripheral circuit part having the second transistor, the first shielding film may be arranged under the first transistor included in the pixel part and the first transistor included in the first peripheral circuit part, and the second shielding film may be arranged under the second transistor included in the second peripheral circuit part. According to this structure, the display can prevent the potential difference between the first shielding film and the channel region of the first transistor from exceeding the threshold voltage of the first transistor by adjusting the first potential supplied to the first shielding film in response to the potential of the channel region of the first transistor when the potential of the channel region of the first transistor included in the pixel part and the first peripheral circuit part and the potential of the channel region of the second transistor included in the second peripheral circuit part differ from each other due to different potentials applied to the drain regions of the first and second transistors respectively in OFF-states of the first and second transistors, for example. Further, the display can prevent the potential difference between the second shielding film and the channel region of the second transistor from exceeding the threshold voltage of the second transistor by adjusting the second potential supplied to the second shielding part in response to the potential of the channel region of the second transistor. Thus, the display can inhibit the first and second transistors from entering ON-states from OFF-states when supplying the first and second potentials to the first and second shielding films in the pixel part and the first and second peripheral circuit parts respectively.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

The structure of a liquid crystal display according to a first embodiment of the present invention is described with reference to FIGS. 1 to 3.

Figure 1:
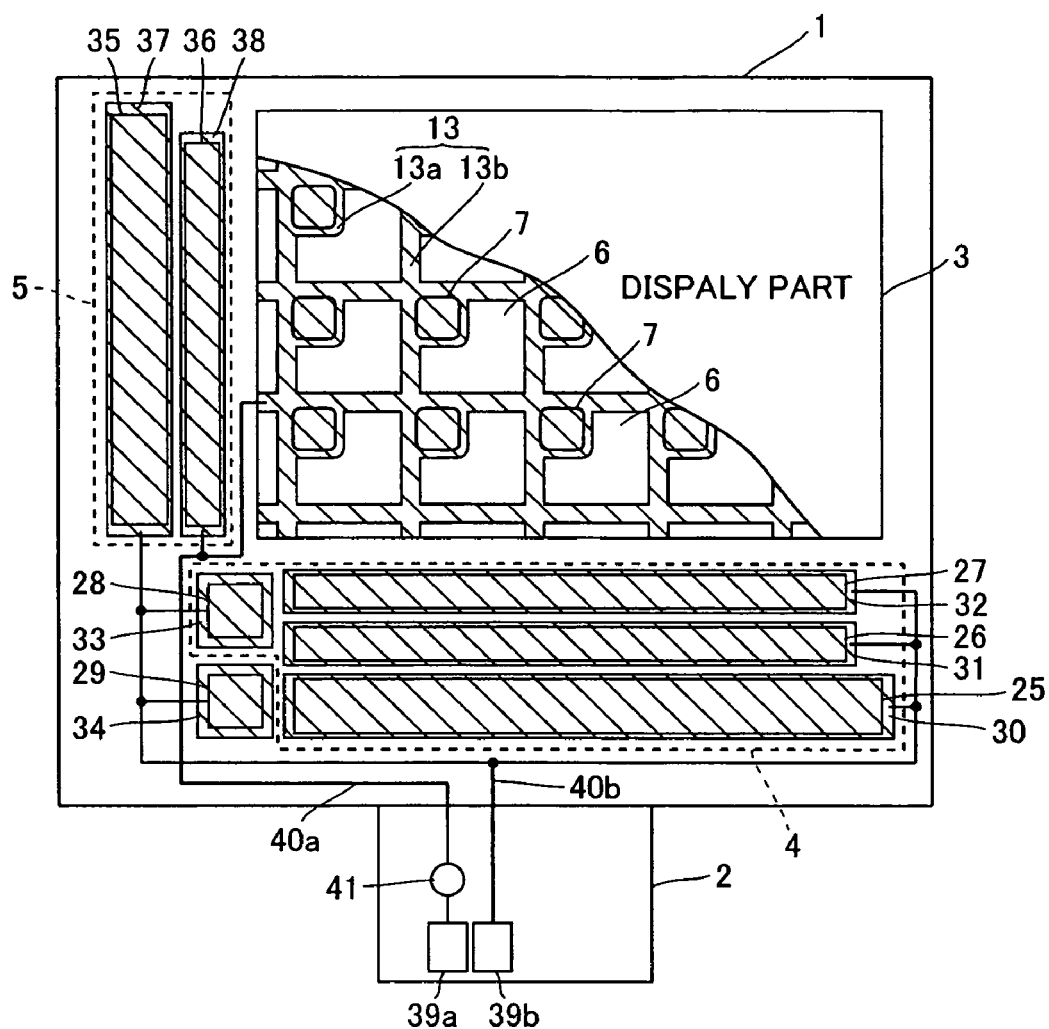
FIG. 1 is a plan view schematically showing the overall structure of a liquid crystal display according to a first embodiment of the present invention.
Figure 2:
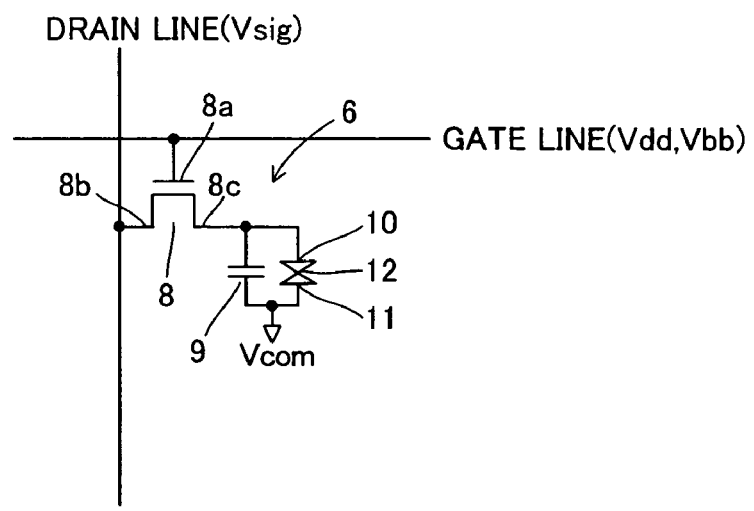
FIG. 2 is a circuit diagram of each pixel part of the liquid crystal display according to the first embodiment shown in FIG. 1.

As shown in FIG. 1, the liquid crystal display according to the first embodiment comprises a liquid crystal display panel 1 and an external circuit part 2 mounted on the liquid crystal display panel 1. The liquid crystal display panel 1 includes a display part 3 and H and V drivers 4 and 5 provided around the display part 3. A plurality of pixel parts 6 are arranged on the display part 3 in the form of a matrix. A switching element part 7 having an n-channel transistor 8 arranged thereon for serving as a switching element is provided is provided on each pixel part 6. As shown in FIG. 2, each pixel part 6 includes an auxiliary capacitor 9, a pixel electrode 10, a counter electrode 11 common to each pixel part 6 opposed to the pixel electrode 10 and a liquid crystal 12 arranged between the pixel electrode 10 and the counter electrode 11. The pixel part 6 is an example of the "first region" or the "first circuit part" in the present invention, and the n-channel transistor 8 is an example of the "first transistor" in the present invention.

A gate line is connected to a gate electrode 8a of the n-channel transistor 8. The liquid crystal display applies positive and negative potentials Vdd and Vbb to the gate electrode 8a of the n-channel transistor 8 through this gate line. A drain region 8b of the n-channel transistor 8 is connected to a drain line, while a source region 8c thereof is connected to a first electrode of the corresponding auxiliary capacitor 9 and the corresponding pixel electrode 10. The liquid crystal display applies a signal potential Vsig of a video signal to the drain region 8b of the n-channel transistor 8 through the drain line. A second electrode of the auxiliary capacitor 9 and the counter electrode 11 are connected to a common potential Vcom common to each pixel part 6.

The display part 3 is provided with a display part shielding film 13, as shown in FIG. 1. This display part shielding film 13 is constituted of pixel part shielding regions 13a formed to cover lower portions of the switching element parts 7 of the pixel parts 6 and a latticelike wiring part shielding region 13b formed to cover lower portions of gate and drain lines. The pixel part shielding regions 13a are examples of the "first shielding film" or the "pixel part shielding film" in the present invention. The pixel part shielding regions 13a, provided for blocking light incident upon the n-channel transistors 8 arranged on the switching element parts 7 of the pixel parts 6, are integrated with the wiring part shielding region 13b. The wiring part shielding region 13b is provided for blocking light incident upon the gate and drain lines. The remaining regions of the display part shielding film 13 corresponding to those other than the switching element part 7 of the pixel parts 6 are open. The liquid crystal display emits light displaying images through the open regions of the display pat shielding film 13.

Figure 3:
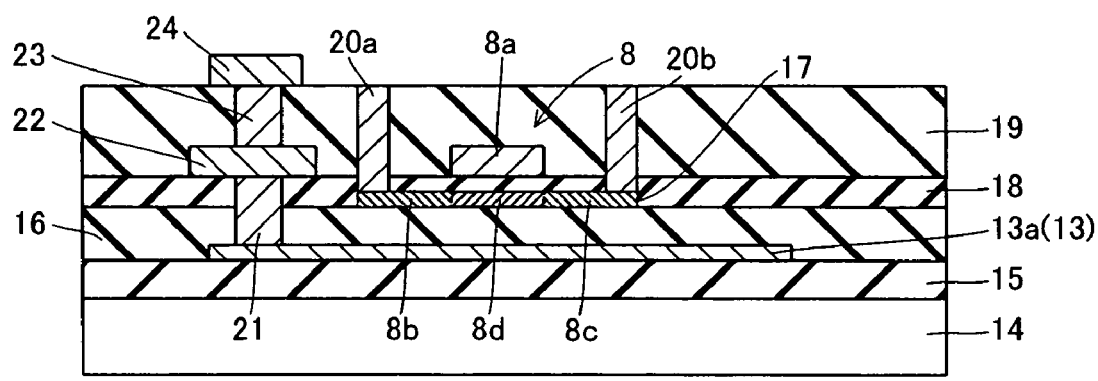
FIG. 3 is a sectional view showing the structure of a portion around the n-channel transistor of each pixel part of the liquid crystal display according to the first embodiment shown in FIG. 1.

The n-channel transistor 8 included in each pixel part 6 is constituted of a TFT (thin-film transistor) having a structure shown in FIG. 3. More specifically, a buffer layer 15 of an insulating film having a thickness of about 300 nm is formed on a glass substrate 14. The pixel part shielding regions 13a of the aforementioned display part shielding film 13 are provided on prescribed regions of this buffer layer 15. The display part shielding film 13 is constituted of an Mo film having a thickness of about 100 nm. An insulating film 16 of $SiO_2$ having a thickness of about 300 nm is formed on the pixel part shielding regions 13a of the display part shielding film 13 and the buffer layer 15, to cover the pixel part shielding regions 13a.

A crystalline silicon film 17 having a thickness of about 70 nm is formed on each prescribed region of the insulating film 16. This crystalline silicon film 17 has a function for serving as an active layer of the corresponding n-channel transistor 8. The crystalline silicon film 17 is formed with a channel region 8d of the corresponding n-channel transistor 8 and the drain and source regions 8b and 8c provided to hold the channel region 8d therebetween. The liquid crystal display sets the threshold voltage Vth of the n-channel transistor 8 to a prescribed positive level by performing channel doping on the crystalline silicon film 17. The liquid crystal display sets this prescribed positive threshold voltage Vth to a level not bringing a lower channel of the n-channel transistor 8 into an ON-state when supplying a potential ½(Vdd+Vbb) to the corresponding pixel part shielding region 13a of the display part shielding film 13. A gate insulator film 18 of the n-channel transistor 8, formed by an $SiO_2$ film having a thickness of about 100 nm, is provided to cover the crystalline silicon film 17.

According to the first embodiment, the thickness (about 300 nm) of the insulating film 16 provided between each pixel part shielding region 13a of the display part shielding film 13 and the corresponding crystalline silicon film 17 is about three times the thickness (about 100 nm) of the gate insulating film 18 of the n-channel transistor 8. If the insulating film 16 has a thickness of about 500 nm, the time required for a process of forming the insulating film 16 may be increased or the insulating film 16 may be disadvantageously cracked due to stress applied thereto in film formation or a subsequent process. When the insulating film 16 has a thickness of about 300 nm as in the first embodiment, the aforementioned inconvenience can be suppressed. The gate electrode 8a of a metal film having a thickness of about 150 nm is formed on a region of the gate insulating film 18 corresponding to the channel region 8d. The crystalline silicon film 17 formed with the drain region 8b, the source region 8c and the channel region 8d, the gate insulating film 18 and the gate electrode 8a constitute the n-channel transistor (TFT) 8.

An insulating film 19 is formed on the gate electrode 8a and the gate insulating film 18, to cover the gate electrode 8a. Plugs 20a and 20b reaching the insulating film 19 are provided on regions of the insulating film 19 and the gate insulating film 18 corresponding to the drain region 8b and the source region 8c of the crystalline silicon film 17 respectively. The drain region 8b is linked to the aforementioned drain line through the corresponding plug 20a, while the source region 8c is linked to the first electrode of the aforementioned auxiliary capacitor 9 and the pixel electrode 10 through the corresponding plug 20b.

A first-layer plug 21 passing through the insulating film 16 and the gate insulating film 18 is provided on regions of the insulating film 16 and the gate insulating film 18 corresponding to the pixel part shielding region 13a of the display part shielding film 13. The first-layer plug 21 is connected to the pixel part shielding region 13a of the display part shielding film 13. An intermediate wiring layer 22 connected to the first-layer plug 21 is provided on a region of the gate insulating film 18 corresponding to the first-layer plug 21. A second-layer plug 23 reaching the insulating film 19 is formed on a region of the insulating film 19 corresponding to the intermediate wiring layer 22. The second-layer plug 23 is connected to the intermediate wiring layer 22. A wiring layer 24 connected to the second-layer plug 23 is provided on a region of the insulating film 19 corresponding to the second-layer plug 23. This wiring layer 24 is linked to a potential generation circuit part 39a (see FIG. 1) of the external circuit part 2 described later.

As shown in FIG. 1, the H driver 4 includes a shift register circuit 25, a sampling transistor 26, a buffer 27 and a DA converter 28. A clock generation circuit 29 is arranged adjacently to the H driver 4. The shift register circuit 25, the sampling transistor 26, the buffer 27, the DA converter 28 and the clock generation circuit 29 are examples of the "second region" or the "peripheral circuit part" in the present invention. The shift register circuit 25, the sampling transistor 26, the buffer 27, the DA converter 28 and the clock generation circuit 29 include n-channel transistors having structures substantially similar to those of the n-channel transistors 8 of the aforementioned pixel parts 6 respectively. These n-channel transistors are examples of the "second transistor" in the present invention. However, the liquid crystal display supplies the positive potential Vdd and a negative potential Vss to the gate electrodes of these n-channel transistors while supplying signal potentials Vsig responsive to the respective circuit parts to the drain regions thereof.

According to the first embodiment, a shift register circuit shielding film 30, a sampling transistor shielding film 31, a buffer shielding film 32, a DA converter shielding film 33 and a clock generation circuit shielding film 34 are provided to cover lower portions of the shift register circuit 25, the sampling transistor 26, the buffer 27, the DA converter 28 and the clock generation circuit 29 respectively. The shift register circuit shielding film 30, the sampling transistor shielding film 31, the buffer shielding film 32, the DA converter shielding film 33 and the clock generation circuit shielding film 34 are examples of the "second shielding film" or the "peripheral circuit part shielding film" in the present invention. The shift register circuit shielding film 30, the sampling transistor shielding film 31, the buffer shielding film 32, the DA converter shielding film 33 and the clock generation circuit shielding film 34 block light incident upon the n-channel transistors provided on the shift register circuit 25, the sampling transistor 26, the buffer 27, the DA converter 28 and the clock generation circuit 29 respectively.

The V driver 5 includes a shift register circuit 35 and a level conversion circuit 36. The shift register circuit 35 and the level conversion circuit 36 are examples of the "second region" or the "peripheral circuit part" in the present invention. The shift register circuit 35 and the level conversion circuit 36 include n-channel transistors having structures substantially similar to those of the n-channel transistors 8 of the aforementioned pixel parts 6 respectively. These n-channel transistors are examples of the "second transistor" in the present invention. However, the liquid crystal display supplies the positive and negative potentials Vdd and Vbb to the gate electrodes of the n-channel transistors provided on the level conversion circuit 36, while supplying the positive and negative potentials Vdd and Vss to the n-channel transistors provided on the shift register circuit 35.

According to the first embodiment, a shift register circuit shielding film 37 and a level conversion circuit shielding film 38 are provided to cover lower portions of the shift register circuit 35 and the level conversion circuit 36 respectively. The shift register circuit shielding film 37 and the level conversion circuit shielding film 38 are examples of the "second shielding film" or the "peripheral circuit part shielding film" in the present invention. The shift register circuit shielding film 37 and the level conversion circuit shielding film 38 block light incident upon the n-channel transistors provided on the shift register circuit 35 and the level conversion circuit 36 respectively.

The external circuit part 2 is provided with the potential generation circuit part 39a and another potential generation circuit part 39b. The potential generation circuit parts 39a and 39b have functions of generating potentials ½(Vdd+Vbb) and ½(Vdd+Vss) respectively.

According to the first embodiment, the potential generation circuit part 39a is connected to the display part shielding film 13 and the level conversion circuit shielding film 38 through a wire 40a. Thus, the potential generation circuit part 39a supplies the intermediate potential ½(Vdd+Vbb) between the positive and negative potentials Vdd and Vbb to the display part shielding film 13 and the level conversion circuit shielding film 38.

The external circuit part 2 is also provided with a variable resistor 41 connected to the potential generation circuit part 39a and the wire 40a between the display part shielding film 13 and the level conversion circuit shielding film 38 for adjusting the potential supplied from the potential generation circuit part 39a. The liquid crystal display can raise or lower the potential supplied from the potential generation circuit part 39a in the range of about ±3 V with the variable resistor 41. In other words, the liquid crystal display can adjust the threshold voltage Vth of the n-channel transistors 8 of the pixel parts 6 by adjusting the potential supplied to the display part shielding film 13 with the variable resistor 41 when the threshold voltage Vth shifts due to dispersion in the process. When the liquid crystal display raises the potential supplied to the display part shielding film 13 with the variable resistor 41, the potential of the channel regions 8d of the n-channel transistors 8 of the pixel parts 6 are raised to lower the threshold voltage Vth of the n-channel transistors 8. When the liquid crystal display lowers the potential supplied to the display part shielding film 13 with the variable resistor 41, on the other hand, the potential of the channel regions 8d of the n-channel transistors 8 of the pixel parts 6 are lowered to raise the threshold voltage Vth of the n-channel transistors 8.

According to the first embodiment, the potential generation circuit 39b is connected to the shift register circuit shielding films 30 and 37, the sampling transistor shielding film 31, the buffer shielding film 32, the DA converter shielding film 33 and the clock generation circuit shielding film 34 through a wire 40b. Thus, the potential generation circuit part 39b supplies the intermediate potential ½(Vdd+Vss) between the positive and negative potentials Vdd and Vss to the shift register circuit shielding films 30 and 37, the sampling transistor shielding film 31, the buffer shielding film 32, the DA converter shielding film 33 and the clock generation circuit shielding film 34.

Operations on the n-channel transistor 8 of each pixel part 6 of the liquid crystal display according to the first embodiment are now described with reference to FIGS. 1 to 8. The following description is made on operations of the n-channel transistor 8 of each pixel part 6 of the liquid crystal display in a dot inversion driving system. The liquid crystal display sets the positive potential Vdd to about 7 V, the negative potential Vbb to about −4 V, the common potential Vcom to about 3.5 V and the signal potential Vsig to about 1 V to about 6 V respectively. It is assumed that the threshold voltage Vth of the n-channel transistor 8 is about 1 V. Thus, the n-channel transistor 8 enters an ON-state when the voltage (potential difference) between the gate electrode 8d and the channel region 8d is at least about 1 V. It is assumed that the n-channel transistor 8 enters an OFF-state when the potential difference between the gate electrode 8a and the channel region 8d is not more than about 0.5 V.

As an operation of writing video signals in pixels premising waveforms shown in FIGS. 4 to 7, the liquid crystal display first sequentially performs a write operation along the first-stage gate line every three pixels linked with this gate line. When completely scanning all pixels linked with the first-stage gate line, the liquid crystal display similarly performs a write operation every three pixels linked with the second-stage gate line. Thus, the liquid crystal display sequentially performs write operations on all pixels linked with all gate lines provided on the display part 3. When completely scanning all gate lines, the liquid crystal display repetitively sequentially performs a similar write operation on the first-stage gate line again. FIGS. 4 to 7 show voltage waveforms related to the n-channel transistor of the third one of the three pixels first subjected to the write operation among those linked with the first-stage gate line.

Referring to each of FIGS. 4 to 7, the first three voltage pulses and the second three voltage pulses correspond to ON and OFF periods of an upper channel of the n-channel transistor 8 respectively, and subsequent triplets voltage pulses alternately correspond to ON and OFF periods respectively. Each set of three voltage pulses in each of the aforementioned ON periods corresponds to a write signal on three pixels simultaneously selected in writing. Each set of three voltage pulses in each of the aforementioned OFF periods is applied to the aforementioned third pixel while the liquid crystal display performs a write operation on the remaining pixels after performing the write operation on the aforementioned third pixel. In other words, the first voltage pulse in the OFF period shows a voltage applied to the aforementioned third pixel while the liquid crystal display performs the write operation on the remaining pixels linked with the same gate line as the third pixel after writing data in the aforementioned third pixel. The second and third voltage pulses show voltages applied to the aforementioned third pixel while the liquid crystal display sequentially performs the write operation on the pixels linked with second- and third-stage gate lines after completely scanning the first-stage gate line connected with the aforementioned third pixel. While FIGS. 4 to 7 illustrate the periods of the voltage pulses in the same length in the ON and OFF periods, the periods of the voltage pulses in the OFF periods are remarkably longer than those of the voltage pulses in the ON periods in practice. While FIGS. 4 to 7 illustrate three voltage pulses applied to the pixels in the OFF periods, the number of applied voltage pulses varies with the number of the gate lines provided on the display part 3 in the OFF periods. The display part 3 is generally provided with hundreds of gate lines in practice, and hence the liquid crystal display applies voltage pulses in a number remarkably larger than that (three) of the voltage pulses shown in FIGS. 4 to 7 to the aforementioned third pixel in the OFF periods.

Figure 4:
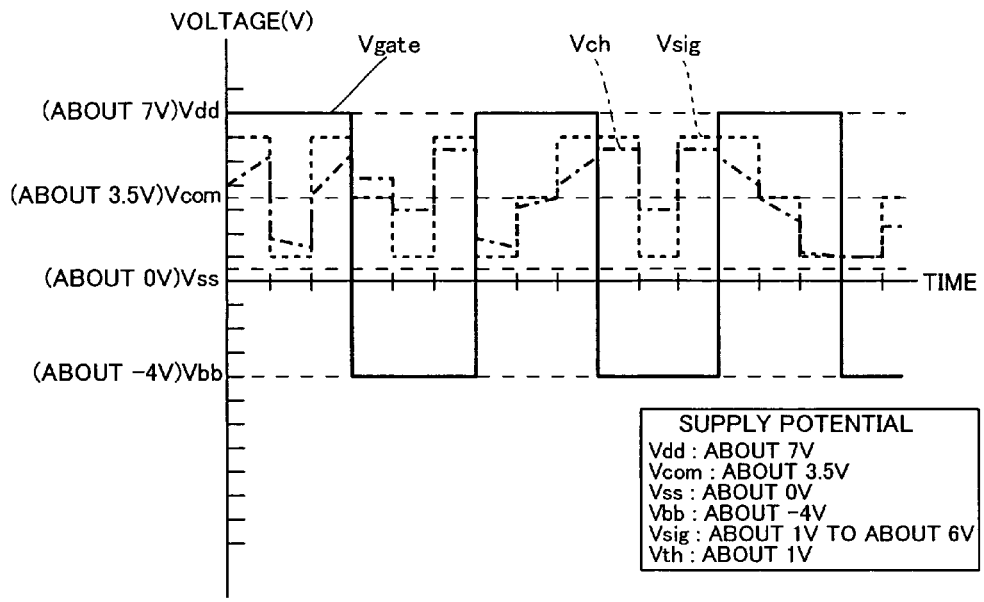
FIGS. 4 to 7 are voltage waveform diagrams for illustrating operations of the n-channel transistor of the pixel part of the liquid crystal display according to the first embodiment of the present invention.

First, the liquid crystal display alternately switches the potential (gate potential Vgate) input in the gate electrode 8*a* of the n-channel transistor 8 of each pixel part 6 (see FIG. 2) between the positive potential (about 7 V) and the negative potential Vbb (about −4 V), as shown in FIG. 4. The signal potential Vsig input in the drain region 8*b* of the n-channel transistor 8 changes in the range of about 1 V to about 6 V, as shown by a dotted line in FIG. 4. At this time, the potential (Vch) of the channel region 8*d* of the n-channel transistor 8 exhibits a waveform shown by a one-dot chain line in FIG. 4 and changes in the range of about 1.0 V to about 5.5 V. FIG. 4 shows the potential Vch around the center of the channel region 8*d*. In this case, the voltage (potential difference) Vgd=Vgate−Vsig between the gate electrode 8*a* and the drain region 8*b* of the n-channel transistor 8 and the voltage (potential difference) Vgate−Vch between the gate electrode 8*a* and the channel region 8*d* of the n-channel transistor 8 change in waveforms shown in FIG. 5.

While the gate potential Vgate (see FIG. 4) is at the positive potential Vdd (about 7 V), therefore, the voltage (potential difference) Vgc (see FIG. 5) between the gate electrode 8*a* and the channel region 8*d* of the n-channel transistor 8 is in the range of about 1.8 V to about 6.0 V. In other words, the voltage (potential difference) Vgc (about 1.8 V to about 6.0 V) between the gate electrode 8*a* and the channel region 8*d* of the n-channel transistor 8 is at a level (at least about 1 V) in the ON-region of the n-channel transistor 8 in this period, to turn on the n-channel transistor 8. While the gate potential Vgate (see FIG. 4) is at the negative potential Vbb (about −4 V), on the other hand, the voltage (potential difference) Vgc (see FIG. 5) between the gate electrode 8*a* and the channel region 8*d* of the n-channel transistor 8 is in the range of about −9.5 V and about −5.0 V. In other words, the voltage (potential difference) Vgc (about −9.5 V and about −5.0 V) between the gate electrode 8*a* and the channel region 8*d* of the n-channel transistor 8 reaches a voltage (potential difference) (not more than about 0.5 V) in the OFF-region of the n-channel transistor 8, to turn off the n-channel transistor 8.

Figure 6:
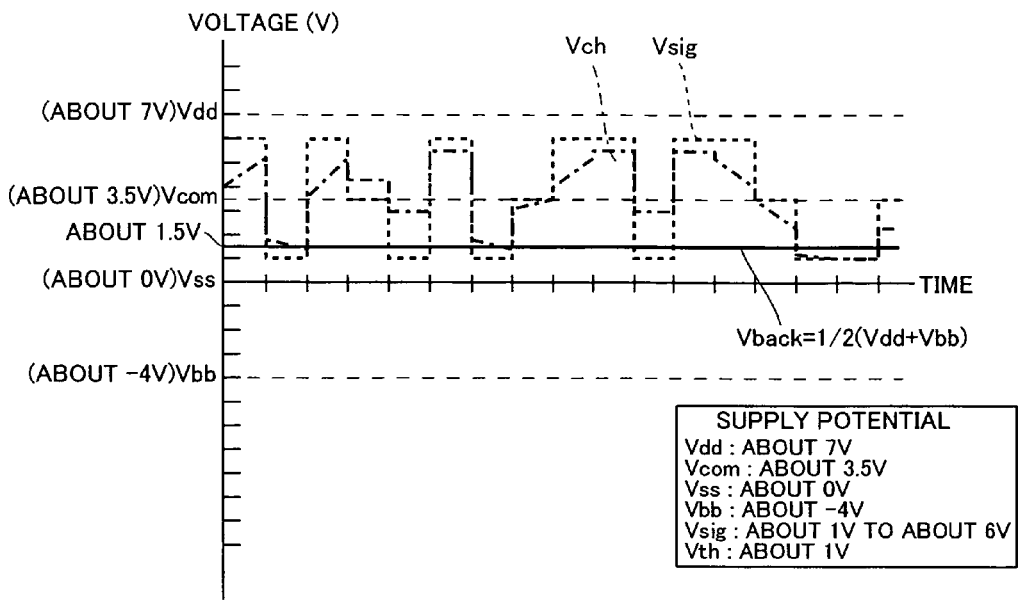
Figure 7:
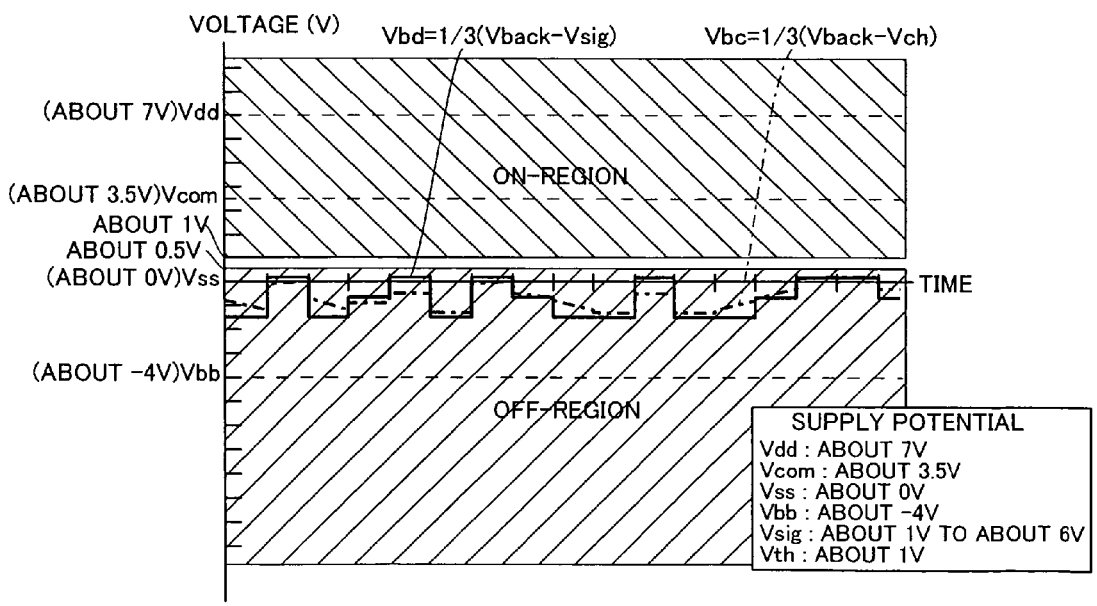

According to the first embodiment, the liquid crystal display applies a voltage ½(Vdd+Vbb) to each pixel part shielding region 13*a* (see FIG. 3) of the display part shielding film 13 provided to cover the corresponding n-channel transistor 8 from the potential generation circuit part 39*a* (see FIG. 1). Thus, the liquid crystal display fixes the potential Vback of the pixel part shielding region 13*a* (see FIG. 3) of the display part shielding film 13 to ½(Vdd+Vbb)=about 1.5 V, as shown in FIG. 6. At this time, the effective voltage (potential difference) Vbc between the pixel part shielding region 13*a* and the channel region 8*d* of the n-channel transistor 8 exhibits a waveform shown in FIG. 7. The effective voltage (potential difference) Vbc between the pixel part shielding region 13*a* and the channel region 8*d* of the n-channel transistor 8 is a relative voltage with respect to the voltage (potential difference) Vgc between the gate electrode 8*a* and the channel region 8*d* of the n-channel transistor 8. Since the thickness (about 300 nm) of the insulating film 16 between the pixel part shielding region 13*a* and the crystalline silicon film 17 (see FIG. 3) formed with the channel region 8*d* is about three times the thickness (about 100 nm) of the gate insulating film 18 of the n-channel transistor 8, the strength of an electric field applied from the pixel part shielding region 13*a* to the channel region 8*d* when the pixel part shielding region 13*a* is supplied with a potential is about ⅓ of the strength of an electric field applied from the gate electrode 8*a* to the channel region 8*d* when the gate electrode 8*a* is supplied with the same potential. Therefore, FIG. 7 shows a voltage (⅓(Vback−Vch)) ⅓ of the difference between the potentials Vback and Vch of the pixel part shielding region 13*a* of the display part shielding film 13 and the channel region 8*d* as the effective voltage (potential difference) Vbc between the pixel part shielding region 13*a* and the channel region 8*d*. FIG. 7 also shows the waveform of the voltage (⅓(Vback−Vsig)) ⅓ of the difference between the potential Vback of the pixel part shielding region 13*a* and the signal potential Vsig applied to the drain region 8*b* as the effective voltage (potential difference) Vbd between the pixel part shielding region 13*a* of the display part shielding film 13 and the drain region 8*b* from a viewpoint similar to the above.

Figure 8:
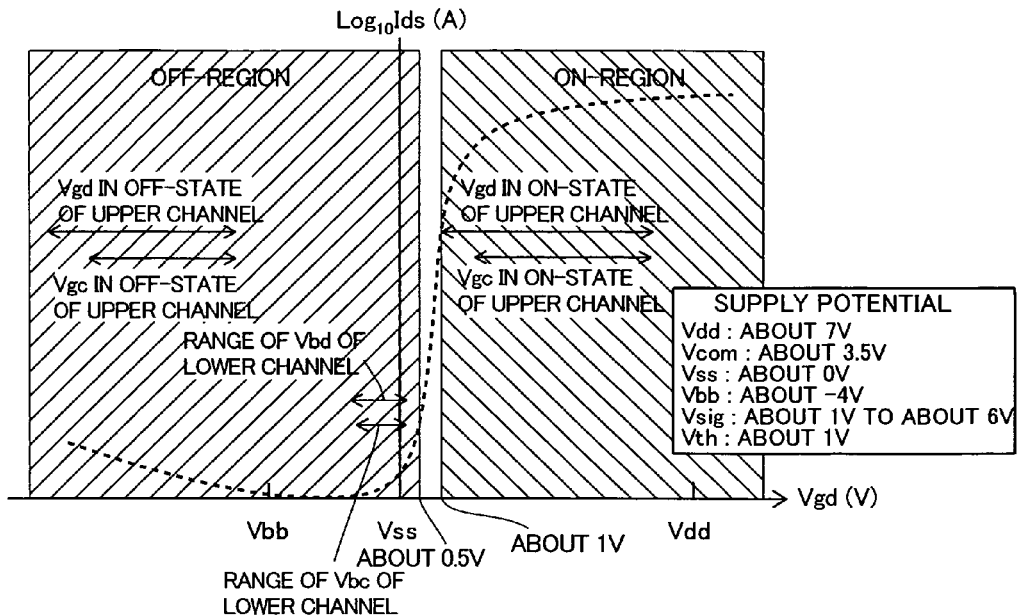
FIG. 8 illustrates current-voltage characteristics of the n-channel transistor of each pixel part of the liquid crystal display according to the first embodiment of the present invention.

The effective voltage (potential difference) Vbc between the pixel part shielding region 13*a* and the channel region 8*d* of the n-channel transistor 8 changes in the range of about −1.3 V to about 0.2 V, as shown in FIG. 7. Thus, the effective voltage (potential difference) Vbc (about −1.3 V to about 0.2 V) between the pixel part shielding region 13*a* and the channel region 8*d* is regularly at a level (not more than about 0.5 V) in the OFF-region of the n-channel transistor 8, as shown in FIG. 8. When supplying the potential ½(Vdd+Vbb) to the pixel part shielding region 13*a*, therefore, the liquid crystal display holds the lower channel of the n-channel transistor 8 in an OFF-state. Thus, the liquid crystal display inhibits the lower channel of the n-channel transistor 8 from entering an ON-state also when applying the potential ½(Vdd+Vbb) to the pixel part shielding region 13a of the display part shielding film 13 while holding the upper channel of the n-channel transistor 8 in an OFF-state by applying the negative potential Vbb to the gate electrode 8. Therefore, the liquid crystal display inhibits current from flowing between the drain region 8b and the source region 8c through the lower channel of the n-channel transistor 8 in this period.

The liquid crystal display performs operations similar to the aforementioned operation on the n-channel transistor 8 of each pixel part 6 also on the n-channel transistors included in the level conversion circuit 36, the shift register circuit parts 25 and 35, the sampling transistor 26, the buffer 27, the DA converter 28 and the clock generation circuit 29 respectively. Thus, the liquid crystal display inhibits a lower channel (channel region closer to the shielding film 38) of each n-channel transistor included in the level conversion circuit 36 from entering an ON-state also when supplying the potential ½(Vdd+Vbb) to the level conversion circuit shielding film 38 while holding an upper channel (channel region closer to a gate electrode) of the n-channel transistor, thereby inhibiting current from flowing between the drain region and the source region of the n-channel transistor through the lower channel. Further, the liquid crystal display inhibits a lower channel of each of the n-channel transistors included in the shift register circuit parts 25 and 35, the sampling transistor 26, the buffer 27, the DA converter 28 and the clock generation circuit 29 from entering an ON-state also when supplying the potential ½(Vdd+Vss) to the corresponding shielding film while holding an upper channel of the n-channel transistor in an OFF-state, thereby inhibiting current from flowing between the drain region and the source region of the n-channel transistor through the lower channel.

According to the first embodiment, as hereinabove described, the liquid crystal display can fix the display part shielding film 13 and the level conversion circuit shielding film 38 to the potential ½(Vdd+Vbb) and fix the shift register circuit shielding films 30 and 37, the sampling transistor shielding film 31, the buffer shielding film 32, the DA converter shielding film 33 and the clock generation circuit shielding film 34 to the potential ½(Vdd+Vss) by supplying the potential ½(Vdd+Vbb) to the display part shielding film 13 and the level conversion circuit shielding film 38 and supplying the potential ½(Vdd+Vss) to the shift register circuit shielding films 30 and 37, the sampling transistor shielding film 31, the buffer shielding film 32, the DA converter shielding film 33 and the clock generation circuit shielding film 34 respectively. Thus, no potentials fluctuate in the display part shielding film 13, the level conversion circuit shielding film 38, the shift register circuit shielding films 30 and 37, the sampling transistor shielding film 31, the buffer shielding film 32, the DA converter shielding film 33 and the clock generation circuit shielding film 34, whereby the liquid crystal display can inhibit the threshold voltages of the n-channel transistors 8 of the pixel parts 6 and the n-channel transistors included in the level conversion circuit 36, the shift register circuit parts 25 and 35, the sampling transistor 26, the buffer 27, the DA converter 28 and the clock generation circuit 29 respectively from fluctuation following potential fluctuation in these shielding films. Therefore, the liquid crystal display can stabilize operations of the n-channel transistors 8 of the pixel parts 6 and the n-channel transistors included in the level conversion circuit 36, the shift register circuit parts 25 and 35, the sampling transistor 26, the buffer 27, the DA converter 28 and the clock generation circuit 29 respectively.

According to the first embodiment, the liquid crystal display can prevent the voltages (potential difference) Vbc between the aforementioned shielding films and the channel regions of the corresponding n-channel transistors from exceeding the threshold voltages Vth of the n-channel transistors by supplying the potential ½(Vdd+Vbb) to the display part shielding film 13 and the level conversion circuit shielding film 38 and supplying the potential ½(Vdd+Vss) to the shift register circuit shielding films 30 and 37, the sampling transistor shielding film 31, the buffer shielding film 32, the DA converter shielding film 33 and the clock generation circuit shielding film 34 respectively. Also when supplying the potential ½(Vdd+Vbb) to the display part shielding film 13 and the level conversion circuit shielding film 38 and supplying the potential ½(Vdd+Vss) to the shift register circuit shielding films 30 and 37, the sampling transistor shielding film 31, the buffer shielding film 32, the DA converter shielding film 33 and the clock generation circuit shielding film 34 respectively, therefore, the liquid crystal display can inhibit the n-channel transistors 8 of the pixel parts 6 and the n-channel transistors of the level conversion circuit 36, the shift register circuits 25 and 35, the sampling transistor 26, the buffer 27, the DA converter 28 and the clock generation circuit 29 from entering ON-states. Thus, the liquid crystal display can suppress occurrence of a malfunction caused by turn-on of the aforementioned n-channel transistors resulting from potentials supplied to the corresponding shielding films while holding the n-channel transistors 8 of the pixel parts 6 and the n-channel transistors of the level conversion circuit 36, the shift register circuits 25 and 35, the sampling transistor 26, the buffer 27, the DA converter 28 and the clock generation circuit 29 in OFF-states.

According to the first embodiment, the liquid crystal display, provided with the display part shielding film 13, the level conversion circuit shielding film 38, the shift register circuit shielding films 30 and 37, the sampling transistor shielding film 31, the buffer shielding film 32, the DA converter shielding film 33 and the clock generation circuit shielding film 34 in correspondence to the display parts 3, the level conversion circuit 36, the shift register circuits 25 and 35, the sampling transistor 26, the buffer 27, the DA converter 28 and the clock generation circuit 29 respectively for supplying potentials to these shielding films respectively, can reduce the numbers of wires and plugs for supplying the potentials to the shielding films and remarkably reduce the spaces (space margins) between the shielding films and ends of the transistors as compared with a case of providing shielding films for the respective n-channel transistors included in the aforementioned circuit parts and individually supplying prescribed potentials to these shielding films, whereby the liquid crystal display can be inhibited from size increase.

According to the first embodiment, the insulating film 16 having the thickness of about three times the thickness of the gate insulating film 18 of the n-channel transistor 8 is provided between each n-channel transistor 8 and the corresponding pixel part shielding region 13a of the display part shielding film 13 so that the insulating film 16 serving as a gate insulating film has a large thickness when the pixel part shielding region 13a unintentionally functions as a gate electrode, whereby the channel region 8d of the n-channel transistor 8 is hardly influenced by the potential ½(Vdd+Vbb) applied to the pixel part shielding region 13a. Thus, the liquid crystal display can reduce change of the threshold voltage Vth of the n-channel transistor 8 resulting from application of the potential ½(Vdd+Vbb) to the pixel part shielding region 13a.

A process of manufacturing the n-channel transistor 8 of each pixel part 6 in the liquid crystal display according to the first embodiment is described with reference to FIGS. 1, 3 and 9 to 11.

Figure 9:
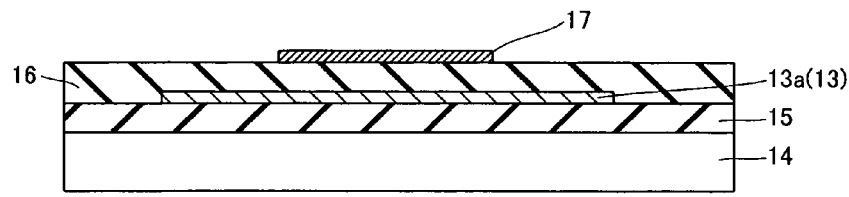
FIGS. 9 to 11 are sectional views for illustrating a manufacturing process for the n-channel transistor of each pixel part of the liquid crystal display according to the first embodiment of the present invention.

First, the buffer layer 15 having the thickness of about 300 nm is formed on the glass substrate 14, as shown in FIG. 9. An Mo film (not shown) having a thickness of about 100 nm is formed on the buffer layer 15 by sputtering, and thereafter patterned by photolithography and etching. Thus, the display part shielding film 13, the shift register circuit shielding films 30 and 37, the sampling transistor shielding film 31, the buffer shielding film 32, the DA converter shielding film 33, the clock generation circuit shielding film 34 and the level conversion circuit shielding film 38 are formed on the prescribed regions of the buffer layer 15 respectively, as shown in FIG. 1. At this time, the display part shielding film 13 is formed to have the pixel part shielding regions 13a covering the switching element parts 7 of the pixel parts 6 and the latticelike wiring part shielding region 13b covering the gate and drain lines. The remaining regions of the display part shielding film 13 other than those corresponding to the switching element parts 7 of the pixel parts 6 are open to be capable of passing light therethrough.

Then, the insulating film 16 of $SiO_2$ having the thickness of about 300 nm is formed by CVD, as shown in FIG. 9. Thereafter an amorphous silicon film (not shown) having a thickness of about 70 nm is formed on the overall surface of the insulating film 16 by CVD, and thereafter crystallized. More specifically, a continuous-wave infrared laser beam is applied to the amorphous silicon film while heating the substrate 14 to about 300° C. on a hot plate, thereby heating the amorphous silicon film. At this time, the infrared laser beam is also applied to the display part shielding film 13 of Mo, the shift register circuit shielding films 30 and 37 (see FIG. 1), the sampling transistor shielding film 31, the buffer shielding film 32, the DA converter shielding film 33, the clock generation circuit shielding film 34 and the level conversion circuit shielding film 38, which in turn generate heat. The amorphous silicon film is further heated by the heat generated from these shielding films. Thus, the amorphous silicon film is melted.

After the application of the infrared laser beam, the melted amorphous silicon film is cooled to be crystallized. When the substrate 14 is relatively transversely scanned (parallelly to the upper surface of the glass substrate 14) with the laser beam, relatively large column crystals are transversely formed. If any region has been not heated to a temperature exceeding the melting point of the amorphous silicon film through the aforementioned application of the infrared laser beam, microcrystals are formed on this region. The amorphous silicon film may alternatively be crystallized by excimer laser annealing (ELA) or another crystallization with energy application means. The amorphous silicon film may further alternatively be crystallized by solid-phase crystallization (SPC). The amorphous silicon film is crystallized in the aforementioned manner, to obtain a crystalline silicon film (not shown). This crystalline silicon film is patterned by photolithography and etching, whereby the islanded crystalline silicon film 17 is formed as the active layer of the n-channel transistor 8. Thereafter the crystalline silicon film 17 is subjected to channel doping.

Figure 10:
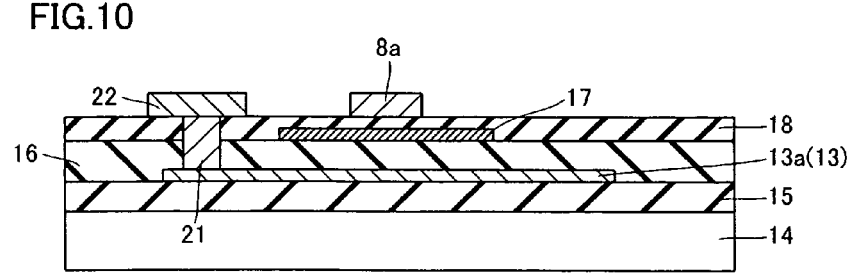

As shown in FIG. 10, the gate insulating film 18 of $SiO_2$ having the thickness of about 100 nm is formed on the insulating film 16 and the crystalline silicon film 17, to cover the crystalline silicon film 17. Thereafter the first-layer plug 21 is formed to reach the gate insulating film 18 from the pixel part shielding region 13a of the display part shielding film 13, and a metal film (not shown) having a thickness of about 150 nm is thereafter formed on the gate insulating film 18 and the first-layer plug 21. This metal film (not shown) is patterned thereby forming the gate electrode 8a on a region of the crystalline silicon film 17 corresponding to the channel region 8d, while forming the intermediate wiring layer 22 linked with the first-layer plug 21.

Figure 11:
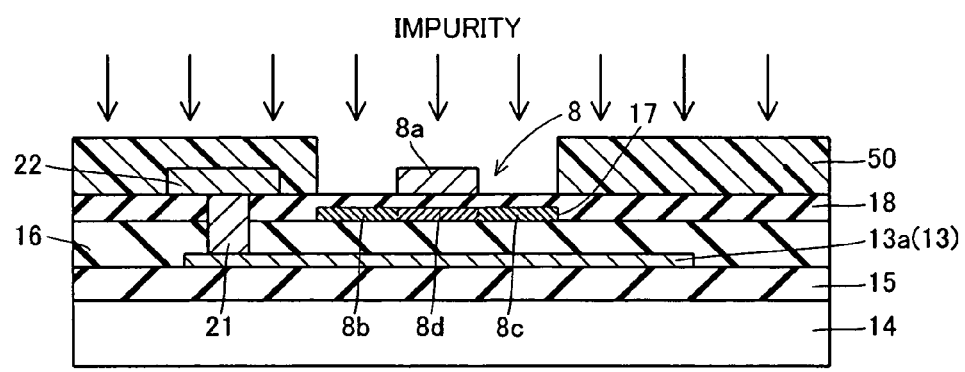

As shown in FIG. 11, the region other than that corresponding to the crystalline silicon film 17 is covered with a resist film 50, and an impurity is thereafter ion-implanted into the crystalline silicon film 17 through the resist film 50 and the gate electrode 8a serving as masks. Thus, the drain region 8a and the source region 8c as well as the channel region 8d held between the drain region 8a and the source region 8c are formed on the crystalline silicon film 17. Thereafter the resist film 50 is removed.

Then, the insulating film 19 is formed on the gate insulating film 18 to cover the gate electrode 8a and the intermediate wiring layer 22, as shown in FIG. 3. Thereafter the second-layer plug 23 linked with the intermediate wiring layer 22 as well as the plugs 20a and 20b linked with the drain region 8b and the source region 8c of the crystalline silicon film 17 respectively are formed followed by formation of the wiring layer 24 linked with the second-layer plug 23 on the insulating film 19. The n-channel transistor 8 of each pixel part 6 of the liquid crystal display according to the first embodiment shown in FIG. 3 is formed in the aforementioned manner.

Second Embodiment

Figure 12:
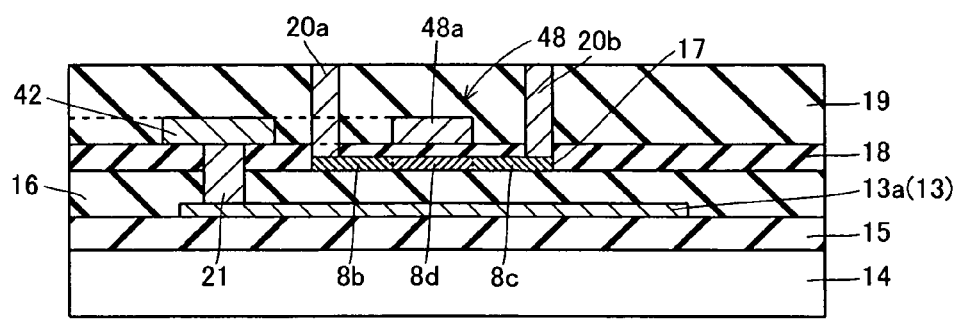
FIG. 12 is a sectional view showing the structure of a portion around an n-channel transistor of each pixel part of a liquid crystal display according to a second embodiment of the present invention.

The structure of a liquid crystal display according to a second embodiment of the present invention is described with reference to FIG. 12.

According to the second embodiment, a gate electrode 48a of an n-channel transistor 48 of each pixel part 6 and a pixel part shielding region 13a of a display part shielding film 13 are connected with each other, dissimilarly to the aforementioned first embodiment. The n-channel transistor 48 is an example of the "first transistor" in the present invention. More specifically, the gate electrode 48a of the n-channel transistor 48 of the pixel part 6 and an intermediate wiring layer 42 are linked with each other, whereby the pixel part shielding region 13a of the display part shielding film 13 and the gate electrode 48a of the n-channel transistor 48 of the pixel part 6 are connected with each other through a plug 21 and the intermediate wiring layer 42. According to the second embodiment, the pixel part shielding regions 13a connected with the gate electrodes 48a of a plurality of n-channel transistors 48 connected to a gate line and other pixel part shielding regions 13a connected with gate electrodes 48a of a plurality of n-channel transistors 48 connected to another gate line are electrically parted from each other.

Thus, the liquid crystal display according to the second embodiment applies a potential Vgate, applied to the gate electrodes 48a of the plurality of n-channel transistors 48 connected with the same gate line, also to the pixel part shielding regions 13a linked with the gate electrodes 48a of these n-channel transistor 48. According to the second embodiment, therefore, each pixel part shielding region 13a of the display part shielding film 13 can serve as the gate electrode of the corresponding n-channel transistor 48. The remaining structure of the liquid crystal display according to the second embodiment is similar to that of the liquid crystal display according to the aforementioned first embodiment. The liquid crystal display according to the second embodiment applies a fixed potential ½(Vdd+Vbb) to a level conversion circuit shielding film, similarly to the aforementioned first embodiment. Further, the liquid crystal display according to the second embodiment applies another fixed potential ½(Vdd+Vss) to a shift register circuit shielding film of an H driver, a sampling transistor shielding film, a buffer shielding film, a DA converter shielding film and a shift register circuit shielding film of a V driver, also similarly to the aforementioned first embodiment.

Operations of the n-channel transistor 48 of each pixel part 6 of the liquid crystal display according to the second embodiment are now described with reference to FIGS. 12 to 14.

The liquid crystal display according to the second embodiment applies a gate potential Vgate, a signal potential Vsig and a potential Vch similar to the gate potential Vgate, the signal potential Vsig and the potential Vch of the channel region 8*d* in the aforementioned first embodiment shown in FIG. 4 to the gate electrode 48 and a drain region 8*b* and a channel region 8*d* of the n-channel transistor 48 (see FIG. 12) of the pixel part 6 respectively. Thus, voltages Vgd and Vgc between the gate electrode 48*a* and the drain region 8*b* and between the gate electrode 48*a* and the channel region 8*d* of the n-channel transistor 48 according to the second embodiment exhibit waveforms similar to those of the voltages Vgd and Vgc between the gate electrode 8*a* and the drain region 8*b* and between the gate electrode 8*a* and the channel region 8*d* of the n-channel transistor 8 according to the first embodiment shown in FIG. 5 respectively.

According to the second embodiment, the gate electrode 48*a* of the n-channel transistor 48 and the pixel part shielding region 13*a* of the display part shielding film 13 are connected with each other, so that the liquid crystal display applies the same potential as the gate potential Vgate applied to the gate electrode 48*a* to the pixel part shielding region 13*a* of the display part shielding film 13. In other words, the liquid crystal display according to the second embodiment applies the same potential Vback as the gate potential Vgate of the n-channel transistor 8 according to the first embodiment shown in FIG. 4 to the pixel part shielding region 13*a* of the display part shielding film 13. According to the second embodiment, the liquid crystal display applies a positive potential Vdd also to the corresponding pixel part shielding region 13*a* when applying the positive potential Vdd to the gate electrode 48*a* of the n-channel transistor 48, and applies a negative potential Vbb also to the corresponding pixel part shielding region 13*a* when applying the negative potential Vbb to the gate electrode 48*a* of the n-channel transistor 48.

Figure 5:
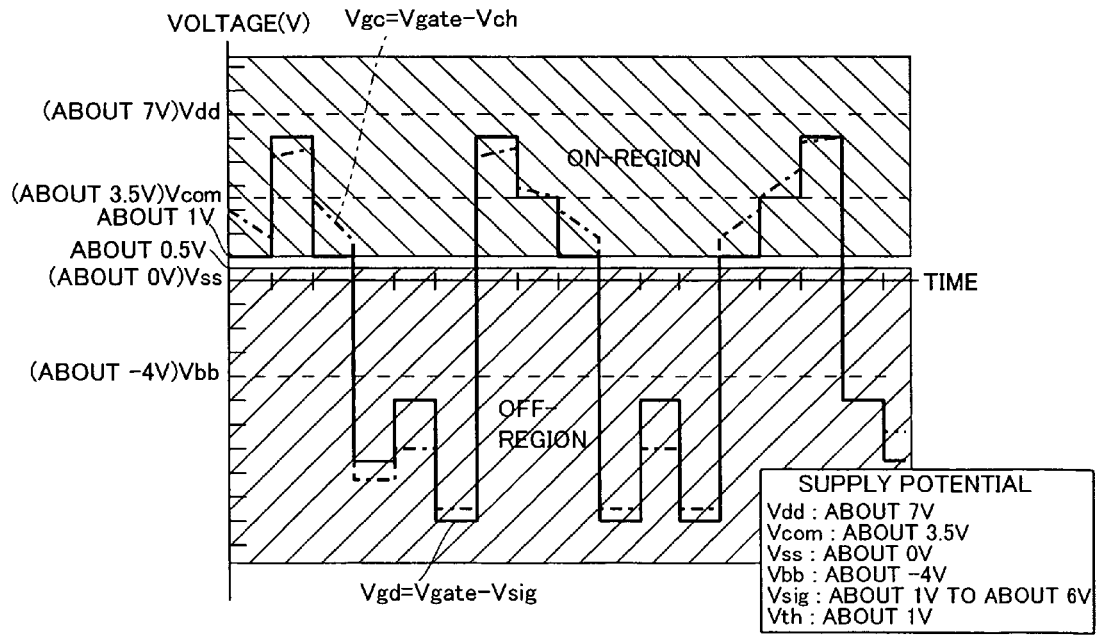
Figure 13:
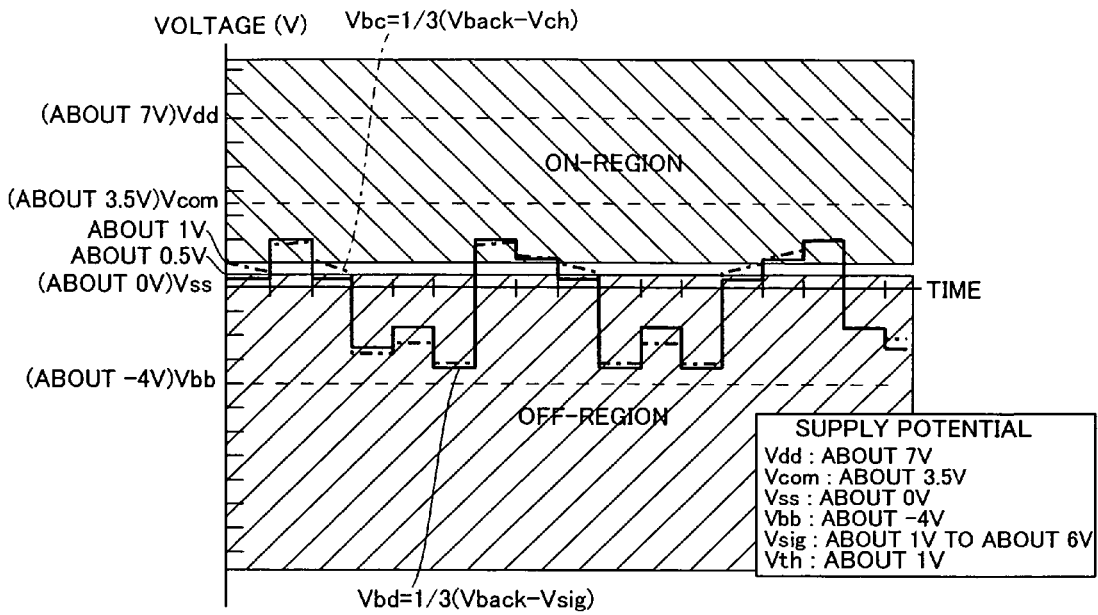
FIG. 13 is a voltage waveform diagram for illustrating operations of the n-channel transistor of the pixel part of the liquid crystal display according to the second embodiment of the present invention.
Figure 14:
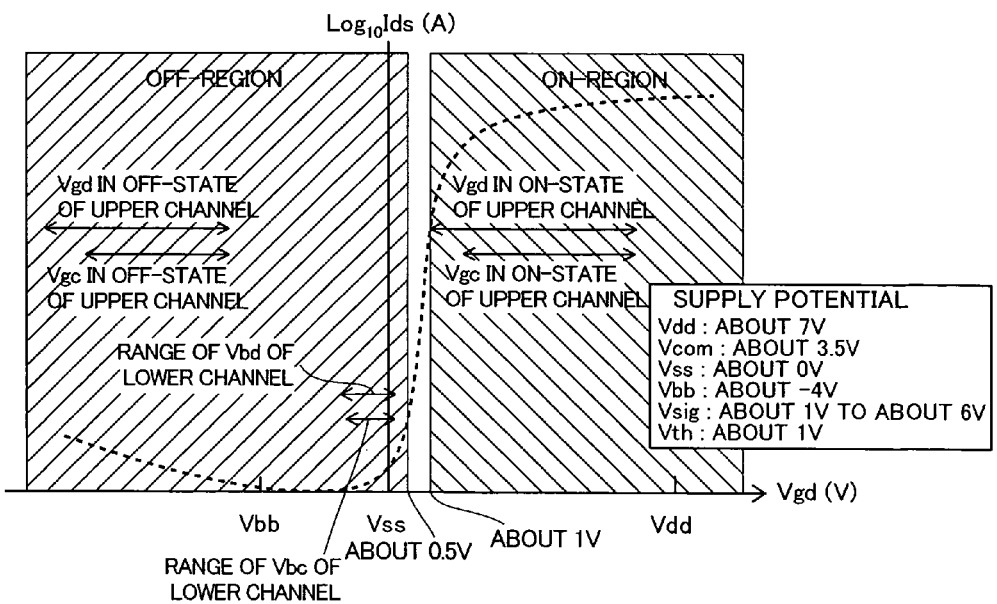
FIG. 14 illustrates current-voltage characteristics of the n-channel transistor of the pixel part of the liquid crystal display according to the second embodiment of the present invention.

According to the second embodiment, an effective voltage Vbd=⅓(Vback−Vsig) between the pixel part shielding region 13*a* of the display part shielding film 13 and the drain region 8*b* of the n-channel transistor 48 exhibits a waveform obtained by reducing the waveform of the voltage (potential difference) Vgd=Vgate−Vsig between the gate electrode 8*a* and the drain region 8*b* of the n-channel transistor 8 according to the first embodiment shown in FIG. 5 to ⅓, as shown in FIG. 13. Further, an effective voltage Vbc=⅓(Vback−Vch) between the pixel part shielding region 13*a* of the display part shielding film 13 and the channel region 8*d* of the n-channel transistor 48 according to the second embodiment exhibits a waveform obtained by reducing the waveform of the voltage (potential difference) Vgc=Vgate−Vch between the gate electrode 8*a* and the channel region 8*d* of the n-channel transistor 8 according to the first embodiment shown in FIG. 5 to ⅓, as shown in FIG. 13.

According to the second embodiment, therefore, the effective voltage (potential difference) Vbc between the pixel part shielding film 13*a* of the display part shielding film 13 and the channel region 8*d* of the n-channel transistor 48 changes in the range of about 0.6 V to about 2.0 V in an ON-state period of an upper channel (closer to the gate electrode 48*a*) of the n-channel transistor 48. In an OFF-state period of the upper channel of the n-channel transistor 48, on the other hand, the effective voltage (potential difference) Vbc between the pixel part shielding film 13*a* of the display part shielding film 13 and the channel region 8*d* of the n-channel transistor 48 changes in the range of about −3.2 V to about −1.7 V according to the second embodiment. Thus, the effective voltage (potential difference) Vbc (about −3.2 V to about −1.7 V) between the pixel part shielding film 13*a* of the display part shielding film 13 and the channel region 8*d* of the n-channel transistor 48 is at a level (not more than about 0.5 V) in the OFF-region of the n-channel transistor 48 in the OFF-state period of the upper channel of the n-channel transistor 48, as shown in FIG. 14. Therefore, the liquid crystal display inhibits a lower channel (closer to the pixel part shielding region 13*a*) of the n-channel transistor 48 from entering an ON-state in the OFF-state period of the upper channel of the n-channel transistor 48. Thus, the liquid crystal display inhibits current from flowing between the drain region 8*b* and the source region 8*c* through the lower channel of the n-channel transistor 48 in this period.

According to the second embodiment, as hereinabove described, the pixel part shielding region 13*a* of the display part shielding film 13 and the gate electrode 48*a* of the n-channel transistor 48 of the corresponding pixel part 6 are connected with each other so that the liquid crystal display applies the same potential as the potential Vgate applied to the gate electrode 48*a* of the n-channel transistor 48 of the corresponding pixel part 6 to the pixel part shielding region 13*a* of the display part shielding film 13 thereby applying the negative potential Vbb also to the pixel part shielding region 13*a* when applying the negative potential Vbb to the gate electrode 48*a* of the n-channel transistor 48. Thus, the liquid crystal display can inhibit the lower channel of the n-channel transistor 48 from entering an ON-state due to the negative potential Vbb supplied to the pixel part shielding region 13*a* when holding the upper channel of the n-channel transistor 48 in an OFF-state by applying the negative potential Vbb to the gate electrode 48*a*. Therefore, the liquid crystal display can suppress occurrence of a malfunction.

According to the second embodiment, further, the liquid crystal display supplies the same potential as that applied to the gate electrode 48*a* of the corresponding n-channel transistor 48 to the pixel part shielding region 13*a* so that the pixel part shielding region 13*a* can serve as the gate electrode 48*a* of the n-channel transistor 48, whereby the liquid crystal display can drive the n-channel transistor 48 with both of the gate electrode 48*a* of the n-channel transistor 48 and the pixel part shielding region 13*a* of the display part shielding film 13. Thus, the liquid crystal display can improve drivability of the n-channel transistor 48 of the pixel part 6. Therefore, the liquid crystal display can write a signal potential Vsig at a high speed through the n-channel transistor 48.

The remaining effects of the second embodiment are similar to those of the aforementioned first embodiment.

Third Embodiment

Figure 15:
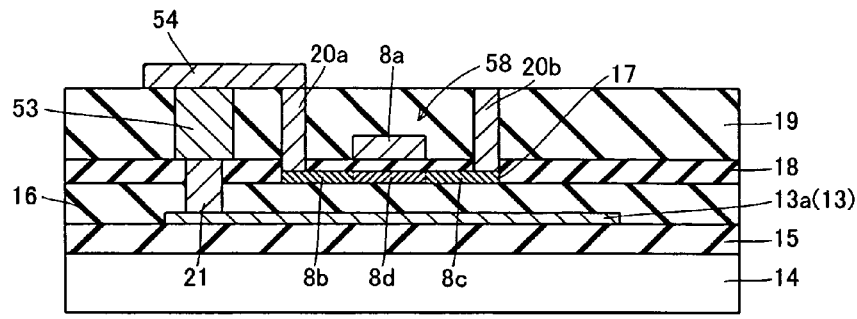
FIG. 15 is a sectional view showing the structure of a portion around an n-channel transistor of each pixel part of a liquid crystal display according to a third embodiment of the present invention.

The structure of a liquid crystal display according to a third embodiment of the present invention is described with reference to FIG. 15.

According to the third embodiment, a drain region 8*b* of an n-channel transistor 58 of each pixel part 6 and each pixel part shielding region 13*a* of a display part shielding film 13 are connected with each other, dissimilarly to the aforementioned first embodiment. The n-channel transistor 58 is an example of the "first transistor" in the present invention. More specifically, a second-layer plug 53 is provided on a first-layer plug 21 connected to the corresponding pixel part shielding region 13a of the display part shielding film 13, as shown in FIG. 15. A wiring layer 54 is formed on a region of an insulating film 19 corresponding to the second-layer plug 53. This wiring layer 54 is connected to the second-layer plug 53 and a plug 20a linked with the drain region 8b of the n-channel transistor 58. Thus, the drain region 8b of the n-channel transistor 58 and the corresponding pixel part shielding region 13a of the display part shielding film 13 are connected with each other through the plug 20a, the wiring layer 54 and the first- and second-layer plugs 21 and 53. The drain region 8b and the pixel part shielding region 13a may alternatively be directly connected with each other through the first-layer plug 21.

Thus, the liquid crystal display according to the third embodiment applies the same potential as that applied to the drain region 8b of the n-channel transistor 58 of the pixel part 6 to the corresponding pixel part shielding region 13a of the display part shielding film 13. According to the third embodiment, the pixel part shielding region 13a is parted from a wiring part shielding region 13b, and the liquid crystal display applies a proper potential (½(Vdd+Vss)) to the wiring part shielding region 13b. The remaining structure of the liquid crystal display according to the third embodiment is similar to that of the liquid crystal display according to the aforementioned first embodiment. The liquid crystal display according to the third embodiment applies a fixed potential ½(Vdd+Vbb) to a level conversion circuit shielding film, similarly to the aforementioned first embodiment. Further, the liquid crystal display according to the third embodiment applies another fixed potential ½(Vdd+Vss) to a shift register circuit shielding film of an H driver, a sampling transistor shielding film, a buffer shielding film, a DA converter shielding film, a clock generation circuit shielding film and a shift register circuit shielding film of a V driver, similarly to the aforementioned first embodiment.

Figure 16:
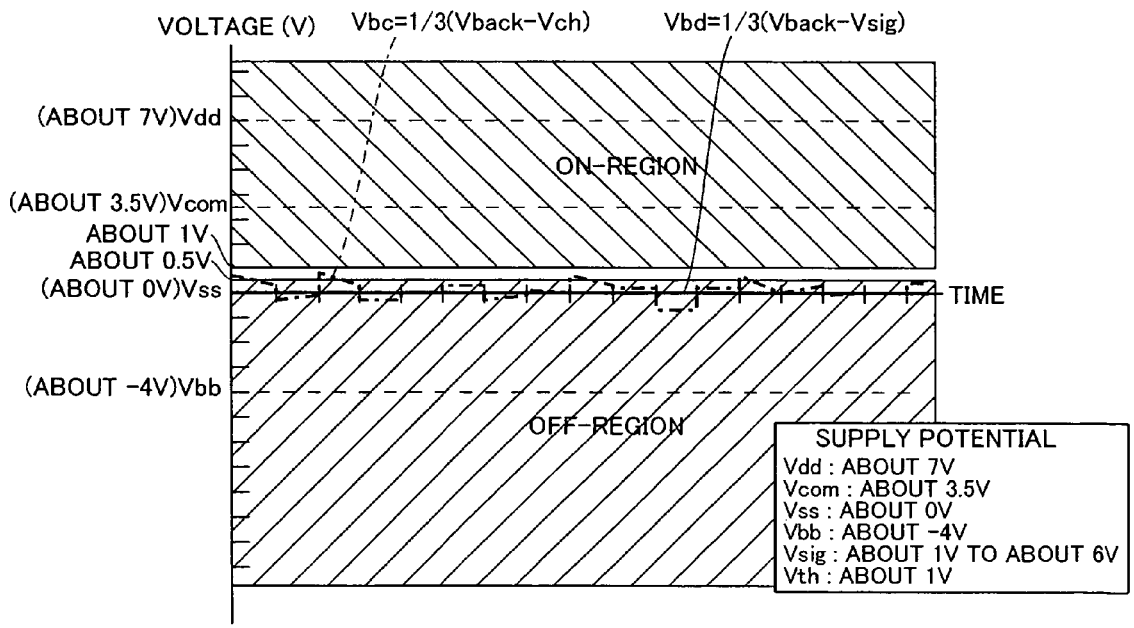
FIG. 16 is a voltage waveform diagram for illustrating operations of the n-channel transistor of the pixel part of the liquid crystal display according to the third embodiment of the present invention.
Figure 17:
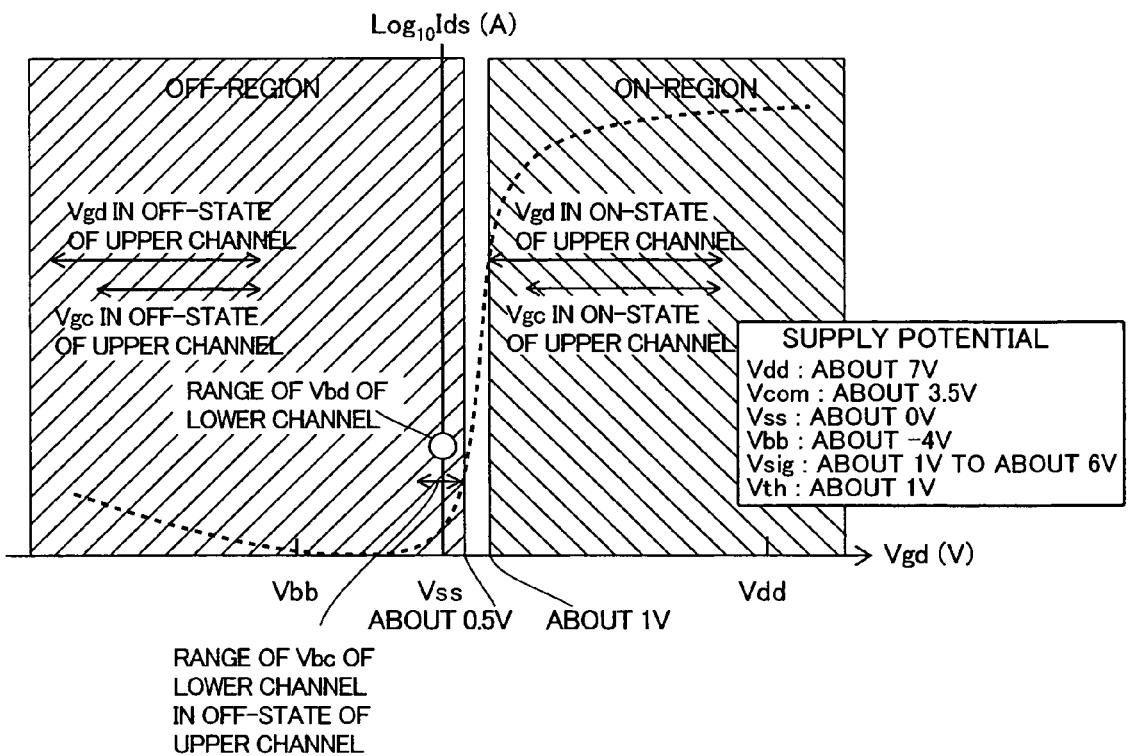
FIG. 17 illustrates current-voltage characteristics of the n-channel transistor of the pixel part of the liquid crystal display according to the third embodiment of the present invention.

Operations of the n-channel transistor 58 of the pixel part 6 in the liquid crystal display according to the third embodiment are now described with reference to FIGS. 15 to 17.

The liquid crystal display according to the third embodiment applies a gate potential Vgate and a signal potential Vsig similar to the gate potential Vgate and the signal potential Vsig according to the aforementioned first embodiment shown in FIG. 4 to a gate electrode 8a and the drain region 8b of the n-channel transistor 58 of the pixel part 6 respectively. At this time, the channel region 8d of the n-channel transistor 58 exhibits a potential Vch similar to the potential Vch of the channel region 8d according to the first embodiment shown in FIG. 4. Thus, voltages Vgd and Vgc between the gate electrode 8a and the drain region 8b and between the gate electrode 8a and a channel region 8d of the n-channel transistor 58 according to the third embodiment exhibit waveforms similar to those of the voltages Vgd and Vgc between the gate electrode 8a and the drain region 8b and between the gate electrode 8a and the channel region 8d of the n-channel transistor 8 according to the first embodiment shown in FIG. 5 respectively.

According to the third embodiment, the drain region 8b of the n-channel transistor 58 and the pixel part shielding region 13a of the display part shielding film 13 are connected with each other, so that the liquid crystal display applies the same potential as a signal potential Vsig applied to the drain region 8b to the pixel part shielding region 13a of the display part shielding film 13. Thus, an effective voltage Vbd=⅓(Vback−Vsig) between the pixel part shielding region 13a and the drain region 8b of the n-channel transistor 58 is about 0 V, as shown in FIG. 16. On the other hand, an effective voltage Vbc=⅓(Vback−Vch) between the pixel part shielding region 13a and the channel region 8d of the n-channel transistor 58 exhibits a waveform shown in FIG. 16.

Thus, the effective voltage (potential difference) Vbc between the pixel part shielding region 13a of the display part shielding film 13 and the channel region 8d of the n-channel transistor 58 according to the third embodiment changes in the range of about −0.3 V to about 0.8 V in an ON-state period of an upper channel of the n-channel transistor 58. In an OFF-state period of the upper channel of the n-channel transistor 58, on the other hand, the effective voltage (potential difference) Vbc between the pixel part shielding region 13a of the display part shielding film 13 and the channel region 8d of the n-channel transistor 58 according to the third embodiment changes in the range of about −0.7 V to about 0.4 V. In the OFF-state period of the upper channel of the n-channel transistor 58, therefore, the effective voltage Vbc (about −0.7 V to about 0.4 V) between the pixel part shielding region 13a and the channel region 8d is at a level (not more than about 0.5 V) in the OFF-region of the n-channel transistor 58, as shown in FIG. 17. Thus, the liquid crystal display inhibits the lower channel of the n-channel transistor 58 from entering an ON-state also when applying the same potential as the signal potential Vsig applied to the drain region 8b to the pixel part shielding region 13a of the display part shielding film 13 in the OFF-state period of the upper channel of the n-channel transistor 58. Therefore, the liquid crystal display inhibits current from flowing between the drain region 8b and a source region 8c through the lower channel of the n-channel transistor 58 in this period.

According to the third embodiment, as hereinabove described, the potential of the channel region 8d of the n-channel transistor 58 reaches a level corresponding to the potential (signal potential Vsig) of the drain region 8b in the voltage range where the potential (signal potential Vsig) of the drain region 8b changes in the OFF-state period of the upper channel of the n-channel transistor 58 of the pixel part 6. Thus, the liquid crystal display, connecting the pixel part shielding region 13a of the display part shielding film 13 and the drain region 8b of the n-channel transistor 58 of the corresponding pixel part 6 with each other, can control the effective voltage (potential difference) Vbc between the pixel part shielding region 13a of the display part shielding film 13 and the channel region 8d of the n-channel transistor 58 in the range of about −0.7 V to about 0.4 V in the OFF-state period of the upper channel of the n-channel transistor 58 by supplying the same potential as the signal potential Vsig applied to the drain region 8b of the n-channel transistor 58 of the corresponding pixel part 6 to the pixel part shielding region 13a of the pixel part shielding film 13. Therefore, the liquid crystal display can control the effective voltage (potential difference) Vbc between the pixel part shielding region 13a of the display part shielding film 13 and the channel region 8d of the n-channel transistor 58 in the voltage range (not more than about 0.5 V) of the OFF-region of the n-channel transistor 58. Thus, the liquid crystal display can inhibit the lower channel of the n-channel transistor 58 from entering an ON-state due to application of the same potential as the signal potential Vsig applied to the drain region 8b to the pixel part shielding region 13a of the display part shielding film 13 in the OFF-state period of the upper channel of the n-channel transistor 58. Therefore, the liquid crystal display can suppress occurrence of a malfunction.

According to the third embodiment, further, the pixel part shielding region 13a of the display part shielding film 13 and the drain region 8b of the n-channel transistor 58 are so connected with each other as to increase the electric capacitance of a drain line connected with the drain region 8b of the n-channel transistor 58 by the pixel part shielding region 13a of the display part shielding film 13. Thus, the liquid crystal display can sufficiently store charge of a video signal (signal potential Vsig) supplied to the drain line in the drain line and a portion linked with the drain line for contributing as the electric capacitance. The liquid crystal display can supply the sufficiently stored charge to each pixel through the n-channel transistor 58 in a period for turning on the n-channel transistor 58 by supplying a prescribed scanning signal from the gate line. Thus, the liquid crystal display can be improved in picture quality.

The remaining effects of the third embodiment are similar to those of the aforementioned first embodiment.

Fourth Embodiment

Figure 18:
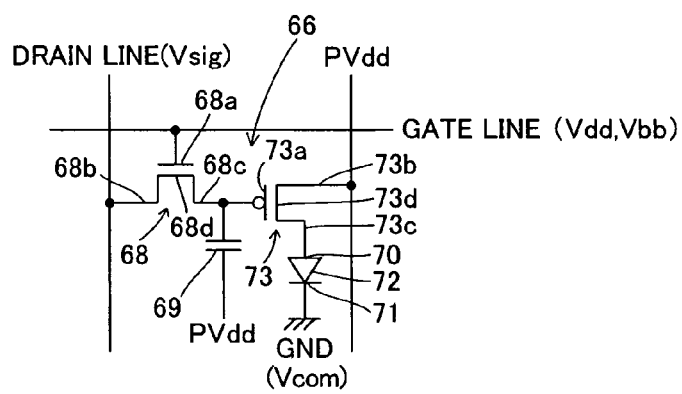
FIG. 18 is a circuit diagram of each pixel part of an organic EL display according to a fourth embodiment of the present invention.

Referring to FIG. 18, the present invention is applied to an organic EL display according to a fourth embodiment.

In the organic EL display according to the fourth embodiment, an n-channel transistor 68 serving as a switching element, an auxiliary capacitor 69, an anode 70, a cathode 71, an organic EL element 72 held between the anode 70 and the cathode 71 and a p-channel transistor 73 constitute a pixel part 66, as shown in FIG. 18. The pixel part 66 is an example of the "first region" or the "first circuit part" in the present invention, and the n-channel transistor 68 and the p-channel transistor 73 are examples of the "first transistor" in the present invention.

A gate line is connected to a gate electrode 68a of the n-channel transistor 68. The organic EL display applies positive and negative potentials Vdd and Vbb to the gate electrode 68a of the n-channel transistor 68 through this gate line. A drain region 68b of the n-channel transistor 68 is connected to a drain line, while a source region 68c thereof is connected to a first electrode of the auxiliary capacitor 69 and a gate electrode 73a of the p-channel transistor 73. The organic EL display applies a signal potential Vsig to the drain region 68b of the n-channel transistor 68 through the drain line. On the other hand, the organic EL display supplies a positive potential PVdd to a second electrode of the auxiliary capacitor 69. A drain region 73b of the p-channel transistor 73 is supplied with the positive potential PVdd while a source region 73c thereof is connected to the anode 70. The organic EL display supplies the ground potential GND(Vcom) common to each pixel part 66 to the cathode 71.

The organic EL display according to the fourth embodiment is also provided with a display part shielding film 13, shift register circuit shielding films 30 and 37, a sampling transistor shielding film 31, a buffer shielding film 32, a DA converter shielding film 33, a clock generation circuit shielding film 34 and a level conversion circuit shielding film 38 similar to those of the liquid crystal display according to the aforementioned first embodiment show in FIG. 1. In the organic EL display according to the fourth embodiment, a pixel part shielding region 13a of the display part shielding film 13 similar to that according to the first embodiment shown in FIG. 1 is provided to cover both of lower portions of the n-channel transistor 68 and the p-channel transistor 73 of the pixel part 66 (see FIG. 18). The organic EL display according to the fourth embodiment applies a fixed potential ½(Vdd+Vbb) to the display part shielding film 13 and the level conversion circuit shielding film 38 similar to those according to the first embodiment shown in FIG. 1. Further, the organic EL display according to the fourth embodiment applies a fixed potential ½(Vdd+Vss) to the shift register circuit shielding films 30 and 37, the sampling transistor shielding film 31, the buffer shielding film 32, the DA converter shielding film 33 and the clock generation circuit shielding film 34 similar to those according to the first embodiment shown in FIG. 1. The remaining structure of the organic EL display according to the fourth embodiment is similar to that of the liquid crystal display according to the aforementioned first embodiment.

Figure 26:
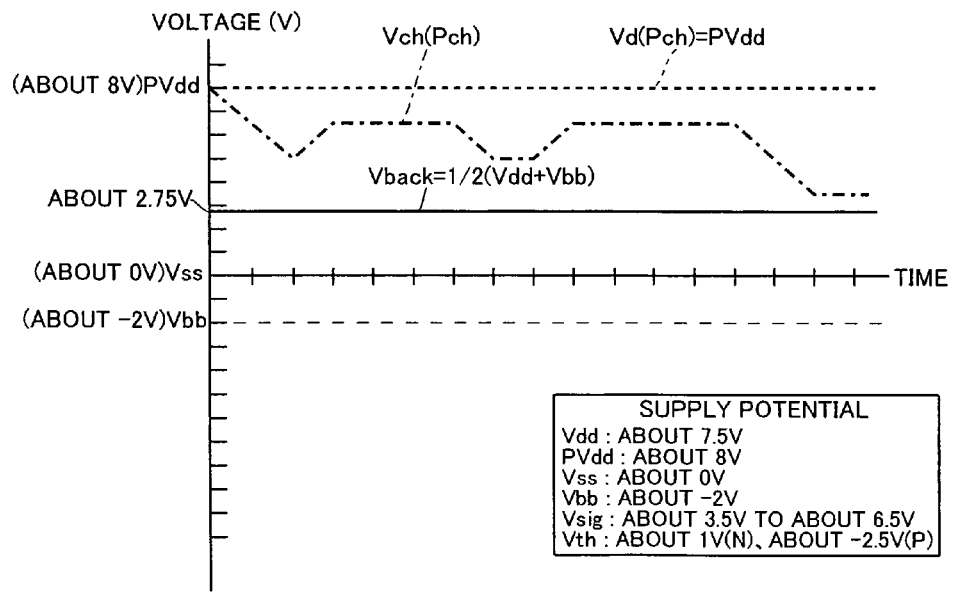
Figure 27:
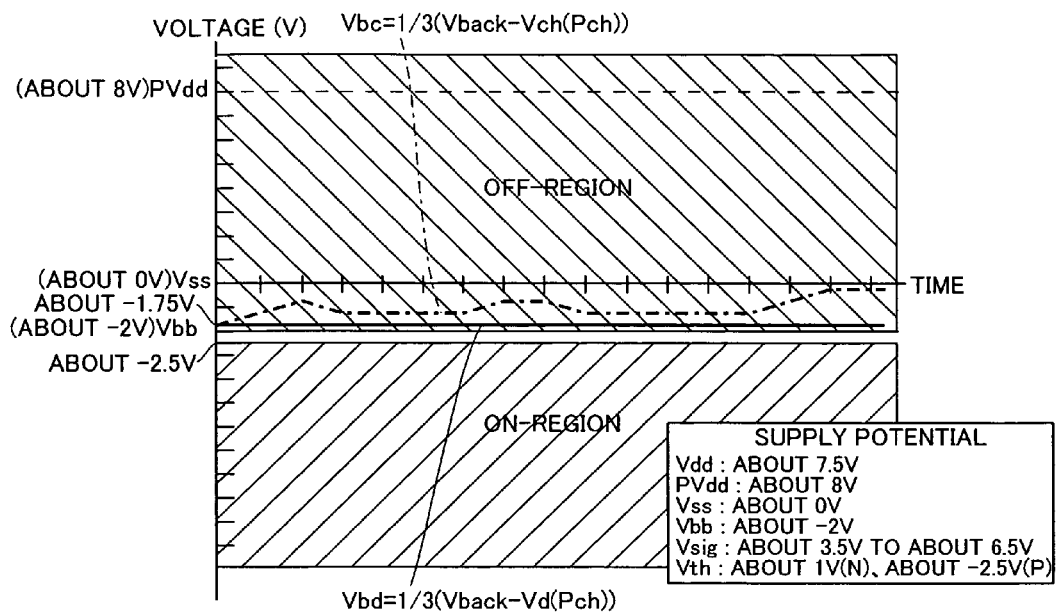
Figure 28:
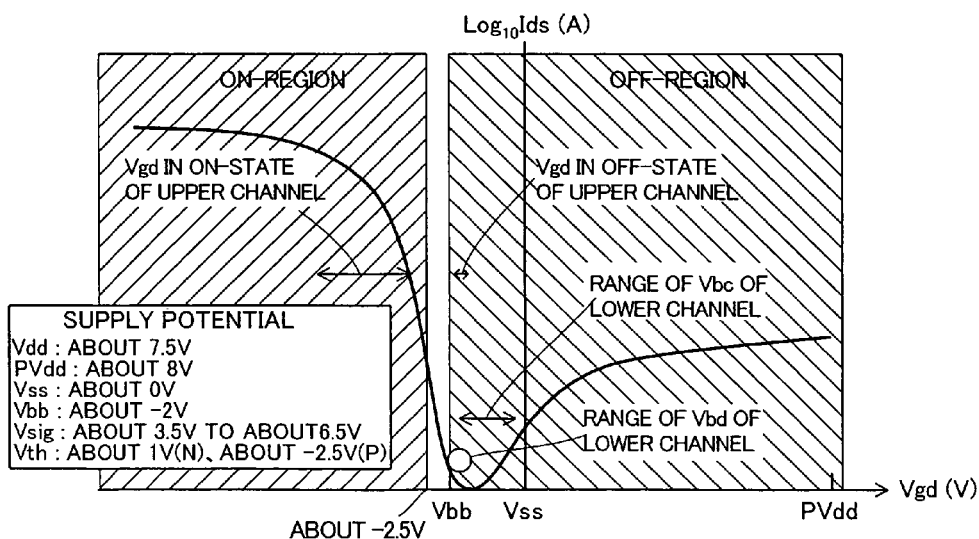
FIG. 28 illustrates current-voltage characteristics of the p-channel transistor of the pixel part of the organic EL display according to the fourth embodiment of the present invention.

FIGS. 24 to 27 are voltage waveform diagrams for illustrating operations of the p-channel transistor 73 of the pixel part 66 of the organic EL display according to the fourth embodiment of the present invention. FIG. 28 illustrates current-voltage characteristics of the p-channel transistor 73 of the pixel part 66 of the organic EL display according to the fourth embodiment of the present invention. Operations of the n-channel transistor 68 and the p-channel transistor 73 of the pixel part 66 of the organic EL display according to the fourth embodiment of the present invention are now described with reference to FIGS. 18 to 28.

The following description is made on the n-channel transistor 68 and the p-channel transistor 73 of the pixel part 66 of the organic EL display in a dot inversion driving system. The organic EL display set the positive potential Vdd supplied to the gate electrode 68a of the n-channel transistor 68 to about 7.5 V, the positive potential PVdd supplied to the drain region 73b of the p-channel transistor 73 to about 8 V, the negative potential Vbb to about −2 V and the signal potential Vsig to about 3.5 V to about 6.5 V respectively. It is assumed that the threshold voltage Vth of the n-channel transistor 68 is about 1 V, and the threshold voltage Vth of the p-channel transistor 73 is about −2.5 V. Thus, the n-channel transistor 68 enters an ON-state when the voltage between the gate electrode 68a and a channel region 68d is at least about 1 V, and the p-channel transistor 73 enters an ON-state when the voltage (potential difference) between the gate electrode 73a and a channel region 73d is not more than about −2.5 V. It is also assumed that the n-channel transistor 68 enters an OFF-state when the voltage between the gate electrode 68a and the channel region 68d is not more than about 0.5 V, and the p-channel transistor 73 enters an OFF-state when the voltage between the gate electrode 73a and the channel region 73d is at least about −2.0 V.

Figure 19:
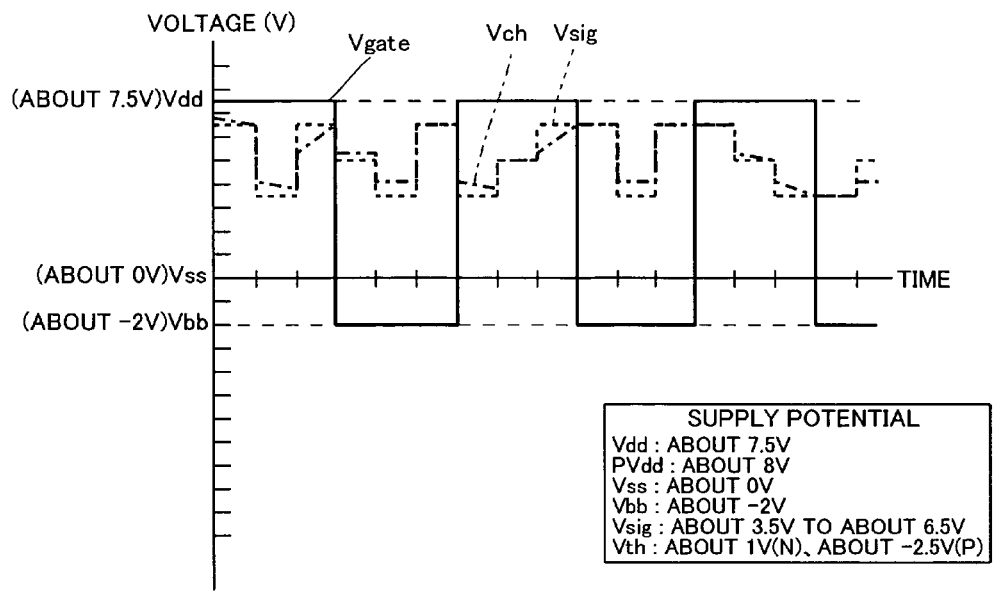
FIGS. 19 to 22 are voltage waveform diagrams for illustrating operations of an n-channel transistor of the pixel part of the organic EL display according to the fourth embodiment of the present invention.
Figure 20:
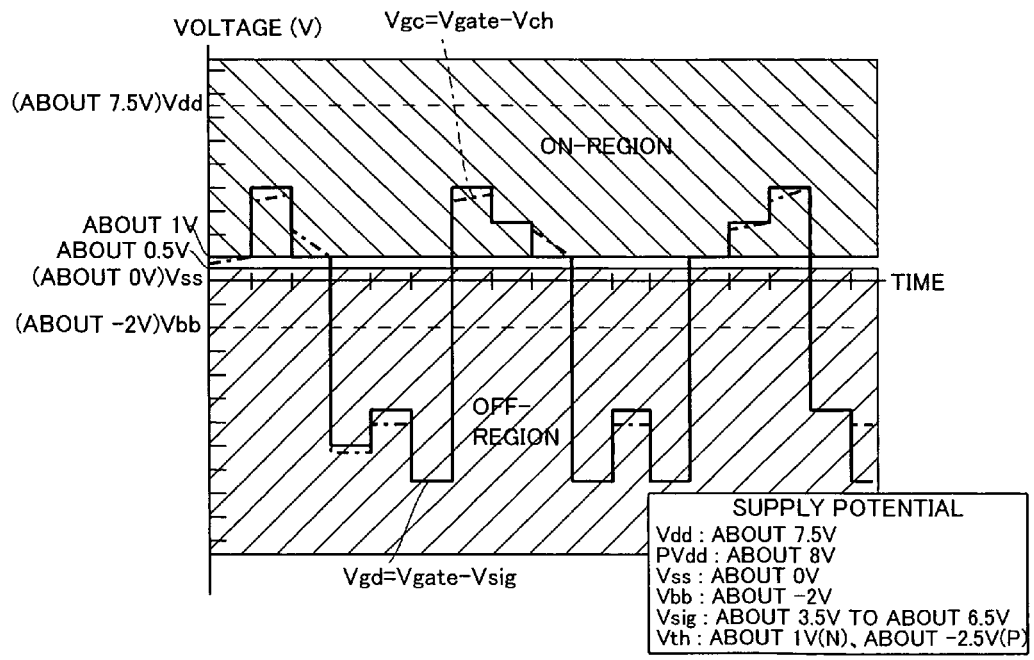

First, a potential (gate potential Vgate) input in the gate electrode 68a of the n-channel transistor 68 of the pixel part 66 alternately switches between the positive potential Vdd (about 7.5 V) and the negative potential Vbb (about −2 V), as shown in FIG. 19. The signal potential Vsig input in the drain region 68b of the n-channel transistor 68 changes in the range of about 3.5 V to about 6.5 V. At this time, the potential Vch of the channel region 68d of the n-channel transistor 68 exhibits a waveform shown in FIG. 19, and changes in the range of about 3.5 V to about 6.8 V. FIG. 18 shows the potential Vch around the center of the channel region 68d. In this case, the voltage Vgd=Vgate−Vsig between the gate electrode 68a and the drain region 68b of the n-channel transistor 68 and the voltage Vgc=Vgate−Vch between the gate electrode 68a and the channel region 68d thereof change in waveforms shown in FIG. 20.

While the gate potential Vgate (see FIG. 19) is at the positive potential Vdd (about 7.5 V), therefore, the voltage (potential difference) Vgc (see FIG. 20) between the gate electrode 68a and the channel region 68d of the n-channel transistor 68 is in the range of about 0.7 V to about 4 V. In other words, the voltage Vgc (about 1 V to about 4 V) between the gate electrode 68a and the channel region 68d is at a level (at least about 1 V) in the ON-region of the n-channel transistor 68 in this period except that between an initial state and application of a first voltage pulse of the signal potential Vsig, whereby the n-channel transistor 68 enters an ON-state. While the gate potential Vgate (see FIG. 19) is at the negative potential Vbb (about −2 V), on the other hand, the voltage (potential difference) Vgc (see FIG. 20) between the gate electrode 68a and the channel region 68d of the n-channel transistor 68 is in the range of about −8.5 V to about −5.5 V. In other words, the voltage Vgc (about −8.5 V to about −5.5 V) between the gate electrode 68a and the channel region 68d is at a level (not more than about 0.5 V) in the OFF-region of the n-channel transistor 68 in this period, whereby the n-channel transistor 68 enters an OFF-state.

Figure 21:
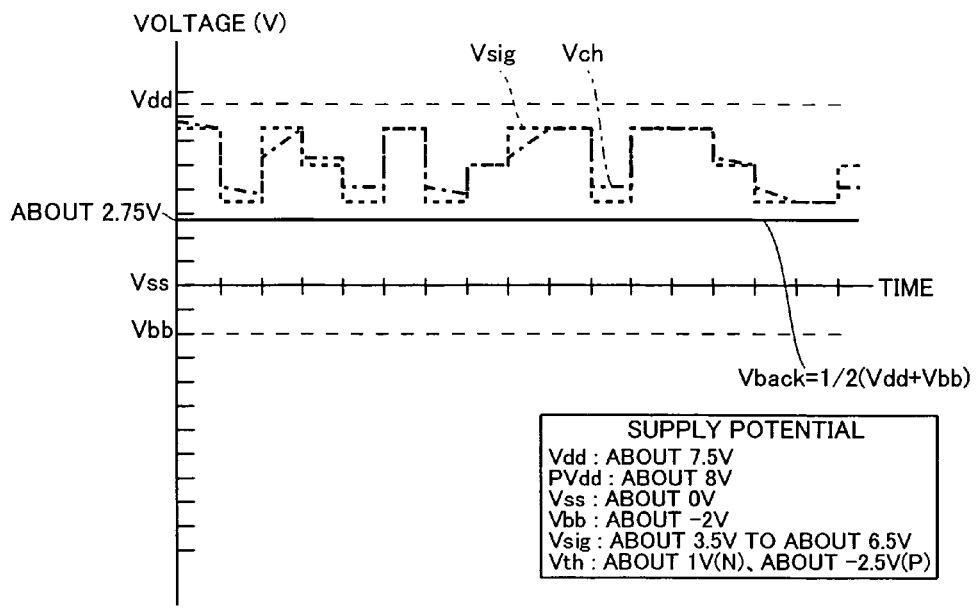
Figure 22:
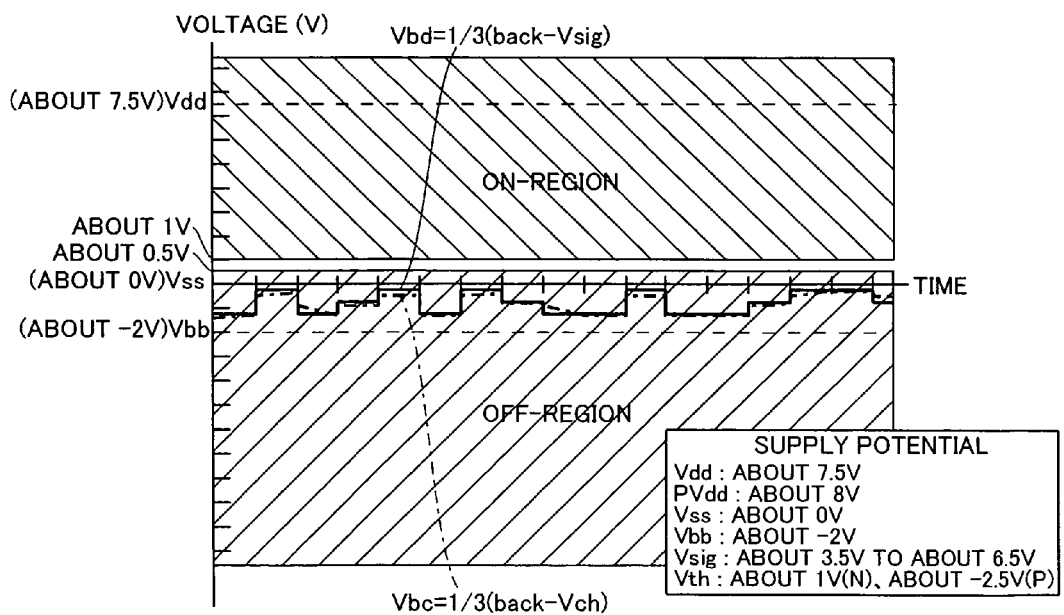
Figure 23:
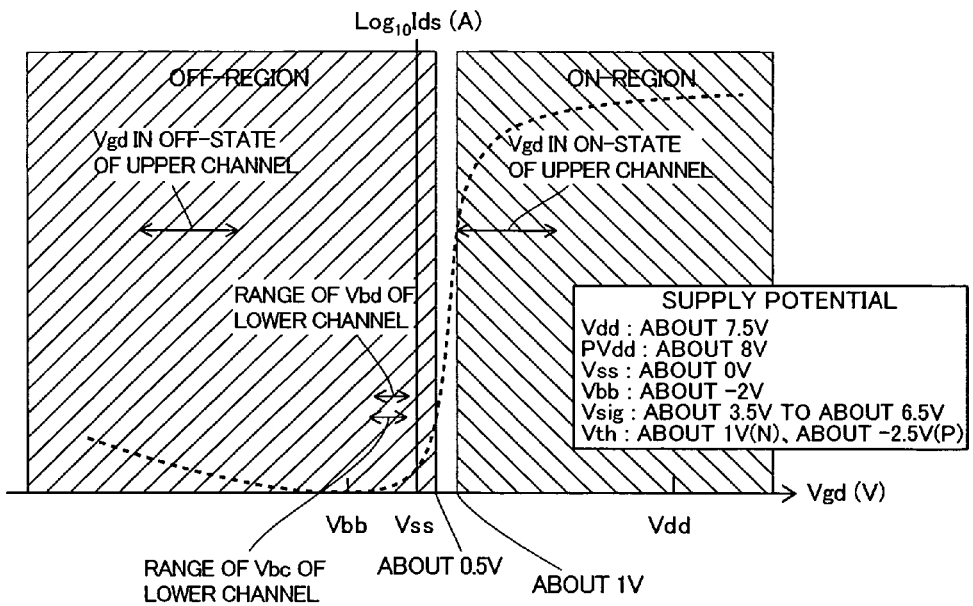
FIG. 23 illustrates current-voltage characteristics of the n-channel transistor of the pixel part of the organic EL display according to the fourth embodiment of the present invention.

According to the fourth embodiment, the organic EL display applies the fixed potential ½(Vdd+Vbb) to the pixel part shielding region 13a of the display part shielding film 13 provided to cover the n-channel transistor 68 of the pixel part 66. Thus, the organic EL display fixes the potential Vback of the pixel part shielding region 13a of the display part shielding film 13 to ½(Vdd+Vbb)=about 2.75 V, as shown in FIG. 21. At this time, the effective voltage (potential difference) Vbd=⅓(Vback−Vsig) between the pixel part shielding region 13a and the drain region 68b of the n-channel transistor 68 and the effective voltage (potential difference) Vbc=⅓(Vback−Vch) between the pixel part shielding region 13a and the channel region 68d of the n-channel transistor 68 exhibit waveforms shown in FIG. 22 respectively. The effective voltage Vbc between the pixel part shielding region 13a and the channel region 68d of the n-channel transistor 68 changes in the range of about −1.4 V to about −0.3 V, as shown in FIG. 22. Thus, the effective voltage Vbc (about −1.4 V to about 0.3 V) between the pixel part shielding region 13a and the channel region 68d is regularly at a level (not more than about 0.5 V) in the OFF-region of the n-channel transistor 68. Therefore, the organic EL display inhibits a lower channel of the n-channel transistor 68 from entering an ON-state also when applying the potential ½(Vdd+Vbb) to the pixel part shielding region 13a of the display part shielding film 13 while holding an upper channel of the n-channel transistor 68 in an OFF-state. Thus, the organic EL display inhibits current from flowing between the drain region 68b and the source region 68c through the lower channel of the n-channel transistor 68 in this period.

Figure 24:
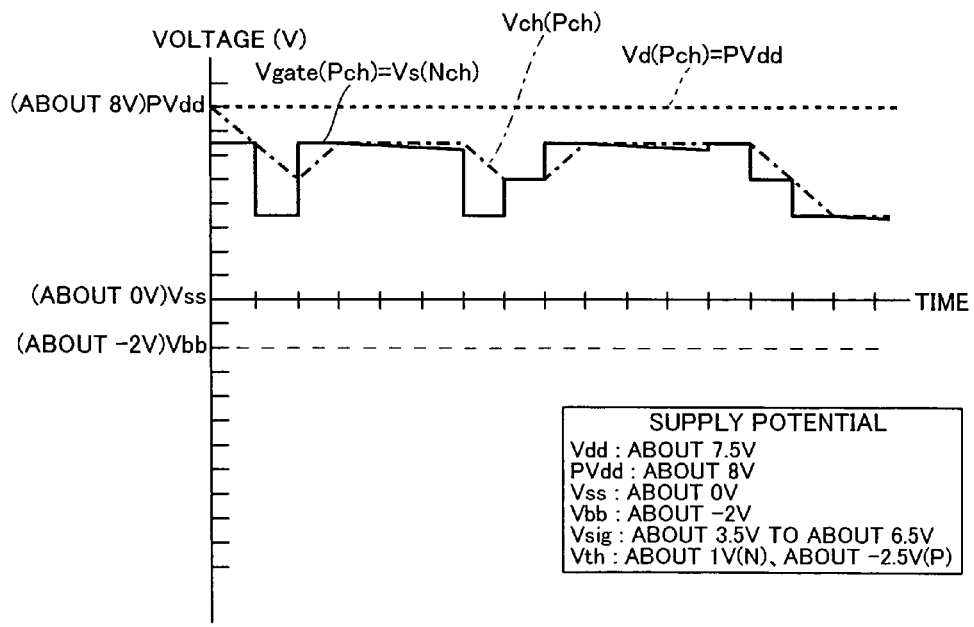
FIGS. 24 to 27 are voltage waveform diagrams for illustrating operations of a p-channel transistor of the pixel part of the organic EL display according to the fourth embodiment of the present invention.
Figure 25:
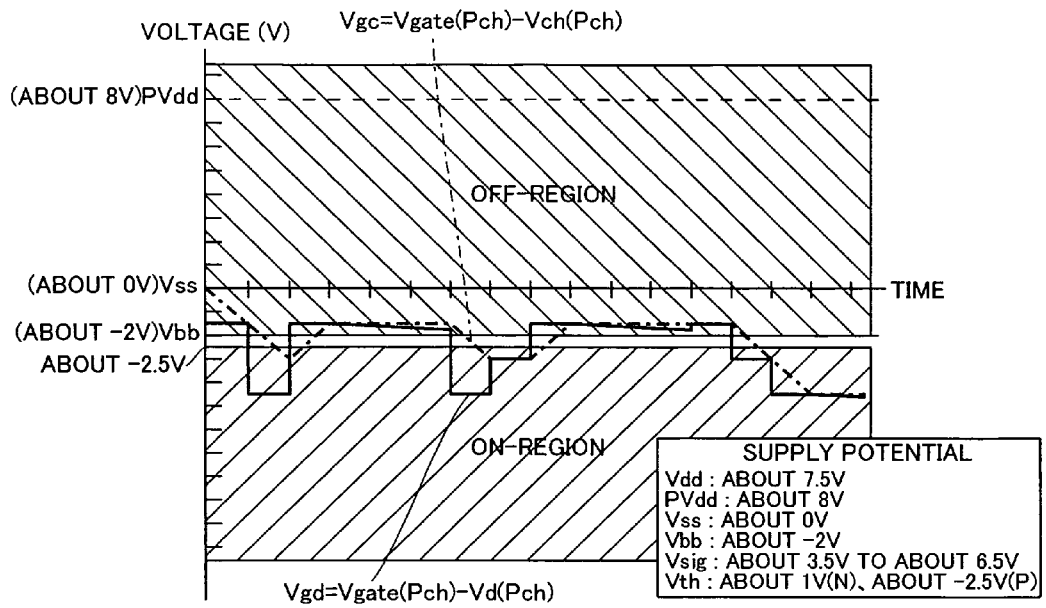

As shown in FIG. 24, a potential (gate potential Vgate(Pch) =source potential Vs of the n-channel transistor 68) input in the gate electrode 73a of the p-channel transistor 73 of the pixel part 66 changes in the range of about 3.5 V to about 6.5 V. The organic EL display applies the positive potential PVdd (about 8 V) to the drain region 73b of the p-channel transistor 73. At this time, the potential Vch of the channel region 73d of the p-channel transistor 73 exhibits a waveform shown in FIG. 24. Thus, the voltage (potential difference) Vgd=Vgate (Pch)−Vd(Pch) between the gate electrode 73a and the drain region 73b of the p-channel transistor 73 and the voltage (potential difference) Vgc=Vgate(Pch)−Vch(Pch) between the gate electrode 73a and the channel region 73d thereof change in waveforms shown in FIG. 25. The p-channel transistor 73 is in an ON-state while the voltage Vgc between the gate electrode 73a and the channel region 73d is at a level (not more than about −2.5 V) in the ON-region of the p-channel transistor 73. On the other hand, the p-channel transistor 73 is in an OFF-state while the voltage Vgc between the gate electrode 73a and the channel region 73d is at a level (at least about −2 V) in the OFF-region of the p-channel transistor 73.

According to the fourth embodiment, the organic EL display applies the potential ½(Vdd+Vbb)=about 2.75 V to the pixel part shielding region 13a of the display part shielding film 13 provided to cover the p-channel transistor 73 of the pixel part 66. Thus, the organic EL display according to the fourth embodiment fixes the potential Vback of the pixel part shielding region 13a to about 2.75 V, as shown in FIG. 26. At this time, the effective voltage (potential difference) Vbd=⅓(Vback−Vd(Pch)) between the pixel part shielding region 13a and the drain region 73b of the p-channel transistor 73 is about −1.75 V, as shown in FIG. 27. The effective voltage (potential difference) Vbc=⅓(Vback−Vch(Pch)) between the pixel part shielding region 13a and the channel region 73d of the p-channel transistor 73 exhibits a waveform shown in FIG. 27, and reaches the range of about −1.75 V to about −0.25 V. Thus, the effective voltage (potential difference) Vbc (about −1.75 V to about −0.25 V) between the pixel part shielding region 13a and the channel region 73d of the p-channel transistor 73 is regularly at a level (at least about −2 V) in the OFF-region of the p-channel transistor 73, as shown in FIG. 28. Therefore, the organic EL display inhibits the lower channel of the p-channel transistor 73 from entering an ON-state when applying the potential ½(Vdd+Vbb) to the pixel part shielding region 13a of the display part shielding film 13 while holding the upper channel of the p-channel transistor 73 in an OFF-state. Thus, the organic EL display inhibits current from flowing between the drain region 73b and the source region 73c through the lower channel of the p-channel transistor 73 in this period.

According to the fourth embodiment, as hereinabove described, the organic EL display can fix the display part shielding film 13 and the level conversion circuit shielding film 38 to the potential ½(Vdd+Vbb) and fix the shift register circuit shielding films 30 and 37, the sampling transistor shielding film 31, the buffer shielding film 32, the DA converter shielding film 33 and the clock generation circuit shielding film 34 to the potential ½(Vdd+Vss) by supplying the potential ½(Vdd+Vbb) to the display part shielding film 13 and the level conversion circuit shielding film 38 while supplying the potential ½(Vdd+Vss) to the shift register circuit shielding films 30 and 37, the sampling transistor shielding film 31, the buffer shielding film 32, the DA converter shielding film 33 and the clock generation circuit shielding film 34. Thus, no potentials fluctuate in the display part shielding film 13, the level conversion circuit shielding film 38, the shift register circuit shielding films 30 and 37, the sampling transistor shielding film 31, the buffer shielding film 32, the DA converter shielding film 33 and the clock generation circuit shielding film 34, whereby the organic EL display can inhibit the threshold voltages of the n-channel transistor 68 and the p-channel transistor 73 of the pixel part 66 and n-channel transistors included in a level conversion circuit 36, shift register circuits 25 and 35, a sampling transistor 26, a buffer 27, a DA converter 28 and a clock generation circuit 29 respectively from fluctuation following potential fluctuation in these shielding films. Therefore, the organic EL display can stabilize operations of the n-channel transistor 68 and the p-channel transistor 73 of the corresponding pixel part 66 and the n-channel transistors included in the level conversion circuit 36, the shift register circuits 25 and 35, the sampling transistor 26, the buffer 27, the DA converter 28 and the clock generation circuit 29 respectively.

Further, the organic EL display according to the fourth embodiment can inhibit the voltages (potential difference) between the aforementioned shielding films and the n-channel transistor 68 and the p-channel transistor 73 of the corresponding pixel part 66 and the n-channel transistors included in the level conversion circuit 36, the shift register circuits 25 and 35, the sampling transistor 26, the buffer 27, the DA converter 28 and the clock generation circuit 29 respectively from exceeding the threshold voltages Vth of the aforementioned n- and p-channel transistors by supplying the potential ½(Vdd+Vbb) to the pixel part shielding region 13a of the display part shielding film 13 and the level conversion circuit shielding film 38 while supplying the potential ½(Vdd+Vss) to the shift register circuit shielding films 30 and 37, the sampling transistor shielding film 31, the buffer shielding film 32, the DA converter shielding film 33 and the clock generation circuit shielding film 34. Thus, the organic EL display can inhibit the lower channels of the n-channel transistor 68 and the p-channel transistor 73 of the pixel part 66 and the lower channels of the n-channel transistors of the level conversion circuit 36, the shift register circuits 25 and 35, the sampling transistor 26, the buffer 27, the DA converter 28 and the clock generation circuit 29 from entering ON-states also when supplying the potential ½(Vdd+Vbb) to the pixel part shielding region 13a of the display part shielding film 13 and the level conversion circuit shielding film 38 while supplying the potential ½(Vdd+Vss) to the shift register circuit shielding films 30 and 37, the sampling transistor shielding film 31, the buffer shielding film 32, the DA converter shielding film 33 and the clock generation circuit shielding film 34. Therefore, the organic EL display can suppress occurrence of a malfunction resulting from turn-on of the lower channels of the aforementioned n- and p-channel transistors caused by potentials supplied to the corresponding shielding films while holding the upper channels of the n-channel transistor 68 and the p-channel transistor 73 of the pixel part 66 and the upper channels of the n-channel transistors of the level conversion circuit 36, the shift register circuits 25 and 35, the sampling transistor 26, the buffer 27, the DA converter 28 and the lock generation circuit 29 in OFF-states due to power supply to the corresponding shielding films.

The remaining effects of the fourth embodiment are similar to those of the aforementioned first embodiment.

Fifth Embodiment

An organic EL display according to a fifth embodiment of the present invention applies the same potentials as those applied to the gate electrodes 68a and 73a of an n-channel transistor 68 and a p-channel transistor 73 of a corresponding pixel part 66 to a pixel part shielding region 13a of a display part shielding film 13, dissimilarly to the aforementioned fourth embodiment.

In the organic EL display according to the fifth embodiment, each pixel part 66 a structure similar to that of the pixel part 66 according to the fourth embodiment shown in FIG. 18. In each of the n-channel transistor 68 and the p-channel transistor 73 of the pixel part 66 according to the fifth embodiment, however, the gate electrode 68a or 73a similar to the gate electrode 48a according to the second embodiment shown in FIG. 12 is connected with the pixel part shielding region 13a of the display part shielding film 13 through a plug 21 and an intermediate wiring layer 42. According to the fifth embodiment, the pixel part shielding regions 13a connected to the gate electrodes 68a (73a) of a plurality of n-channel transistors 68 (p-channel transistors 73) connected to a gate line and other pixel part shielding regions 13a connected to the gate electrodes 68a (73a) of a plurality of n-channel transistors 68 (p-channel transistors 73) connected to another gate line are electrically parted from each other. Thus, the organic EL display applies the same potentials to the gate electrodes 68a and 73a of the n-channel transistor 68 and the p-channel transistor 73 of the pixel part 66, similar to that according to the fourth embodiment shown in FIG. 18, and the corresponding pixel part shielding region 13a of the display part shielding film 13. The remaining structure of the organic EL display according to the fifth embodiment is similar to that of the organic EL display according to the aforementioned fourth embodiment.

The organic EL display according to the fifth embodiment applies a fixed potential ½(Vdd+Vbb) to a level conversion circuit shielding film, similarly to the aforementioned fourth embodiment. Further, the organic EL display according to the fifth embodiment applies a fixed potential ½(Vdd+Vss) to a shift register circuit shielding film of an H driver, a sampling transistor shielding film, a buffer shielding film, a DA converter shielding film, a clock generation circuit shielding film and a shift register circuit shielding film of a V driver, similarly to the aforementioned fourth embodiment.

Operations of the n-channel transistor 68 and the p-channel transistor 73 of each pixel part 66 in the organic EL display according to the fifth embodiment are now described with reference to FIGS. 29 to 32.

The organic EL display according to the fifth embodiment applies a gate potential Vgate and a signal potential Vsig similar to the gate potential Vgate and the signal potential Vsig according to the aforementioned fourth embodiment shown in FIG. 19 to a gate electrode 68a and a drain region 68b of the n-channel transistor 68 of the pixel part 66 respectively. Thus, the organic EL display according to the fifth embodiment applies a potential Vch similar to the potential Vch of the channel region 68d according to the fourth embodiment shown in FIG. 19 to a channel region 68d of the n-channel transistor 68. Therefore, the organic EL display operates on an upper channel of the n-channel transistor 68 of the pixel part 66 similarly to the aforementioned fourth embodiment.

Figure 29:
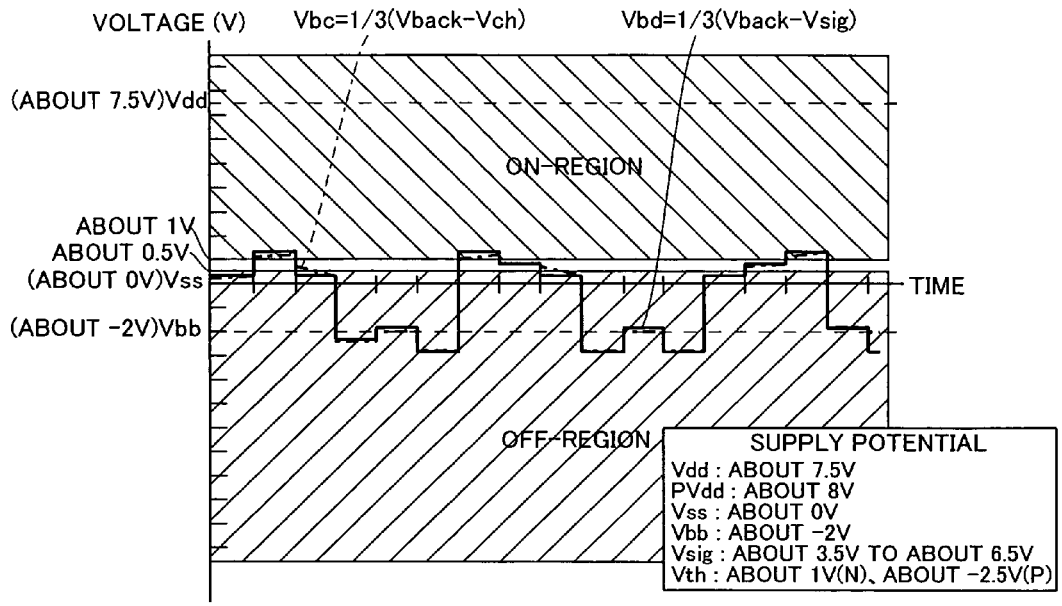
FIG. 29 is a voltage waveform diagram for illustrating operations of an n-channel transistor of a pixel part of an organic EL display according to a fifth embodiment of the present invention.

According to the fifth embodiment, the gate electrode 68a of the n-channel transistor 68 is connected with the corresponding pixel part shielding region 13a of the display part shielding film 13, whereby the organic EL display applies the potential Vgate applied to the gate electrodes 68a of the plurality of n-channel transistors 68 connected to the same gate line to the pixel part shielding regions 13a connected with the gate electrodes 68a of these plurality of n-channel transistors 68 respectively. In other words, a potential Vback applied to each pixel part shielding region 13a of the display part shielding film 13 according to the fifth embodiment exhibits a waveform similar to that of the gate potential Vgate of the n-channel transistor 68 according to the fourth embodiment shown in FIG. 19. In a period for applying a positive potential Vdd to the gate electrode 68a of the n-channel transistor 68, the organic EL display according to the fifth embodiment applies the positive potential Vdd also to the corresponding pixel part shielding region 13a. In a period for applying a negative potential Vbb to the gate electrode 68a of the n-channel transistor 68, on the other hand, the organic EL display applies the negative potential Vbb also to the corresponding pixel part shielding region 13a. According to the fifth embodiment, the effective voltage Vbd=⅓(Vback−Vsig) between the pixel part shielding region 13a of the display part shielding film 13 and the drain region 68b of the n-channel transistor 68 exhibits a waveform obtained by reducing the waveform of the voltage Vgd between the gate electrode 68a and the drain region 68b of the n-channel transistor 68 according to the fourth embodiment shown in FIG. 20 to ⅓, as shown in FIG. 29. According to the fifth embodiment, further, the effective voltage Vbc=⅓(Vback−Vch) between the pixel part shielding region 13a of the display part shielding film 13 and the channel region 68d of the n-channel transistor 68 exhibits a waveform obtained by reducing the waveform of the voltage Vgc between the gate electrode 68a and the channel region 68d of the n-channel transistor 68 according to the fourth embodiment shown in FIG. 20 to ⅓, as shown in FIG. 29.

Figure 30:
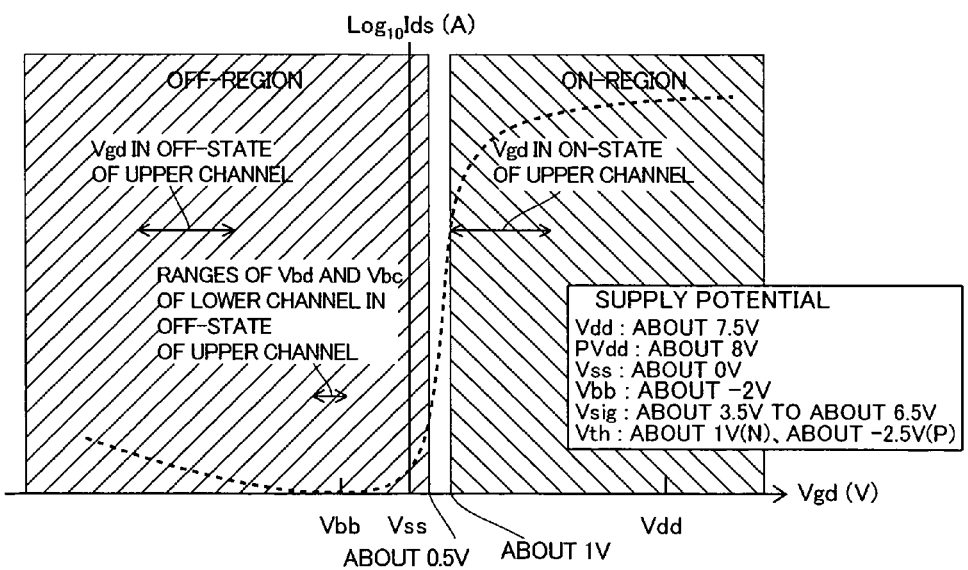
FIG. 30 illustrates current-voltage characteristics of the n-channel transistor of the pixel part of the organic EL display according to the fifth embodiment of the present invention.

In an ON-state period of the upper channel of the n-channel transistor 68, therefore, the effective voltage (potential difference) Vbc between the pixel part shielding region 13a of the display part shielding film 13 and the channel region 68d of the n-channel transistor 68 changes in the range of about 0.2 V to about 1.3 V in the organic EL display according to the fifth embodiment. In an OFF-state period of the upper channel of the n-channel transistor 68, on the other hand, the effective voltage (potential difference) Vbc between the pixel part shielding region 13a of the display part shielding film 13 and the channel region 68d of the n-channel transistor 68 changes in the range of about −2.8 V to about −1.8 V in the organic EL display according to the fifth embodiment. Thus, the effective voltage (about −2.8 V to about −1.8 V) Vbc between the pixel part shielding region 13a and the channel region 68d is at a level (not more than about 0.5 V) in the OFF-region of the n-channel transistor 68 in the OFF-state period of the upper channel of the n-channel transistor 68, as shown in FIG. 30. Therefore, the organic EL display inhibits a lower channel of the n-channel transistor 68 from entering an ON-state in the OFF-state period of the upper channel of the n-channel transistor 68. Thus, the organic EL display inhibits current from flowing between the drain region 68b and a source region 68c through the lower channel of the n-channel transistor 68 in this period.

Then, the organic EL display according to the fifth embodiment applies a gate potential Vgate(Pch) and a positive potential PVdd identical to those according to the fourth embodiment shown in FIG. 24 to the gate electrode 73a and a drain region 73b of the p-channel transistor 73 of the pixel part 66 respectively. Thus, the organic EL display according to the fifth embodiment applies a potential Vch similar to that of the channel region 73d according to the fourth embodiment shown in FIG. 24 to a channel region 73d of the p-channel transistor 73. Therefore, the organic EL display operates on an upper channel of the p-channel transistor 73 of the pixel part 66 similarly to the operation on the p-channel transistor 73 according to the aforementioned fourth embodiment.

Figure 31:
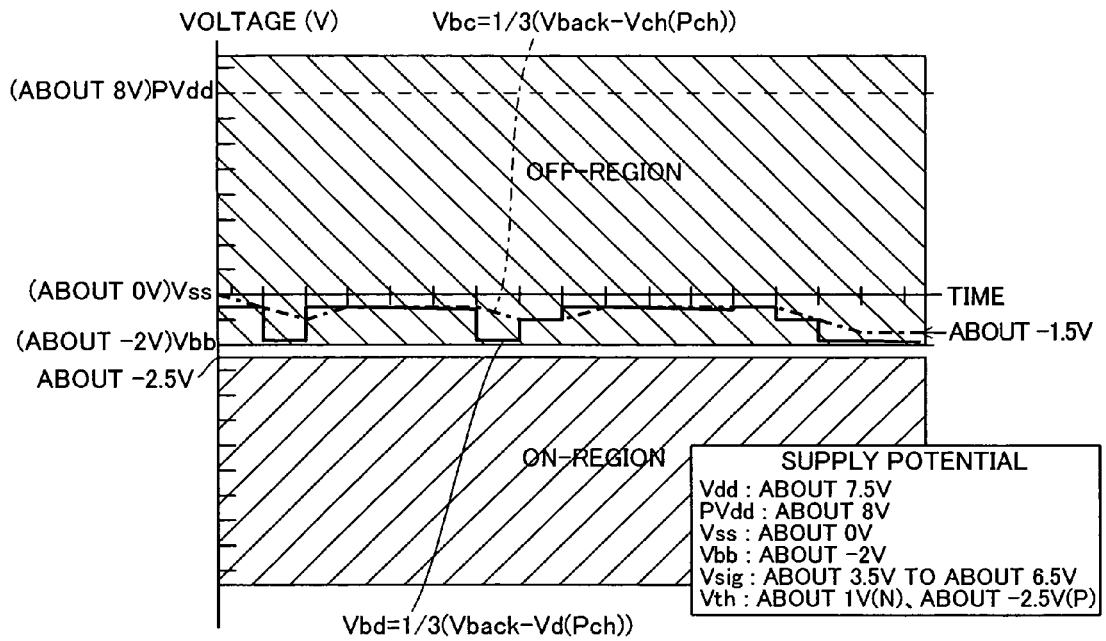
FIG. 31 is a voltage waveform diagram for illustrating operations of a p-channel transistor of the pixel part of the organic EL display according to the fifth embodiment of the present invention.

According to the fifth embodiment, the gate electrode 73a of the p-channel transistor 73 is connected with the pixel part shielding region 13a of the display part shielding film 13, whereby the organic EL display applies the same potential as the gate potential Vgate(Pch) applied to the gate electrode 73a to the pixel part shielding region 13a of the display part shielding film 13. In other words, the potential Vback applied to the pixel part shielding region 13a of the display part shielding film 13 exhibits a waveform similar to that of the gate potential Vgate(Pch) according to the fourth embodiment shown in FIG. 24. Thus, the effective voltage Vbd=⅓(Vback−Vd(Pch)) between the pixel part shielding region 13a of the display part shielding film 13 and the drain region 73b of the p-channel transistor 73 exhibits a waveform obtained by reducing the waveform of the voltage Vgd between the gate electrode 73a and the drain region 73b of the p-channel transistor 73 according to the fourth embodiment shown in FIG. 25 to ⅓, as shown in FIG. 31. According to the fifth embodiment, further, the effective voltage Vbc=⅓(Vback−Vch(Pch)) between the pixel part shielding region 13a of the display part shielding film 13 and the channel region 73d of the p-channel transistor 73 according to the fifth embodiment exhibits a waveform obtained by reducing the waveform of the voltage Vgc between the gate electrode 73a and the channel region 73d of the p-channel transistor 73 according to the fourth embodiment shown in FIG. 25 to ⅓, as shown in FIG. 31.

Figure 32:
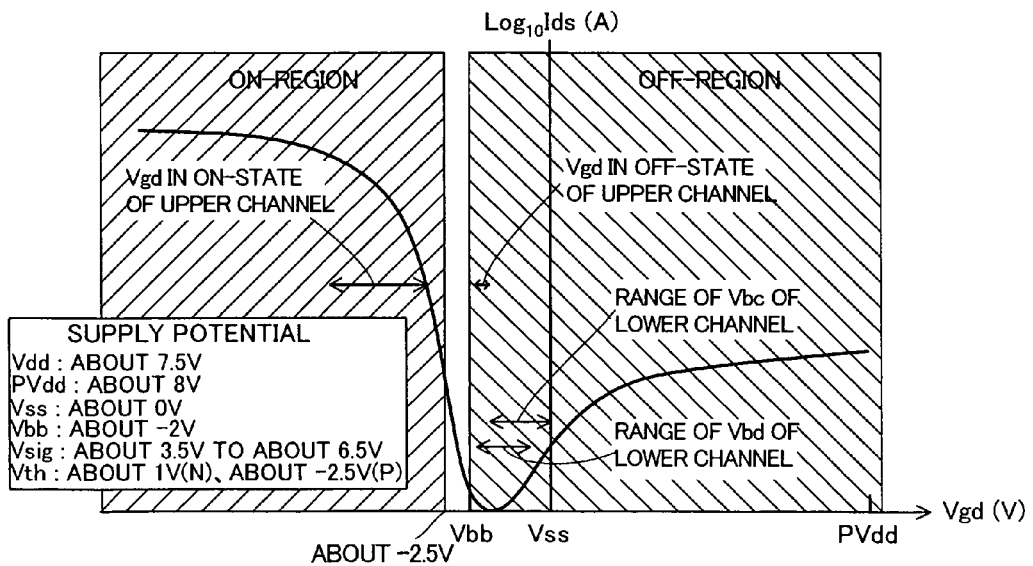
FIG. 32 illustrates current-voltage characteristics of the p-channel transistor of the pixel part of the organic EL display according to the fifth embodiment of the present invention.

According to the fifth embodiment, therefore, the effective voltage Vbc between the pixel part shielding region 13a of the display part shielding film 13 and the channel region 73d of the p-channel transistor 73 changes in the range of about −1.5 V to about 0 V, as shown in FIG. 31. Thus, the effective voltage Vbc (about −1.5 V to about 0 V) between the pixel part shielding region 13a and the channel region 73d of the p-channel transistor 73 is at a level (at least about −2 V) in the OFF-region of the p-channel transistor 73 according to the fifth embodiment, as shown in FIG. 32. Therefore, the organic EL display inhibits a lower channel of the p-channel transistor 73 from entering an ON-state in an OFF-state period of the upper channel of the p-channel transistor 73. Thus, the organic EL display inhibits current from flowing between the drain region 73b and the source region 73c through the lower channel of the p-channel transistor 73 in this period.

According to the fifth embodiment, as hereinabove described, the pixel part shielding region 13a of the display part shielding film 13 and the gate electrode 68a of the n-channel transistor 68 of the corresponding pixel part 66 are so connected with each other that the organic EL display can inhibit the lower channel of the n-channel transistor 68 from entering an ON-state due to the negative potential Vbb supplied also to the pixel part shielding region 13a while holding the upper channel of the n-channel transistor 68 in an OFF-state by applying the negative potential Vbb to the gate electrode 68a, by supplying the same potential as the gate potential Vgate of the n-channel transistor 68 of the corresponding pixel part 66 to the pixel part shielding region 13a of the display part shielding film 13. Thus, the organic EL display can suppress occurrence of a malfunction.

According to the fifth embodiment, the pixel part shielding region 13a of the display part shielding film 13 and the gate electrode 73a of the p-channel transistor 73 of the corresponding pixel part 66 are so connected with each other that the organic EL display can inhibit the lower channel of the p-channel transistor 73 from entering an ON-state while holding the upper channel of the p-channel transistor 73 in an OFF-state by supplying the same potential as the gate potential Vgate of the p-channel transistor 73 of the corresponding pixel part 66 to the pixel part shielding region 13a of the display part shielding film 13. Therefore, the organic EL display can suppress occurrence of a malfunction.

According to the fifth embodiment, as hereinabove described, the pixel part shielding region 13a of the display part shielding film 13 and the gate electrode 68a of the n-channel transistor 68 (gate electrode 73a of the p-channel transistor 73) of the corresponding pixel part 66 are so connected with each other that the organic EL display can employ the pixel part shielding region 13a of the display part shielding film 13 as the gate electrode of the n-channel transistor 68 (p-channel transistor 73) of the pixel part 66 by supplying the same potential as that applied to the gate electrode 68a of the n-channel transistor 68 (gate electrode 73a of the p-channel transistor 73) of the corresponding pixel part 66 to the pixel part shielding region 13a of the display part shielding film 13. Thus, the organic EL display can drive the n-channel transistor 68 with both of the gate electrode 68a of the n-channel transistor 68 and the pixel part shielding region 13a of the display part shielding film 13 while driving the p-channel transistor 73 with both of the gate electrode 73a of the p-channel transistor 73 and the pixel part shielding region 13a of the display part shielding film 13. Thus, the organic EL display can improve drivability of the n-channel transistor 68 and the p-channel transistor 73 of the pixel part 66.

While the effective voltage Vbc (about −1.5 V to about 0 V) between the pixel part shielding region 13a and the channel region 73d of the p-channel transistor 73 shown in FIG. 31 is regularly at a level (at least about −2 V) in the OFF-region of the p-channel transistor 73, the organic EL display can easily employ the pixel part shielding region 13a of the display part shielding film 13 as the gate electrode of the lower channel of the p-channel transistor 73 by setting the respective supply potentials so that the voltage Vbc is at a level (not more than about −2.5 V) in the ON-region of the p-channel transistor 73 when the upper channel of the p-channel transistor 73 enters an ON-state.

The remaining effects of the fifth embodiment are similar to those according to the aforementioned first embodiment.

Sixth Embodiment

An organic EL display according to a sixth embodiment of the present invention applies the same potentials as those applied to drain regions 68b and 73b of an n-channel transistor 68 and a p-channel transistor 73 of a corresponding pixel part 66 to a pixel part shielding region 13a of a display part shielding film 13, dissimilarly to the aforementioned fourth embodiment.

Each pixel part 66 of the organic EL display according to the sixth embodiment has a structure similar to that of the pixel part 66 according to the fourth embodiment shown in FIG. 18. According to the sixth embodiment, however, the n-channel transistor 68 and the p-channel transistor 73 of the pixel part 66 similar to those according to the fourth embodiment shown in FIG. 18 have structures similar to that of the n-channel transistor 58 according to the third embodiment shown in FIG. 15. In other words, each of the n-channel transistor 68 and the p-channel transistor 73 of the pixel part 66 similar to those according to the fourth embodiment shown in FIG. 18 has a structure similar to that obtained by connecting the drain region 8b and the pixel part shielding region 13a of the display part shielding film 13 with each other through the first-layer plug 21, the second-layer plug 53, the wiring layer 54 and the plug 20a in the third embodiment shown in FIG. 15 with each other. The drain region 68b or 73b and the pixel part shielding region 13a may alternatively be directly connected with each other through a first-layer plug 21. Thus, the organic EL display according to the sixth embodiment applies the same potentials to the drain regions 68b and 73b of the n-channel transistor 68 and the p-channel transistor 73 of the pixel part 66 similar to those of the fourth embodiment shown in FIG. 18 and the corresponding pixel part shielding region 13a of the display part shielding film 13. According to the sixth embodiment, the pixel part shielding region 13a is parted from a wiring part shielding region 13b, and the organic EL display applies a proper potential (½(Vdd+Vss)) to the wiring part shielding region 13b. The remaining structure of the organic EL display according to the sixth embodiment is similar to that of the organic EL display according to the aforementioned fourth embodiment.

The organic EL display according to the sixth embodiment applies a potential ½(Vdd+Vbb) to a level conversion circuit shielding film, similarly to the aforementioned fourth embodiment. Further, the organic EL display according to the sixth embodiment applies a potential ½(Vdd+Vss) to a shift register circuit shielding film of an H driver, a sampling transistor shielding film, a buffer shielding film, a DA converter shielding film, a clock generation circuit shielding film and a shift register circuit shielding film of a V driver, similarly to the aforementioned fourth embodiment.

Operations of the n-channel transistor 68 and the p-channel transistor 73 of the pixel part 66 of the organic EL display according to the sixth embodiment are now described with reference to FIGS. 33 to 36.

The organic EL display according to the sixth embodiment applies a gate potential Vgate and a signal potential Vsig similar to the gate potential Vgate and the signal potential Vsig according to the aforementioned fourth embodiment shown in FIG. 19 to a gate electrode 68a and the drain region 68b of the n-channel transistor 68 of the pixel part 66 respectively. At this time, the organic EL display according to the sixth embodiment applies a potential Vch similar to the potential Vch of the channel region 68d according to the fourth embodiment shown in FIG. 19 to a channel region 68d of the n-channel transistor 68. Thus, the organic EL display operates on an upper channel of the n-channel transistor 68 of the pixel part 66 similarly to the aforementioned fourth embodiment.

Figure 33:
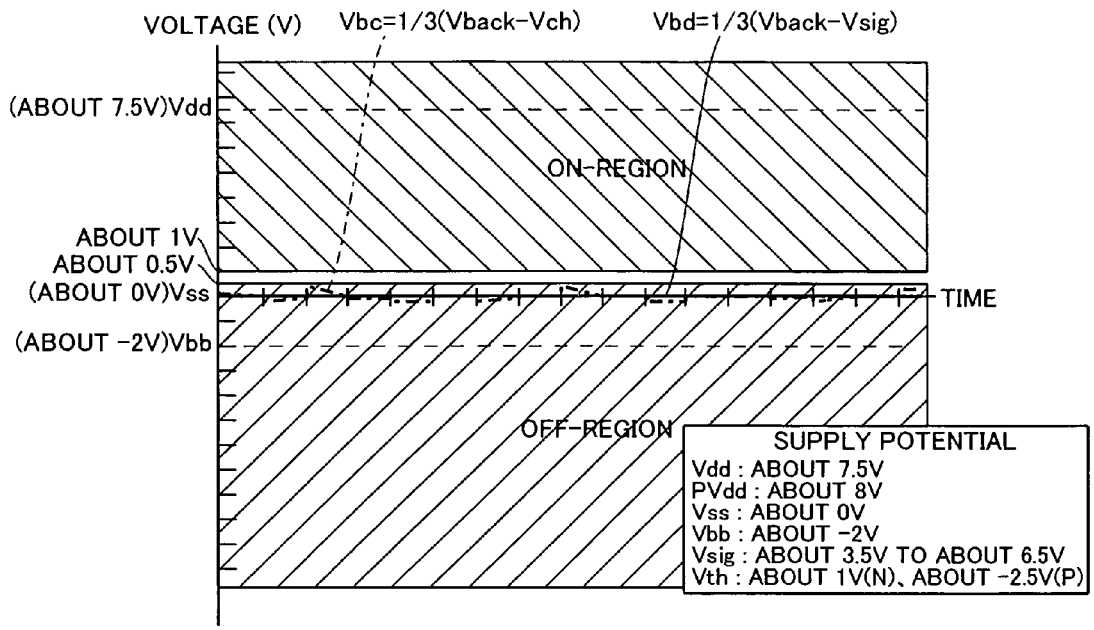
FIG. 33 is a voltage waveform diagram for illustrating operations of an n-channel transistor of a pixel part of an organic EL display according to a sixth embodiment of the present invention.

According to the sixth embodiment, the drain region 68b of the n-channel transistor 68 and the corresponding pixel part shielding region 13a of the display part shielding film 13 are so connected with each other that the organic EL display applies the same potential as the signal potential Vsig applied to the drain region 68b to the pixel part shielding region 13a of the display part shielding film 13. Thus, the effective voltage Vbd=⅓(Vback−Vsig) between the pixel part shielding region 13a of the display part shielding film 13 and the drain region 68b of the n-channel transistor 68 is about 0 V according to the sixth embodiment, as shown in FIG. 33. Further, the effective voltage Vbc=⅓(Vback−Vch) between the pixel part shielding region 13a and the channel region 68d of the n-channel transistor 68 exhibits a waveform shown in FIG. 33, and changes in the range of about −0.2 V to about 0.4 V according to the sixth embodiment.

Figure 34:
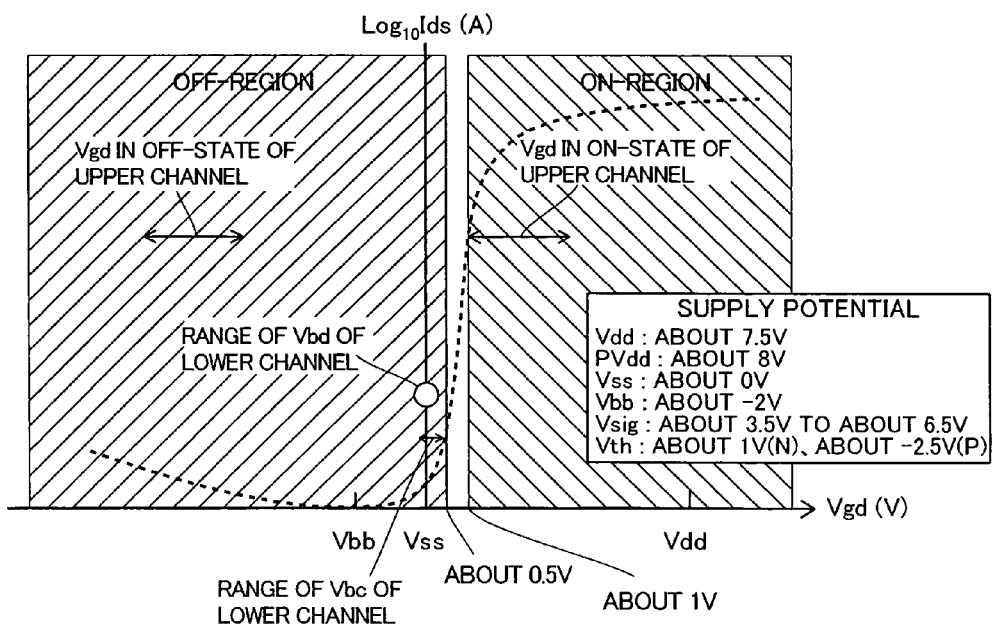
FIG. 34 illustrates current-voltage characteristics of the n-channel transistor of the pixel part of the organic EL display according to the sixth embodiment of the present invention.

According to the sixth embodiment, therefore, the effective voltage Vbc (about −0.2 V to about 0.4) between the pixel part shielding region 13a and the channel region 68d of the n-channel transistor 68 is at a level (not more than about 0.5 V) in the OFF-region of the n-channel transistor 68, as shown in FIG. 34. Thus, the organic EL display according to the sixth embodiment inhibits a lower channel of the n-channel transistor 68 from entering an ON-state when applying the same potential as the signal potential Vsig applied to the drain region 68b of the n-channel transistor 68 to the pixel part shielding region 13a of the display part shielding film 13 in an ON-state period of the upper channel of the n-channel transistor 68. Therefore, the organic EL display inhibits current from flowing between the drain region 68b and a source region 68 through the lower channel of the n-channel transistor 68 in this period.

Then, the organic EL display according to the sixth embodiment applies a gate potential Vgate(Pch) and a positive potential PVdd similar to the gate potential Vgate(Pch) and the positive potential PVdd according to the fourth embodiment shown in FIG. 24 to the gate electrode 73a and the drain region 73b of the p-channel transistor 73 of the pixel part 66 respectively. At this time, the organic EL display according to the sixth embodiment applies a potential Vch similar to the potential Vch of the channel region 73d according to the fourth embodiment shown in FIG. 24 to a channel region 73d of the p-channel transistor 73. Thus, the organic EL display operates on an upper channel of the p-channel transistor 73 of the pixel part 66 similarly to the organic EL display according to the aforementioned fourth embodiment operating on the p-channel transistor 73.

Figure 35:
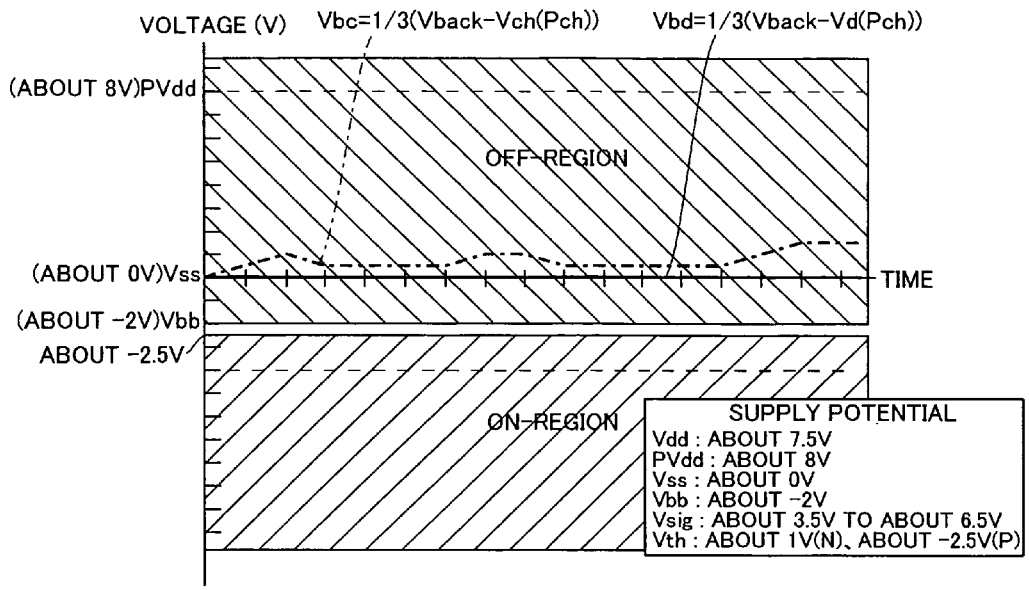
FIG. 35 is a voltage waveform diagram for illustrating operations of a p-channel transistor of the pixel part of the organic EL display according to the sixth embodiment of the present invention.

According to the sixth embodiment, the drain region 73b of the p-channel transistor 73 and the pixel part shielding region 13a of the display part shielding film 13 are so connected with each other that the organic EL display applies the same potential as the positive potential PVdd (about 8 V) applied to the drain region 73b to the pixel part shielding region 13a of the display part shielding film 13. Thus, the effective voltage Vbd=⅓(Vback−Vd(Pch)) between the pixel part shielding region 13a of the display part shielding film 13 and the drain region 73b of the p-channel transistor 73 is about 0 V according to the sixth embodiment, as shown in FIG. 35. Further, the effective voltage Vbc=⅓(Vback−Vch(Pch)) between the pixel part shielding region 13a and the channel region 73d of the p-channel transistor 73 exhibits a waveform shown in FIG. 35, and changes in the range of about 0 V to about 1.5 V according to the sixth embodiment.

Figure 36:
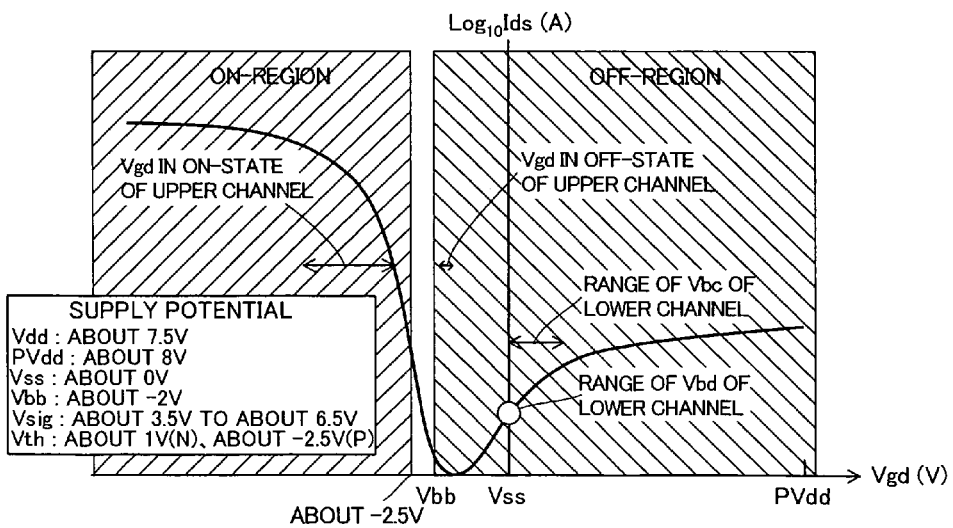
FIG. 36 illustrates current-voltage characteristics of the p-channel transistor of the pixel part of the organic EL display according to the sixth embodiment of the present invention.

Thus, the effective voltage (potential difference) Vbc (about 0 V to about 1.5 V) between the pixel part shielding region 13a and the channel region 73d of the p-channel transistor 73 is at a level (at least about −2 V) in the OFF-region of the p-channel transistor 73 according to the sixth embodiment, as shown in FIG. 36. According to the sixth embodiment, therefore, the organic EL display inhibits a lower channel of the p-channel transistor 73 from entering an ON-state when applying the same potential as the positive potential PVdd applied to the drain region 73b to the corresponding pixel part shielding region 13a of the display part shielding film 13 in an OFF-state period of the upper channel of the p-channel transistor 73. Thus, the organic EL display inhibits current from flowing between the drain region 73b and a source region 73c through the lower channel of the p-channel transistor 73 in this period.

According to the sixth embodiment, as hereinabove described, the potential of the channel region 68d of the n-channel transistor 68 of the pixel part 66 is at a level corresponding to the potential (signal potential Vsig) of the drain region 68b in the voltage range where the potential (signal potential Vsig) of the drain region 68b changes. Thus, the organic EL display, having the pixel part shielding region 13a of the display part shielding film 13 connected with the drain region 68b of the n-channel transistor 68 of the corresponding pixel part 66, can control the effective voltage (potential difference) Vbc between the pixel part shielding region 13a of the display part shielding film 13 and the channel region 68b of the n-channel transistor 68 of the corresponding pixel part 66 in the range of about −0.2 V to about 0.4 V by supplying the same potential as the signal potential Vsig applied to the drain region 68b of the n-channel transistor 68 of the corresponding pixel part 66 to the pixel part shielding region 13a of the display part shielding film 13. Therefore, the organic EL display can control the effective voltage (potential difference) Vbc between the pixel part shielding region 13a of the display part shielding film 13 and the channel region 68b of the corresponding n-channel transistor 68 in the voltage range (not more than about 0.5 V) of the OFF-region of the n-channel transistor 68. Thus, the organic EL display can inhibit the lower channel of the n-channel transistor 68 from entering an ON-state in an OFF-state of the upper channel of the n-channel transistor 68 due to application of the same potential as the signal potential Vsig applied to the drain region 68b to the pixel part shielding region 13a of the display part shielding film 13. Therefore, the organic EL display can suppress occurrence of a malfunction.

According to the sixth embodiment, the channel region 73d of the p-channel transistor 73 of the pixel part 66 is at a potential in a prescribed range corresponding to the positive potential PVdd of the drain region 73b. Thus, the organic EL display, having the pixel part shielding region 13a of the display part shielding film 13 connected with the drain region 68b of the n-channel transistor 68 of the corresponding pixel part 66, can control the effective voltage (potential difference) Vbc between the pixel part shielding region 13a of the display part shielding film 13 and the channel region 73d of the corresponding p-channel transistor 73 in the range of about 0 V to about 1.5 V by supplying the same potential as the positive potential PVdd applied to the drain region 73b of the p-channel transistor 73 of the corresponding pixel part 66 to the pixel part shielding region 13a of the display part shielding film 13. Therefore, the organic EL display can control the effective voltage (potential difference) Vbc between the pixel part shielding region 13a of the display part shielding film 13 and the channel region 73d of the corresponding p-channel transistor 73 in the voltage range (at least about −2 V) of the OFF-region of the p-channel transistor 73. Thus, the organic EL display can inhibit the lower channel of the p-channel transistor 73 from entering an ON-state in an OFF-state of the upper channel of the p-channel transistor 73 due to application of the same potential as the positive potential PVdd applied to the drain region 73b to the pixel part shielding region 13a of the display part shielding film 13. The organic EL display can suppress occurrence of a malfunction also by this.

According to the sixth embodiment, the pixel part shielding region 13a of the display part shielding film 13 and the drain region 68b of the n-channel transistor 68 are so connected with each other as to increase the electric capacitance of a drain line connected to the drain region 68b of the n-channel transistor 68 due to the pixel part shielding region 13a of the display part shielding film 13. Thus, the organic EL display can sufficiently store charge of a video signal (signal potential Vsig) supplied to the drain line in the drain line a portion linked with the drain line for contributing as the electric capacitance when supplying the video signal to the drain line. The organic EL display can supply the sufficiently stored charge to the gate of the p-channel transistor 73 through the n-channel transistor 68 when turning on the n-channel transistor 68 by supplying a prescribed scanning signal from the gate line. Thus, the organic EL display, capable of sufficiently transmitting the signal potential Vsig of the video signal supplied to the drain line to the gate of the p-channel transistor 73 dissimilarly to a case where the drain line has small electric capacitance, can reliably control the ON-state (OFF-state) of the p-channel transistor 73 in response to the signal potential Vsig of the video signal. Therefore, the organic EL display, capable of correctly controlling a potential applied to an organic EL element 72 through the p-channel transistor 73 in response to the video signal, can improve picture quality.

The remaining effects of the sixth embodiment are similar to those of the aforementioned first embodiment.

Seventh Embodiment

An organic EL display according to a seventh embodiment of the present invention applies a positive potential PVdd applied to a drain region 73b of a p-channel transistor 73 of a pixel part 66 to a pixel part shielding region 13a of a display part shielding film 13 arranged under the p-channel transistor 73 while applying a potential ½(Vdd+Vbb) to another pixel part shielding region 13a of the display part shielding film 13 arranged under an n-channel transistor 68 of the pixel part 66, dissimilarly to the aforementioned fourth embodiment.

The pixel part 66 of the organic EL display according to the seventh embodiment is similar to the pixel part 66 according to the fourth embodiment shown in FIG. 18. According to the seventh embodiment, however, a signal line linked with the drain region 73b of the p-channel transistor 73 for supplying the positive potential PVdd is connected to the pixel part shielding region 13a of the display part shielding film 13 arranged under the p-channel transistor 73 of the pixel part 66 similar to that according to the fourth embodiment shown in FIG. 18. Thus, the organic EL display according to the seventh embodiment supplies the positive potential PVdd to the pixel part shielding region 13a of the display part shielding film 13 arranged under the p-channel transistor 73 of the pixel part 66. The remaining structure of the organic EL display according to the seventh embodiment is similar to that of the organic EL display according to the aforementioned fourth embodiment.

The organic EL display according to the seventh embodiment applies the potential ½(Vdd+Vbb) to a wiring part shielding region 13b and the pixel part shielding region 13a of the display part shielding film 13 arranged under the n-channel transistor 68 of the pixel part 66, similarly to the aforementioned fourth embodiment. Further, the organic EL display according to the seventh embodiment applies the potential ½(Vdd+Vbb) also to a level conversion circuit shielding film, similarly to the aforementioned fourth embodiment. In addition, the organic EL display according to the seventh embodiment applies a potential ½(Vdd+Vss) to a shift register circuit shielding film of an H driver, a sampling transistor shielding film, a buffer shielding film, a DA converter shielding film, a clock generation circuit shielding film and a shift register circuit shielding film of a V driver, similarly to the aforementioned fourth embodiment.

Operations of the n-channel transistor 68 and the p-channel transistor 73 of the pixel part 66 of the organic EL display according to the seventh embodiment are now described.

The organic EL display according to the seventh embodiment operates on the n-channel transistor 68 of the pixel part 66 absolutely similarly to the organic EL display according to the aforementioned fourth embodiment operating on the n-channel transistor 68 of the pixel part 66, thereby inhibiting a lower channel of the n-channel transistor 68 from entering an ON-state in an OFF-state period of an upper channel of the n-channel transistor 68.

The organic EL display applies a gate potential Vgate(Pch) similar to the gate potential Vgate(Pch) according to the fourth embodiment shown in FIG. 24 to a gate electrode 73a of the p-channel transistor 73 of the pixel part 66 while applying the positive potential PVdd (about 8 V) to the drain region 73b. At this time, the potential Vch(Pch) of a channel region 73d of the p-channel transistor 73 according to the seventh embodiment exhibits a waveform similar to that of the potential Vch(Pch) of the channel region 73d according to the fourth embodiment shown in FIG. 24. Thus, the organic EL display according to the seventh embodiment operates on an upper channel of the p-channel transistor 73 similarly to the organic EL display according to the aforementioned fourth embodiment operating on the p-channel transistor 73.

According to the seventh embodiment, the organic EL display applies the positive potential PVdd (about 8 V) to the pixel part shielding region 13a of the display part shielding film 13 arranged under the p-channel transistor 73. Thus, the organic EL display according to the seventh embodiment operates on a lower channel of the p-channel transistor 73 similarly to the organic EL display according to the aforementioned sixth embodiment operating on the p-channel transistor 73. Thus, the organic EL display inhibits the lower channel of the p-channel transistor 73 from entering an ON-state in an OFF-state period of the upper channel of the p-channel transistor 73.

According to the seventh embodiment, as hereinabove described, the channel region 73d of the p-channel transistor 73 is at a potential in a prescribed range corresponding to the positive potential PVdd of the drain region 73b. Thus, the organic EL display can control the effective voltage (potential difference) Vbc between the pixel part shielding region 13a of the display part shielding film 13 and the channel region 73d of the corresponding p-channel transistor 73 in the voltage range (at least about −2 V) of the OFF-region of the p-channel transistor 73 by applying the same potential as the positive potential PVdd applied to the drain region 73b of the p-channel transistor 73 to the pixel part shielding region 13a of the display part shielding film 13 arranged under the p-channel transistor 73 of the pixel part 66. Therefore, the organic EL display can easily inhibit the p-channel transistor 73 of the pixel part 66 from entering an ON-state in an OFF-state period of the p-channel transistor 73 of the pixel part 66 due to the positive potential PVdd applied to the pixel part shielding region 13a of the display part shielding film 13. Consequently, the organic EL display can suppress occurrence of a malfunction.

The remaining effects of the seventh embodiment are similar to those of the aforementioned fourth embodiment.

Eighth Embodiment

A liquid crystal display according to an eighth embodiment is provided with a CMOS circuit 83 constituted of an n-channel transistor 81 and a p-channel transistor 82 on each peripheral circuit.

Figure 37:
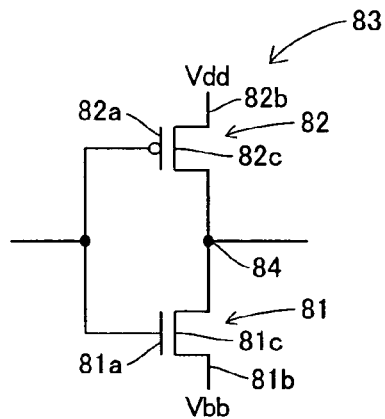
FIG. 37 is a circuit diagram showing the structure of a CMOS circuit included in a peripheral circuit of a liquid crystal display according to an eighth embodiment of the present invention.

In the liquid crystal display according to the eighth embodiment, the CMOS circuit 83 constituted of the n-channel transistor 81 and the p-channel transistor 82 shown in FIG. 37 is provided on each of shift register circuits 25 and 35, a DA converter 28, a clock generation circuit 29 and a level conversion circuit 36 similar to those of the liquid crystal display according to the first embodiment shown in FIG. 1. The n-channel transistor 81 and the p-channel transistor 82 are examples of the "second transistor" in the present invention. Gate electrodes 81a and 82a of the n-channel transistor 81 and the p-channel transistor 82 are connected with each other. Thus, the liquid crystal display applies the same potential to the gate electrodes 81a and 82a of the n-channel transistor 81 and the p-channel transistor 82. The liquid crystal display applies a positive potential Vdd and a negative potential Vbb to source regions 82b and 81b of the p-channel transistor 82 and the n-channel transistor 81 respectively. The n-channel transistor 81 and the p-channel transistor 82 have a common drain region 84.

According to the eighth embodiment, shift register circuit shielding films 30 and 37, a DA converter shielding film 33, a clock generation circuit shielding film 34 and a level conversion circuit shielding film 38 identical to those shown in FIG. 1 are provided to cover lower portions of the CMOS circuits 83 provided on the shift register circuits 25 and 35, the DA converter 28, the clock generation circuit 29 and the level conversion circuit 36 respectively. The liquid crystal display according to the eighth embodiment applies a potential ½(Vdd+Vbb)=about 2.75 V to the shift register circuit shielding films 30 and 37, the DA converter shielding film 33, the clock generation circuit shielding film 34 and the level conversion circuit shielding film 38.

The remaining structure of the liquid crystal display according to the eighth embodiment is similar to that of the liquid crystal display according to the aforementioned first embodiment. The liquid crystal display according to the eighth embodiment applies the potential ½(Vdd+Vbb) to a pixel part shielding region 13a of a display part shielding film 13 arranged under an n-channel transistor 68 of each pixel part 66, similarly to the aforementioned first embodiment. Further, the liquid crystal display according to the eighth embodiment applies a potential ½(Vdd+Vss) to a sampling transistor shielding film 31 and a buffer shielding film 32, similarly to the aforementioned first embodiment.

Operations of the CMOS circuit 83 included in each peripheral circuit of the liquid crystal display according to the eighth embodiment of the present invention are now described with reference to FIGS. 37 and 38. It is assumed that the threshold voltages Vth of the n-channel transistor 81 and the p-channel transistor 82 are about 1 V and about −2.5 V respectively. Thus, the n-channel transistor 81 enters an ON-state when the voltage between the gate electrode 81a and a channel region 81c is at least about 1 V, while the p-channel transistor 82 enters an ON-state when the voltage between the gate electrode 82a and a channel region 82c is not more than about −2.5 V. In the CMOS circuit 83, it is assumed that the n-channel transistor 81 enters an OFF-state when the voltage between the gate electrode 81a and the channel region 81c is not more than about 0.5 V, while the p-channel transistor 82 enters an OFF-state when the voltage between the gate electrode 82a and the channel region 82c is at least about −2 V.

Figure 38:
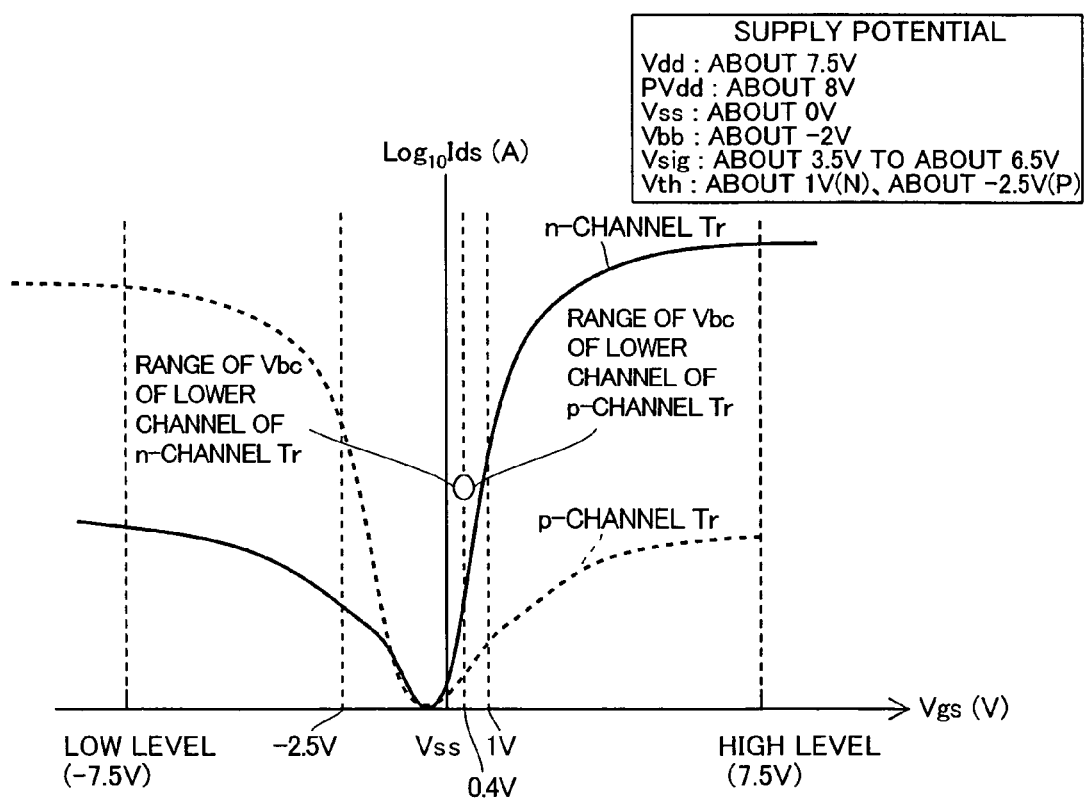
FIG. 38 illustrates current-voltage characteristics of the CMOS circuit included in the peripheral circuit of the liquid crystal display according to the eighth embodiment of the present invention.

When the liquid crystal display applies a potential of about 7.5 V to either a source region 81b of the n-channel transistor 81 or the drain region 84 while supplying the potential ½(Vdd+Vbb)=about 2.75 V to the corresponding shielding film in an OFF-state period of an upper channel of the n-channel transistor 81 of the CMOS circuit 83, the effective voltage (potential difference) Vbc between the shielding film and the channel region 81c of the n-channel transistor 81 of the CMOS circuit 83 is about 0.4 V, as shown in FIG. 38. In this case, the effective voltage (potential difference) Vbc between the corresponding shielding film and the channel region 81c of the n-channel transistor 81 is at a level in the OFF-region of the n-channel transistor 81 in the OFF-state period of the upper channel of the n-channel transistor 81 of the CMOS circuit 83. Thus, the liquid crystal display inhibits a lower channel of the n-channel transistor 81 from entering an OFF-state at this time.

When the liquid crystal display applies the same potential to the source region 81b of the n-channel transistor 81 and the drain region 84 while supplying the potential ½(Vdd+Vbb)=about 2.75 V to the corresponding shielding film in the OFF-state period of the upper channel of the n-channel transistor 81, the effective voltage (potential difference) Vbc between the shielding film and the channel region 81c of the n-channel transistor 81 may be at a level other than that of about 0.4 V shown in FIG. 38. In this case, no potential difference takes place between the source region 81b of the n-channel transistor 81 and the drain region 84, whereby no leakage current flows between the source region 81b and the drain region 84.

When the liquid crystal display applies a potential of about 7.5 V to either the source region 82b of the p-channel transistor 82 or the drain region 84 while supplying the potential ½(Vdd+Vbb)=about 2.75 V in an OFF-state period of an upper channel (channel closer to the gate electrode 82a) of the p-channel transistor 82 of the CMOS circuit 83, on the other hand, the effective voltage (potential difference) Vbc between the shielding film and the channel region 82c of the p-channel transistor 82 is about 0.4 V, as shown in FIG. 38. Thus, the effective voltage (potential difference) Vbc between the shielding film and the channel region 82c of the p-channel transistor 82 is at a level (at least about −2 V) in the OFF-region of the p-channel transistor 82 in the OFF-state of the upper channel of the p-channel transistor 82 of the CMOS circuit 83. Thus, the liquid crystal display inhibits a lower channel (channel closer to the shielding film) of the p-channel transistor 82 from entering an ON-state.

When the liquid crystal display applies the same potential to the source region 82b of the p-channel transistor 82 and the drain region 84 while supplying the potential ½(Vdd+Vbb)=about 2.75 V to the corresponding shielding film in the OFF-state period of the upper channel of the p-channel transistor 82, the effective voltage (potential difference) Vbc between the shielding film and the channel region 82c of the p-channel transistor 82 may be at a level other than the voltage of about 0.4 V shown in FIG. 38. In this case, no potential difference takes place between the source region 82b of the p-channel transistor 82 and the drain region 84, whereby no leakage current flows between the source region 82b and the drain region 84.

According to the eighth embodiment, as hereinabove described, the liquid crystal display can set the voltages Vbc between each shielding film and the channel regions 81c and 82c of the corresponding n- and p-channel transistor 81 and 82 to levels for turning off the n-channel transistor 81 and the p-channel transistor 82 respectively when the upper channels of the n-channel transistor 81 and the p-channel transistor 82 of the CMOS circuit 83 corresponding to each shielding film are in OFF-states by supplying the potential ½(Vdd+Vbb) to the shift register circuit shielding films 30 and 37, the DA converter shielding film 33, the clock generation circuit shielding film 34 and the level conversion circuit shielding film 38 respectively. When holding the upper channels of the n-channel transistor 81 and the p-channel transistor 82 of the CMOS circuit 83 in OFF-states respectively, therefore, the liquid crystal display can inhibit the lower channels of the n-channel transistor 81 and the p-channel transistor 82 from entering ON-states respectively. Thus, the liquid crystal display including the CMOS circuits 83 for the peripheral circuits can suppress occurrence of a malfunction.

Figure 39:
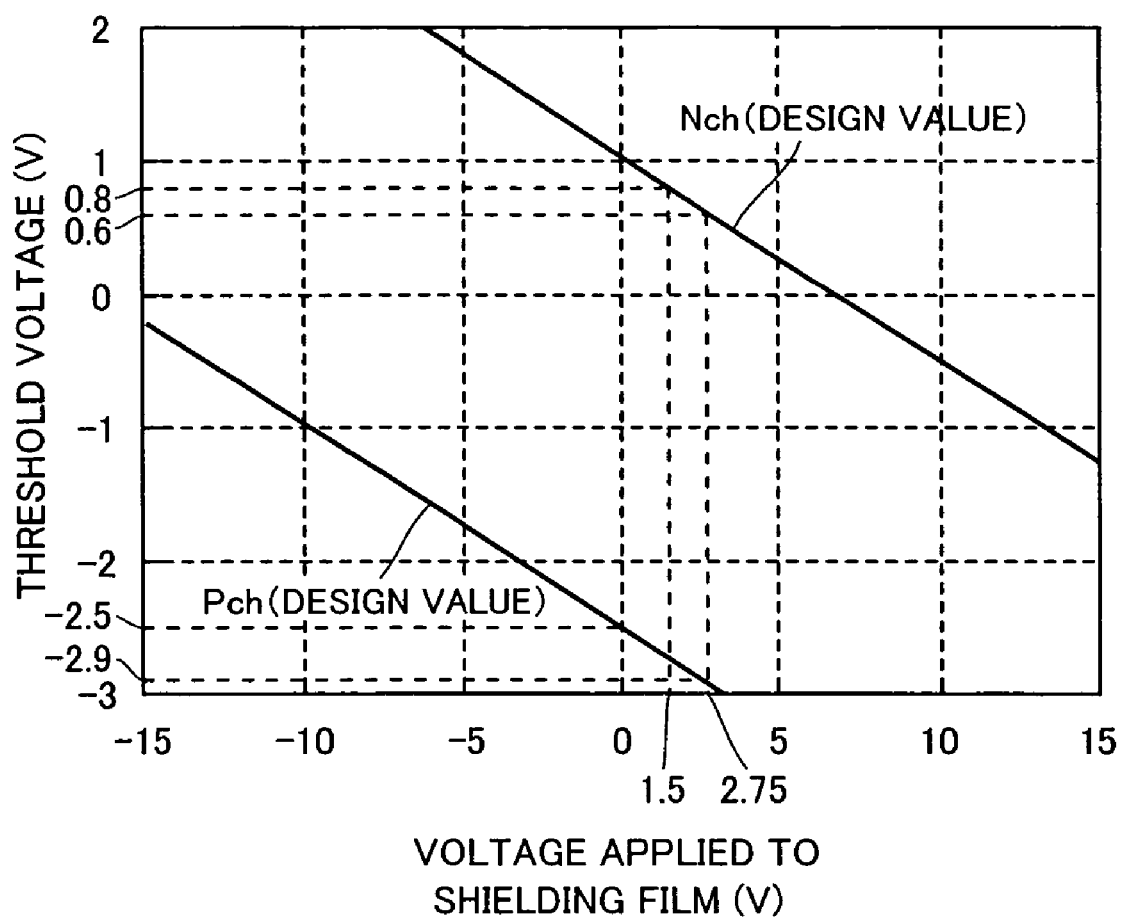
FIG. 39 is a correlation diagram showing the relation between a potential applied to a shielding film and threshold voltages Vth of p- and n-channel transistors corresponding to the shielding film.

The relation between a potential applied to each shielding film and the threshold voltages Vth (design values) of a p-channel transistor and an n-channel transistor corresponding to the shielding film is described with reference to FIG. 39. FIG. 39 shows the relation between the potential applied to the shielding film and the threshold voltages Vth of the p-channel transistor and the n-channel transistor in a case of setting the thickness of an insulating film provided between the p-channel transistor and the n-channel transistor and the shielding film arranged under the same respectively to three times the thickness of gate insulating films of the p-channel transistor and the n-channel transistor.

The aforementioned first and fourth embodiments are studied with reference to FIG. 39. In the liquid crystal display according to the aforementioned first embodiment, the effective voltage Vbc between the pixel part shielding region 13a of the display part shielding film 13 (see FIG. 1) and the channel region 8d of the n-channel transistor 8 of the corresponding pixel part 6 is about −1.4 V to about 0.1 V. According to the first embodiment, the liquid crystal display applies the potential ½(Vdd+Vbb)=about 1.5 V to the pixel part shielding region 13a of the display part shielding film 13. In this case, the threshold voltage Vth of the n-channel transistor 8 goes down by about 0.2 V from about 1.0 V to about 0.8 V as understood from FIG. 39, whereby the voltage ranges (at least about 1 V and not more than about 0.5 V) of the ON- and OFF-regions of the n-channel transistor 8 shift in a direction going down by about 0.2 V. Also in this case, the liquid crystal display holds the effective voltage Vbc (about −1.4 V to about 0.1 V) between the pixel part shielding region 13a of the display part shielding film 13 and the channel region 8d of the corresponding n-channel transistor 8 in the voltage range (not more than about 0.3 V) of the shifted OFF-region of the n-channel transistor 8. Thus, the liquid crystal display according to the first embodiment holds the lower channel of the n-channel transistor 8 in an OFF-state also when applying the voltage ½(Vdd+Vbb) to the corresponding pixel part shielding region 13a of the display part shielding film 13 thereby reducing the threshold voltage Vth of the n-channel transistor 8 in an OFF-state period of the upper channel of the n-channel transistor 8 of the pixel part 6.

In the organic EL display according to the aforementioned fourth embodiment, on the other hand, the effective voltage Vbc between the pixel part shielding region 13a of the display part shielding film 13 and the channel region 68d of the n-channel transistor 68 of the corresponding pixel part 66 (see FIG. 18) is about −1.4 V to about −0.3 V. The organic EL display according to the fourth embodiment applies the potential ½(Vdd+Vbb)=about 2.75 V to the pixel part shielding region 13a of the display part shielding film 13. In this case, the threshold voltage Vth of the n-channel transistor 68 goes down by about 0.4 V from about 1.0 V to about 0.6 V, whereby the voltage ranges (at least about 1 V and not more than about 0.5 V) of the ON- and OFF-regions of the n-channel transistor 68 also shift in a direction going down by about 0.4 V. Also in this case, the organic EL display holds the effective voltage Vbc (about −1.4 V to about −0.3 V) between the pixel part shielding region 13a of the display part shielding film 13 and the channel region 68d of the corresponding n-channel transistor 68 in the voltage range (not more than about 0.1 V) of the shifted OFF-region of the n-channel transistor 68. Thus, the organic EL display according to the fourth embodiment holds the lower channel of the n-channel transistor 68 in an OFF-state also when applying the potential ½(Vdd+Vbb) to the corresponding pixel part shielding region 13a of the display part shielding film 13 in the OFF-state period of the upper channel of the n-channel transistor 68 of the pixel part 66.

When the organic EL display according to the fourth embodiment applies the potential ½(Vdd+Vbb)=about 2.75 V to the pixel part shielding region 13a of the display part shielding film 13, the threshold voltage Vth of the p-channel transistor 73 of the pixel part 66 goes down from about −2.5 V to about −2.9 V, as understood from FIG. 39. Thus, the voltage ranges (not more than about −2.5 V and at least about −2 V) of the ON- and OFF-regions of the p-channel transistor 73 of the pixel part 66 shift in a going-down direction. Therefore, the voltage range of the OFF-region of the p-channel transistor 73 is increased. At this time, the organic EL display holds the effective voltage Vbc between the pixel part shielding region 13a of the display part shielding film 13 and the channel region 73d of the corresponding p-channel transistor 73 in the voltage range of the shifted OFF-region of the p-channel transistor 73. Thus, the organic EL display according to the fourth embodiment holds the lower channel of the p-channel transistor 73 in an OFF-state when applying the potential ½(Vdd+Vbb) to the corresponding pixel part shielding region 13a of the display part shielding film 13 in the OFF-state period of the upper channel of the p-channel transistor 73 of the pixel part 66.

Ninth Embodiment

Figure 40:
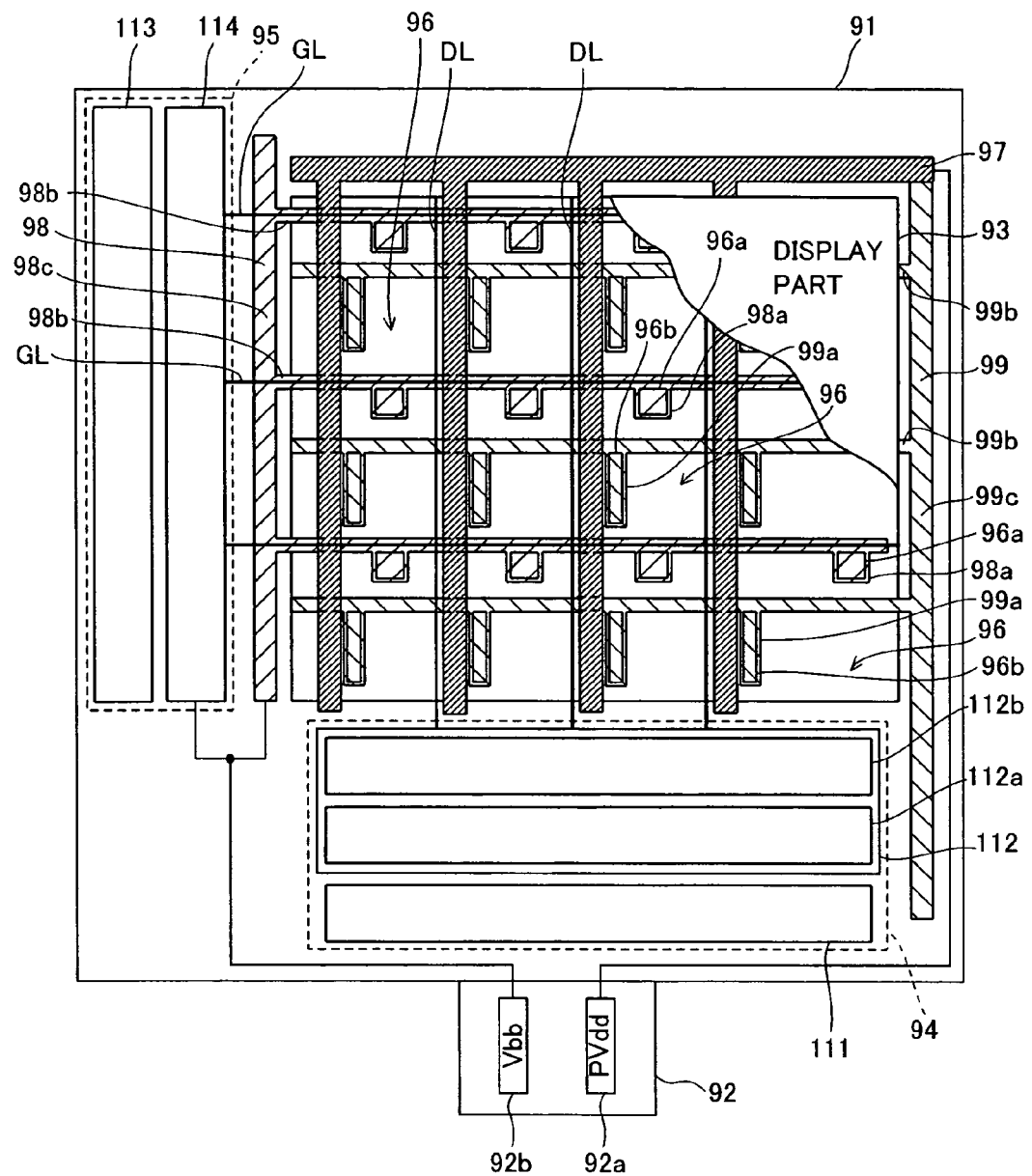
FIG. 40 is a plan view showing the overall structure of an organic EL display according to a ninth embodiment of the present invention.
Figure 41:
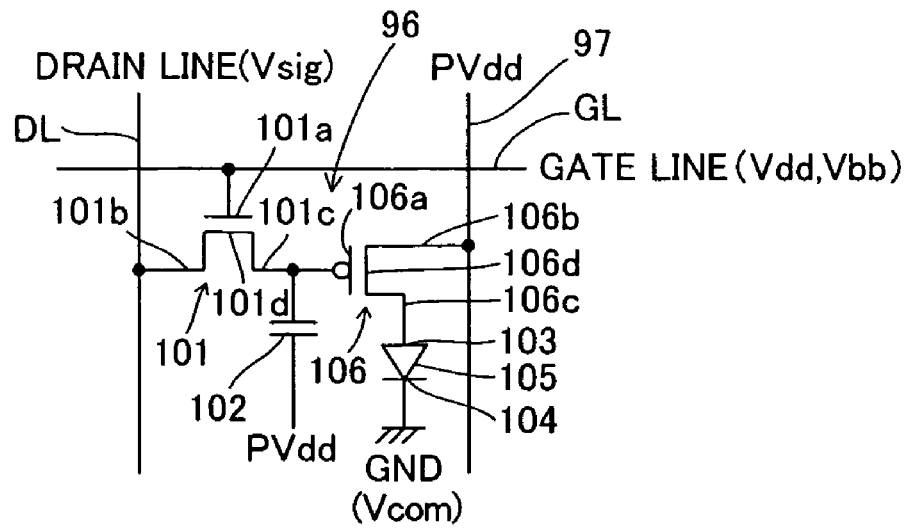
FIG. 41 is a circuit diagram of a pixel part of the organic EL display according to the ninth embodiment shown in FIG. 40.
Figure 42:
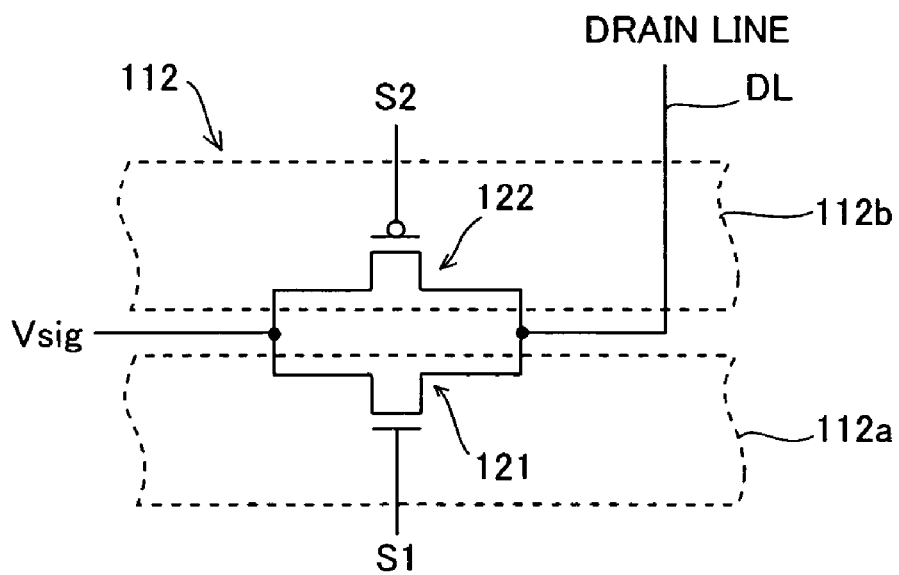
FIG. 42 is a circuit diagram of a peripheral circuit part (analog switch) of the organic EL display according to the ninth embodiment shown in FIG. 40.

Referring to FIGS. 40 to 42, shielding films corresponding to n- and p-channel transistors of each pixel part respectively are separately provided in an organic EL display according to a ninth embodiment of the present invention, dissimilarly to the aforementioned fourth to seventh embodiments. Symbols Vdd, PVdd, Vbb and Vsig in FIGS. 40 to 42 denote positive potentials, a negative potential and a signal potential similar to those in the aforementioned fourth embodiment. In other words, the positive potentials Vdd and PVdd are at about 7.5 V and about 8 V respectively. The negative potential Vbb and the signal potential Vsig are at about −2 V and about 3.5 V to about 6.5 V respectively.

As shown in FIG. 40, the organic EL display according to the ninth embodiment comprises an organic EL display panel 91 and an external circuit part 92 mounted on the organic EL display panel 91. The organic EL display panel 91 includes a display part 93 as well as an H driver 94 and a V driver 95 provided around the display part 93. A plurality of pixel parts 96 are arranged on the display part 93 in the form of a matrix.

As shown in FIG. 41, each pixel part 96 is constituted of an n-channel transistor 101 serving as a switching element, an auxiliary capacitor 102, an anode 103, a cathode 104, an organic EL element 105 held between the anode 103 and the cathode 104 and a p-channel transistor 106 serving as a drive transistor. The n-channel transistor 101 is arranged on a prescribed region 96a of each pixel part 96 shown in FIG. 40, while the p-channel transistor 106 is arranged on another prescribed region 96b of each pixel part 96 shown in FIG. 40 other than the region 96a. The n-channel transistor 101 and the p-channel transistor 106 are examples of the "first transistor" and the "second transistor" in the present invention respectively. Further, the regions 96a and 96b are examples of the "first region" and the "second region" in the present invention respectively. The n-channel transistor 101 and the p-channel transistor 106 have structures similar to those of the n-channel transistor 68 and the p-channel transistor 73 according to the aforementioned fourth embodiment respectively. In other words, the threshold voltages Vth of the n-channel transistor 101 and the p-channel transistor 106 are about 1 V and about −2.5 V respectively.

As shown in FIG. 41, a gate electrode 101a of the n-channel transistor 101 is connected to a gate line GL. The organic EL display applies the positive potential Vdd (about 7.5 V) and the negative potential Vbb (about −2 V) to the gate electrode 101a of the n-channel transistor 101 through the gate line GL. A drain region 101b of the n-channel transistor 101 is connected to a drain line DL. The organic EL display supplies the signal potential Vsig (about 3.5 V to about 6.5 V) of a video signal to the drain region 101b of the n-channel transistor 101 through the drain line DL. A source region 101c of the n-channel transistor 101 is connected to a first electrode of the auxiliary capacitor 102 and a gate electrode 106a of the p-channel transistor 106. A drain region 106b of the p-channel transistor 106 is connected to a wire 97. The organic EL display supplies the positive potential PVdd (about 8 V) to the drain region 106b of the p-channel transistor 106 through the wire 86. A source region 106c of the p-channel transistor 106 is connected to the anode 103. The organic EL display supplies the positive potential PVdd (about 8 V) to a second electrode of the auxiliary capacitor 102, while supplying the ground potential GND(Vcom) common to each pixel part 96 to the cathode 104. The pixel part 96 according to the ninth embodiment shown in FIG. 41 is similar to that of the pixel part 66 according to the fourth embodiment shown in FIG. 18.

As shown in FIG. 40, the H driver 94 includes an H shift register circuit 111 and an analog switch 112. As shown in FIG. 42, the analog switch 112 is constituted of an n-channel transistor 121 and a p-channel transistor 122. The threshold voltages Vth of the n-channel transistor 121 and the p-channel transistor 122 are about 1 V and about −2.5 V respectively. FIG. 42 illustrates only one switch corresponding to a single drain line DL.

More specifically, the drain region of the n-channel transistor 121 and the source region of the p-channel transistor 122 are connected with each other while the source region of the n-channel transistor 121 and the drain region of the p-channel transistor 122 are also connected with each other in the analog switch 112. The drain region of the n-channel transistor 121 (source region of the p-channel transistor 122) receives the signal potential Vsig of the vide signal, while the drain line DL is connected to the source region of the n-channel transistor 121 (drain region of the p-channel transistor 122). The gate electrodes of the n-channel transistor 121 and the p-channel transistor 122 receive output signals S1 and S2 from the H shift register circuit 111 (see FIG. 40) respectively. The n-channel transistor 121 is arranged on a region 112a of the analog switch 112, while the p-channel transistor 122 is arranged on another region 112b of the analog switch 112 other than the region 112a.

As shown in FIG. 40, the V driver 95 includes a V shift register 113 and a level conversion circuit 114. The drain line DL is connected to the H shift register circuit 111 through the analog switch 112, while the gate line GL is connected to the V shift register circuit 113 through the level conversion circuit 114.

The external circuit part 92 includes potential generation circuit parts 92a and 92b. The potential generation circuit part 92a, connected to the wire 97, has a function of generating the potential PVdd (about 8 V). Thus, the organic EL display supplies the potential PVdd (about 8 V) to the drain region 106b (see FIG. 41) of the p-channel transistor 106 through the wire 97. The potential generation circuit part 92b has a function of generating the potential Vbb (about −2 V). This potential generation circuit part 92b is connected to a low-level power supply wire (not shown) of the level conversion circuit 114.

According to the ninth embodiment, an n-channel transistor shielding film 98 is provided to cover a lower portion of the region 96a of the pixel part 96 (n-channel transistor 101 shown in FIG. 41) while a p-channel transistor shielding film 99 is provided to cover a lower portion of the region 96b of the pixel part 96 (p-channel transistor 106 shown in FIG. 41). The n-channel transistor shielding film 98 is an example of the "first shielding film" in the present invention, and the p-channel transistor shielding film 99 is an example of the "second shielding film" in the present invention.

More specifically, the n-channel transistor shielding film 98 has a plurality of shielding portions 98a covering lower portions of the regions 96a (n-channel transistors 101) of the plurality of pixel parts 96, a plurality of linear portions 98b provided in one-to-one correspondence to a plurality of gate lines GL and a coupling portion 98c coupling the plurality of linear portions 98b with each other. A prescribed number of shielding portions 98a of the n-channel transistor shielding film 98 corresponding to a prescribed gate line GL are connected to the linear portion 98b of the n-channel transistor shielding film 98 corresponding to the prescribed gate line GL. The plurality of linear portions 98b of the n-channel transistor shielding film 98 extend along the gate lines GL, while first ends of the plurality of linear portions 98b of the n-channel transistor shielding film 98 are connected to the coupling portion 98c of the n-channel transistor shielding film 98 on the outside of the display part 93. The coupling portion 98c of the n-channel transistor shielding film 98 is connected to the potential generation circuit part 92b of the external circuit part 92. In other words, the organic EL display supplies the fixed potential Vbb (about −2 V) to the n-channel transistor shielding film 98 from the potential generation circuit part 92b of the external circuit part 92.

According to the ninth embodiment, an insulating film (not shown) having a thickness of about three times that of a gate insulating film (not shown) of the n-channel transistor 101 is provided between the n-channel transistor 101 (see FIG. 41) and the shielding portion 98a of the n-channel transistor shielding film 98, similarly to the first embodiment shown in FIG. 3. Thus, the strength of an electric field applied from the shielding portion 98a of the n-channel transistor shielding film 98 to the corresponding channel region 101d (see FIG. 41) when the organic EL display supplies a potential to the n-channel transistor shielding film 98 is about ⅓ of the strength of an electric field applied from the gate electrode 101a to the channel region 101d when the organic EL display supplies the same potential to the gate electrode 101a (see FIG. 41). Therefore, the effective voltage (potential difference) Vbc between the shielding portion 98a of the n-channel transistor shielding film 98 and the channel region 101d is ⅓ of the potential difference between the potential Vback of the shielding portion 98a of the n-channel transistor shielding film 98 and the potential Vch of the channel region 101d. In other words, the effective voltage Vbc between the shielding portion 98a of the n-channel transistor shielding film 98 and the channel region 101d is ⅓(Vback−Vch).

The p-channel transistor shielding film 99 has a plurality of shielding portions 99a covering lower portions of the regions 96b (p-channel transistors 106) of the plurality of pixel parts 96 respectively, a plurality of linear portions 99b provided in one-to-one correspondence to the plurality of gate lines GL and a coupling portion 99c coupling the plurality of linear portions 99b with each other. A prescribed number of shielding portions 99a of the p-channel transistor shielding film 99 corresponding to a prescribed gate line GL are connected to the linear portion 99b of the p-channel transistor shielding film 99 corresponding to the prescribed gate line GL. The plurality of linear portions 99b of the p-channel transistor shielding film 99 extend along the gate lines GL, while first ends of the plurality of linear portions 99b of the p-channel transistor shielding film 99 are connected to the coupling portion 99c of the p-channel transistor shielding film 99 on the outside of the display part 93. The coupling portion 99c of the p-channel transistor shielding film 99 is connected to the wire 97 on the outside of the display part 93. In other words, the organic EL display supplies the fixed potential PVdd (about 8 V) to the p-channel transistor shielding film 99 from the potential generation circuit part 92a of the external circuit part 92.

According to the ninth embodiment, an insulating film (not shown) having a thickness of about three times that of a gate insulating film (not shown) of the p-channel transistor 106 is provided between the n-channel transistor 106 (see FIG. 41) and the shielding portion 99a of the p-channel transistor shielding film 99, similarly to the first embodiment shown in FIG. 3. Therefore, the strength of an electric field applied from the shielding portion 99a of the p-channel transistor shielding film 99 to the corresponding channel region 106d (see FIG. 41) when the organic EL display supplies a potential to the p-channel transistor shielding film 99 is about ⅓ of the strength of an electric field applied from the gate electrode 106a to the channel region 106d when the organic EL display supplies the same potential to the gate electrode 106a (see FIG. 41). Therefore, the effective voltage (potential difference) Vbc(Pch) between the shielding portion 99a of the p-channel transistor shielding film 99 and the channel region 106d is ⅓ of the potential difference between the potential Vback(Pch) of the shielding portion 99a of the p-channel transistor shielding film 99 and the potential Vch(Pch) of the channel region 106d. In other words, the effective voltage Vbc(Pch) between the shielding portion 99a of the p-channel transistor shielding film 99 and the channel region 106d is ⅓(Vback(Pch)−Vch(Pch)).

Operations of the organic EL display according to the ninth embodiment are now described with reference to FIGS. 40 and 41. In the n-channel transistor 101 (see FIG. 41) of each pixel part 96, voltages Vgate, Vch, Vsig, Vgc and Vgd change similarly to those in the fourth embodiment shown in FIGS. 19 and 20. In the p-channel transistor 106 (see FIG. 41) of each pixel part 96, voltages Vgate(Pch), Vch(Pch), Vd(Pch), Vgc(Pch) and Vgd(Pch) also change similarly to those in the fourth embodiment shown in FIGS. 24 and 25.

According to the ninth embodiment, the organic EL display supplies the fixed potential Vbb (about −2 V) to the n-channel transistor shielding film 98 (see FIG. 40) provided under each n-channel transistor 101, thereby fixing the potential Vback of the n-channel transistor shielding film 98 to Vbb (about −2 V). The potential Vch of the channel region 101d of the n-channel transistor 101 changes in the range of about 3.5 V to about 6.5 V.

Therefore, the effective voltage (potential difference) Vbc=⅓(Vback−Vch) between the shielding portion 98a of the n-channel transistor shielding film 98 and the channel region 101d of the n-channel transistor 101 changes in the range of about −1.8 V to about −2.8 V. Thus, the effective voltage Vbc (about −1.8 V to about −2.8 V) between the shielding portion 98a of the n-channel transistor shielding film 98 and the channel region 101d of the n-channel transistor 101 is regularly at a level (not more than about 0.5 V) in the OFF-region of the n-channel transistor 101. Consequently, the organic EL display inhibits a lower channel of the n-channel transistor 101 from entering an ON-state while holding an upper channel of the n-channel transistor 101 in an OFF-state. Thus, the organic EL display inhibits current from flowing between the drain region 101b and the source region 101c through the lower channel of the n-channel transistor 101 in this period.

According to the ninth embodiment, the organic EL display supplies the fixed potential PVdd (about 8 V) to the p-channel transistor shielding film 99 (see FIG. 40) provided under each p-channel transistor 106, thereby fixing the potential Vback(Pch) of the p-channel transistor shielding film 99 to PVdd (about 8 V). The organic EL display supplies the fixed potential PVdd (about 8 V), identical to the potential supplied to the p-channel transistor shielding film 99, to the drain region 106b of the p-channel transistor 106.

According to the ninth embodiment, therefore, the effective voltage (potential difference) Vbc(Pch)=⅓(Vback(Pch)−Vch(Pch)) between the shielding portion 99a of the p-channel transistor shielding film 99 and the channel region 106d of the p-channel transistor 106 changes in the range of about 0 V to about 1.5 V, similarly to the aforementioned sixth embodiment. Thus, the effective voltage Vbc(Pch) (about 0 V to about 1.5 V) between the shielding portion 99a of the p-channel transistor shielding film 99 and the channel region 106d of the p-channel transistor 106 is regularly at a level (at least about −2 V) in the OFF-region of the p-channel transistor 106. Consequently, the organic EL display inhibits a lower channel of the p-channel transistor 106 from entering an ON-state while holding an upper channel of the p-channel transistor 106 in an OFF-state. Thus, the organic EL display inhibits current from flowing between the drain region 106b and the source region 106c through the lower channel of the p-channel transistor 106 in this period.

According to the ninth embodiment, as hereinabove described, the organic EL display can fix the n-channel transistor shielding film 98 and the p-channel transistor shielding film 99 to the potentials Vbb and PVdd respectively by supplying the potentials Vbb and PVdd to the n-channel transistor shielding film 98 corresponding to the n-channel transistor 101 and the p-channel transistor shielding film 99 corresponding to the p-channel transistor 106 respectively in the pixel part 96. Thus, the organic EL display can inhibit the threshold voltages Vth of the n-channel transistor 101 and the p-channel transistor 106 from fluctuation following potential fluctuation in the n-channel transistor shielding film 98 and the p-channel transistor shielding film 99 respectively in the pixel part 96. Therefore, the organic EL display can stabilize the operations of the n-channel transistor 101 and the p-channel transistor 106 in the pixel part 96 respectively.

According to the ninth embodiment, as hereinabove described, the organic EL display can prevent the effective voltages Vbc and Vbc(Pch) between the n-channel transistor shielding film 98 and the channel region 101d of the n-channel transistor 101 and between the p-channel transistor shielding film 99 and the channel region 106d of the p-channel transistor 106 from exceeding the threshold voltages Vth of the n-channel transistor 101 and the p-channel transistor 106 respectively by supplying the potentials Vbb and PVdd to the n-channel transistor shielding film 98 and the p-channel transistor shielding film 99 corresponding to the n-channel transistor 101 and the p-channel transistor 106 respectively in each pixel part 96. Thus, the organic EL display can inhibit the n-channel transistor 101 and the p-channel transistor 106 from entering ON-states when supplying the potentials Vbb and PVdd to the n-channel transistor shielding film 98 and the p-channel transistor shielding film 99 respectively. Therefore, the organic EL display can suppress occurrence of such inconvenience that operations thereof are destabilized due to turn-on of the n-channel transistor 101 and the p-channel transistor 106 resulting from potentials supplied to the n-channel transistor shielding film 98 and the p-channel transistor shielding film 99 while the organic EL display holds the n-channel transistor 101 and the p-channel transistor 106 in OFF-states in the pixel part 96.

According to the ninth embodiment, as hereinabove described, the single n-channel transistor shielding film 98 covers the lower portions of the n-channel transistors 101 of the plurality of pixel parts 96 while the single p-channel transistor shielding film 99 covers the lower portions of the p-channel transistors 106 of the plurality of pixel parts 96 respectively, whereby the number of wires for supplying the potential to the n-channel transistor shielding film 98 (p-channel transistor shielding film 99) etc. can be reduced as compared with a case of providing n-channel transistor shielding films 98 (p-channel transistor shielding films 99) in one-to-one correspondence to the plurality of n-channel transistors 101 (p-channel transistors 106) and individually supplying prescribed potentials to the plurality of n-channel transistor shielding films 98 (p-channel transistor shielding films 99). Thus, size increase of the display part 93 including the plurality of pixel parts 96 can be suppressed due to the reduction of the number of wires, whereby the organic EL display can be inhibited from size increase.

According to the ninth embodiment, as hereinabove described, the insulating film (not shown) having the thickness of about three times the thickness of the gate insulating film (not shown) of the n-channel transistor 101 is provided between the n-channel transistor 101 and the n-channel transistor shielding film 98 in each pixel part 96, whereby the organic EL display can inhibit the potential Vbb applied to the n-channel transistor shielding film 98 from exerting influence on the channel region 101*d* of the n-channel transistor 101 due to the large thickness of the insulating film provided between the n-channel transistor 101 and the n-channel transistor shielding film 98 for serving as a gate insulating film when applying the potential Vbb to the n-channel transistor shielding film 98 unintentionally serving as a gate electrode. Thus, the organic EL display can suppress occurrence of such inconvenience that the threshold voltage Vth of the n-channel transistor 101 remarkably changes due to application of the potential Vbb to the n-channel transistor shielding film 98.

According to the ninth embodiment, as hereinabove described, the insulating film (not shown) having the thickness of about three times the thickness of the gate insulating film (not shown) of the p-channel transistor 106 is provided between the p-channel transistor 106 and the p-channel transistor shielding film 99 in each pixel part 96, whereby the organic EL display can inhibit the potential PVdd applied to the p-channel transistor shielding film 99 from exerting influence on the channel region 106*d* of the p-channel transistor 106 due to the large thickness of the insulating film provided between the p-channel transistor 106 and the p-channel transistor shielding film 99 for serving as a gate insulating film when applying the potential PVdd to the p-channel transistor shielding film 99 unintentionally serving as a gate electrode. Thus, the organic EL display can suppress occurrence of such inconvenience that the threshold voltage Vth of the p-channel transistor 106 remarkably changes due to application of the potential PVdd to the p-channel transistor shielding film 99.

Tenth Embodiment

Figure 43:
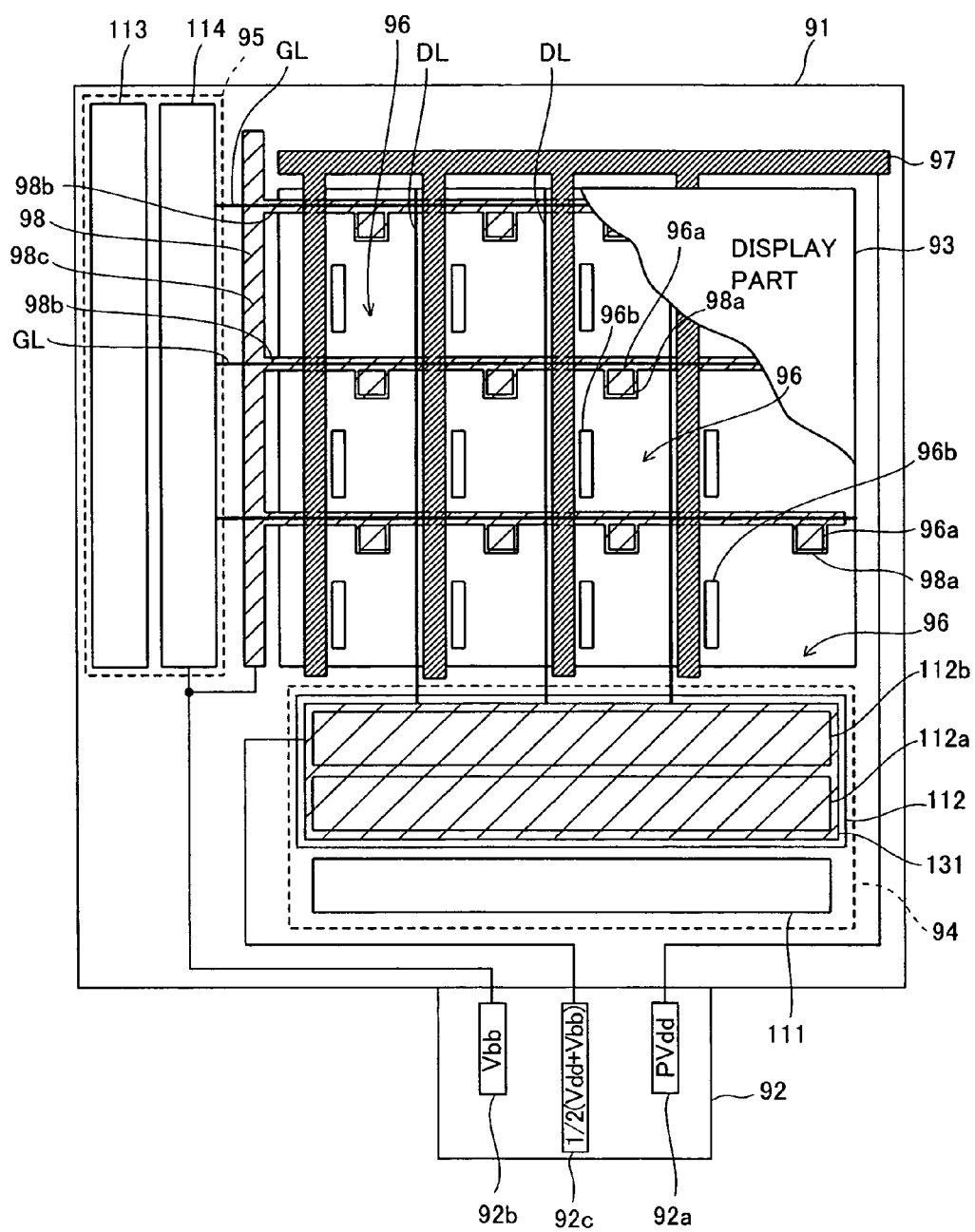
FIG. 43 is a plan view showing the overall structure of an organic EL display according to a tenth embodiment of the present invention.

Referring to FIG. 43, an organic EL display according to a tenth embodiment of the present invention is provided with only n-channel transistor shielding films covering lower portions of n-channel transistors serving as switching elements without shielding films covering lower portions of p-channel transistors in pixel parts, dissimilarly to the ninth embodiment shown in FIG. 40.

According to the tenth embodiment, n-channel transistor shielding films 98 are provided to cover lower portions of regions 96*a* (n-channel transistors 101 serving as switching elements similar to those shown in FIG. 41) of pixel parts 96 as shown in FIG. 43, similarly to the ninth embodiment shown in FIG. 40. On the other hand, the organic EL display according to the tenth embodiment is provided with no p-channel transistor shielding films covering lower portions of regions 96*b* (p-channel transistors 106 similar to those shown in FIG. 41) of the pixel parts 96, dissimilarly to the ninth embodiment shown in FIG. 40. The regions 96*a* are examples of the "first region" or the "first circuit part" in the present invention, and the n-channel transistors 101 are examples of the "first transistor" in the present invention. The n-channel transistor shielding films 98 are examples of the "first shielding film" or the "pixel part shielding film" in the present invention.

According to the tenth embodiment, an analog switch shielding film 131 is provided to cover lower portions of regions 112*a* and 112*b* (n- and p-channel transistors 121 and 122 similar to those shown in FIG. 43) of an analog switch 112. The regions 112*a* and 112*b* are examples of the "second region", the "second circuit part" or the "peripheral circuit part" in the present invention, and the n-channel transistor 121 and the p-channel transistor 122 are examples of the "second transistor" in the present invention. The analog switch shielding film 131 is an example of the "second shielding film" or the "peripheral circuit part shielding film" in the present invention.

According to the tenth embodiment, an external circuit part 92 is further provided with a potential generation circuit part 92*c* for generating an intermediate potential (½(Vdd+Vbb)) between positive and negative potentials Vdd and Vbb, in addition to potential generation circuit parts 92*a* and 92*b*. The aforementioned analog switch shielding film 131 is connected to the potential generation circuit part 92*c*. Thus, the organic EL display supplies the intermediate potential (½(Vdd+Vbb)) between the positive and negative potentials Vdd and Vbb to the analog switch shielding film 131.

The remaining structure of the tenth embodiment is similar to that of the aforementioned ninth embodiment.

Operations of the organic EL display according to the tenth embodiment are now described with reference to FIGS. 41 to 43. In the n-channel transistor 101 (see FIG. 41) of each pixel part 96, voltages Vgate, Vch, Vsig, Vgc and Vgd change similarly to those in the fourth embodiment shown in FIGS. 19 and 20. In the p-channel transistor 106 (see FIG. 41) of each pixel part 96, voltages Vgate(Pch), Vch(Pch), Vd(Pch), Vgc(Pch) and Vgd(Pch) also change similarly to those in the fourth embodiment shown in FIGS. 24 and 25.

According to the tenth embodiment, the organic EL display applies a fixed potential Vbb (about −2 V) to the n-channel transistor shielding film 98 (see FIG. 43) provided under each n-channel transistor 101, thereby fixing the potential Vback of the n-channel transistor shielding film 98 to Vbb (about −2 V). The potential Vch of a channel region 101*d* of the n-channel transistor 101 changes in the range of about 3.5 V to about 6.5 V.

Therefore, the effective voltage (potential difference) Vbc=⅓(Vback−Vch) between a shielding portion 98*a* of the n-channel transistor shielding film 98 and the channel region 101*d* of the n-channel transistor 101 changes in the range of about −1.8 V to about −2.8 V. Thus, the effective voltage Vbc (about −1.8 V to about −2.8 V) between the shielding portion 98*a* of the n-channel transistor shielding film 98 and the channel region 101*d* of the n-channel transistor 101 is regularly at a level (not more than about 0.5 V) in the OFF-region of the n-channel transistor 101. Consequently, the organic EL display inhibits a lower channel of the n-channel transistor 101 from entering an ON-state while holding an upper channel of the n-channel transistor 101 in an OFF-state. Thus, the organic EL display inhibits current from flowing between the drain region 101*b* and a source region 101*c* through the lower channel of the n-channel transistor 101 in this period.

According to the tenth embodiment, the organic EL display supplies the intermediate potential (½(Vdd+Vbb)≈3.0 V) between the positive and negative potentials Vdd and Vbb (about 7.5 V and about −2 V) to the analog switch shielding film 131 (see FIG. 43) provided under the n-channel transistor 121 and the p-channel transistor 122 (see FIG. 42) of the analog switch 112. In other words, the organic EL display fixes the potential Vback of the analog switch shielding film 131 to about 3.0 V. The potentials of the channel regions of the n-channel transistor 121 and the p-channel transistor 122 of the analog switch 112 change in the range of about 3.5 V to about 6.5 V (signal potential Vsig of a video signal).

According to the tenth embodiment, therefore, the effective voltage (potential difference) Vbc=⅓(Vback−Vch) between the analog switch shielding film 131 and the channel region of the n-channel transistor 121 (p-channel transistor 122) changes in the range of about −1.2 V to about −0.2 V. Thus, the effective voltage Vbc (about −1.2 V to about −0.2 V) between the analog switch shielding film 131 and the channel region of the n-channel transistor 121 is regularly at a level (not more than about 0.5 V) in the OFF-region of the n-channel transistor 121. Further, the effective voltage Vbc(Pch) (about −1.2 V to about −0.2 V) between the analog switch shielding film 131 and the channel region of the p-channel transistor 122 is regularly at a level (at least about −2 V) in the OFF-region of the p-channel transistor 122. Consequently, the organic EL display inhibits a lower channel of the n-channel transistor 121 (p-channel transistor 122) from entering an ON-state while holding an upper channel of the n-channel transistor 121 (p-channel transistor 122) in an OFF-state. Thus, the organic EL display inhibits current from flowing between the drain region and the source region through the lower channel of the n-channel transistor 121 (p-channel transistor 122) in this period.

According to the tenth embodiment, as hereinabove described, the organic EL display can fix the n-channel transistor shielding film 98 and the analog switch shielding film 131 to the potentials Vbb and ½(Vdd+Vbb) respectively by supplying the potentials Vbb and ½(Vdd+Vbb) to the n-channel transistor shielding film 98 and the analog switch shielding film 131 corresponding to the n-channel transistor 101 of each pixel part 96 and the analog switch 112 respectively. Thus, the organic EL display can inhibit the threshold voltages Vth of the n-channel transistor 101 of the pixel part 96 and the n-channel transistor 121 and the p-channel transistor 122 of the analog switch 112 from fluctuation following potential fluctuation in the n-channel transistor shielding film 98 and the analog switch shielding film 131 respectively. Thus, the organic EL display can stabilize operations of the n-channel transistor 101 of the pixel part 96 and the n-channel transistor 121 and the p-channel transistor 122 of the analog switch 112 respectively.

According to the tenth embodiment, as hereinabove described, the organic EL display can prevent the effective voltages Vbc between the channel region 101d of the n-channel transistor 101 of the pixel part 96 and the n-channel transistor shielding film 98 and between the channel region of the n-channel transistor 121 (p-channel transistor 122) of the analog switch 112 and the analog switch shielding film 131 from exceeding the threshold voltages Vth of the n-channel transistor 101 and the n-channel transistor 121 (p-channel transistor 122) respectively by supplying the potentials Vbb and ½(Vdd+Vbb) to the n-channel transistor shielding film 98 corresponding to the n-channel transistor 101 of each pixel part 96 and the analog switch shielding film 131 corresponding to the analog switch 112 respectively. Therefore, the organic EL display can inhibit the n-channel transistor 101 of the pixel part 96 and the n-channel transistor 121 (p-channel transistor 122) of the analog switch 112 from entering ON-states when supplying the potentials Vbb and ½(Vdd+Vbb) to the n-channel transistor shielding film 98 and the analog switch shielding film 131 respectively. Thus, the organic EL display can suppress occurrence of such inconvenience that operations thereof are destabilized due to turn-on of the n-channel transistors 101 and 121 (p-channel transistor 122) due to potentials supplied to the n-channel transistor shielding film 98 and the analog switch shielding film 131 when holding the n-channel transistor 101 of the pixel part 96 and the n-channel transistor 121 (p-channel transistor 122) of the analog switch 112 in OFF-states.

According to the tenth embodiment, as hereinabove described, the organic EL display is provided with only the n-channel transistor shielding films 98 covering the lower portions of the n-channel transistors 101 serving as switching elements in the pixel parts 96 without shielding films covering lower portions of the p-channel transistors 106, thereby suppressing complication in arrangement of wires for supplying the potential to the n-channel transistor shielding films 98. The n-channel transistors 101 serving as switching elements control supply of video signals to the pixel parts 96, whereby the organic EL display can suppress occurrence of such inconvenience that the signal potential Vsig of the video signal supplied to any pixel part 96 changes due to occurrence of leakage current resulting from photoirradiation by arranging the n-channel transistor shielding films 98 under the n-channel transistors 101 serving as switching elements. If the n-channel transistor shielding films 98 reflect a laser beam employed for crystallizing crystalline silicon layers for forming the crystalline silicon layers (active layers) of the n-channel transistors 101 serving as switching elements to disperse crystallinity of the crystalline silicon layers, the organic EL display can suppress dispersion of the characteristics of the n-channel transistors 101 serving as switching elements, hardly depending on the crystallinity of the crystalline silicon layers (active layers). Therefore, the organic EL display can suppress display of images in a gradation other than that responsive to the signal potential Vsig of the video signals while suppressing complication in arrangement of the wires for supplying the potential to the n-channel transistor shielding films 98 by arranging the n-channel transistor shielding films 98 to cover only the lower portions of the n-channel transistors 101 serving as switching elements.

According to the tenth embodiment, as hereinabove described, the organic EL display can prevent the effective voltages Vbc between the channel regions of the n-channel transistor 121 and the p-channel transistor 122 of the analog switch 122 and the analog switch shielding film 131 from exceeding the threshold voltages Vth of the n-channel transistor 121 and the p-channel transistor 122 despite the n-channel transistor 121 and the p-channel transistor 122 both included in the analog switch 112 by supplying the intermediate potential (½(Vdd+Vbb)) between the positive and negative potentials Vdd and Vbb to the analog switch shielding film 131.

According to the tenth embodiment, as hereinabove described, the potential generation circuit part 92c for generating the intermediate potential (½(Vdd+Vbb)) between the positive and negative potentials Vdd and Vbb is so provided on the external circuit part 92 that the organic EL display can easily supply the intermediate potential (½(Vdd+Vbb)) between the positive and negative potentials Vdd and Vbb to the analog switch shielding film 131.

The remaining effects of the tenth embodiment are similar to those of the aforementioned ninth embodiment.

Eleventh Embodiment

Figure 44:
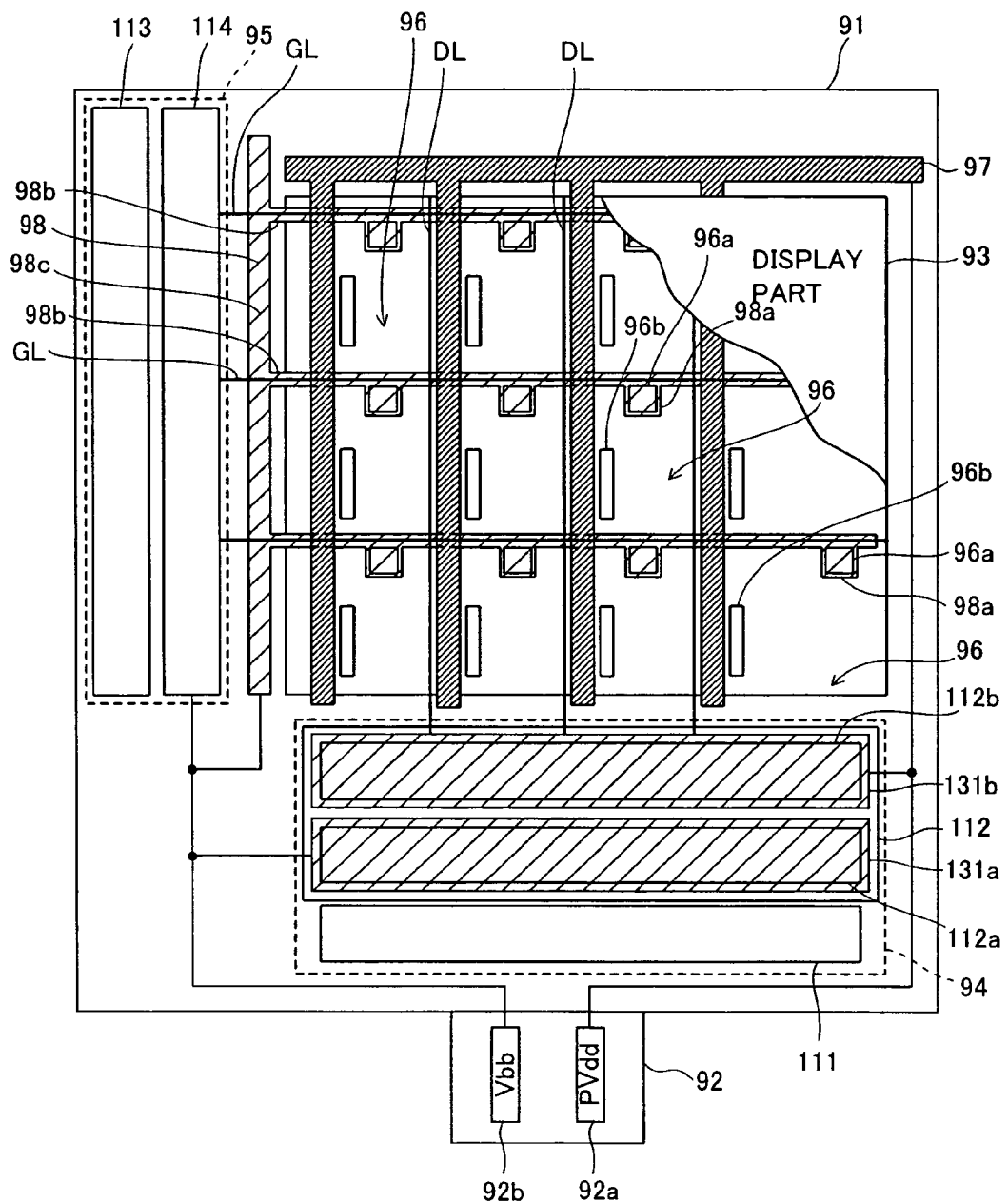
FIG. 44 is a plan view showing the overall structure of an organic EL display according to an eleventh embodiment of the present invention.

Referring to FIG. 44, an organic EL display according to an eleventh embodiment of the present invention is provided with two analog switch shielding films 131a and 131b in a structure similar to that according to the tenth embodiment shown in FIG. 43. More specifically, the analog switch shielding film 131a is provided on a region 112a where an n-channel transistor 121 (see FIG. 42) of an analog switch 112 is arranged, to cover a lower portion of the n-channel transistor 121 of the analog switch 112. This analog switch shielding film 131a is connected to a potential generation circuit part 92b of an external circuit part 92 for generating a potential Vbb (about −2 V). Thus, the organic EL display supplies the fixed potential Vbb (about −2 V) to the analog switch shielding film 131a from the potential generation circuit part 92b of the external circuit part 92. The region 112a is an example of the "first region" or the "first peripheral circuit part" in the present invention, and the analog switch shielding film 131a is an example of the "first shielding film" in the present invention. The n-channel transistor 121 is an example of the "first transistor" in the present invention.

On the other hand, the analog switch shielding film 131b is provided on a region 112b where a p-channel transistor 122 (see FIG. 42) of the analog switch 112 is arranged, to cover a lower portion of the p-channel transistor 122 of the analog switch 112. This analog switch shielding film 131b is connected to another potential generation circuit part 92a of the external circuit part 92 for generating a potential PVdd (about 8 V). Thus, the organic EL display supplies the fixed potential PVdd (about 8 V) to the analog switch shielding film 131b from the potential generation circuit part 92a of the external circuit part 92. The region 112b is an example of the "second region" or the "second peripheral circuit part" in the present invention, and the analog switch shielding film 131b is an example of the "second shielding film" in the present invention. The p-channel transistor 122 is an example of the "second transistor" in the present invention.

According to the eleventh embodiment, the organic EL display is provided with no shielding films covering lower portions of p-channel transistors 106 (see FIG. 41) located on regions 96b in pixel parts 96, but with only n-channel transistor shielding films 98 covering lower portions of n-channel transistors 101 (see FIG. 41) located on regions 96a for serving as switching elements. The regions 96a are examples of the "first region" in the present invention, and the n-channel transistor shielding films 98 are examples of the "first shielding film" in the present invention. The n-channel transistors 101 are examples of the "first transistor" in the present invention.

The remaining structure of the eleventh embodiment is similar to that of the aforementioned ninth embodiment.

Operations of the organic EL display according to the eleventh embodiment are now described with reference to FIGS. 41, 42 and 44. In the n-channel transistor 101 (see FIG. 41) of each pixel part 96, voltages Vgate, Vch, Vsig, Vgc and Vgd change similarly to those in the fourth embodiment shown in FIGS. 19 and 20. In the p-channel transistor 106 (see FIG. 41) of each pixel part 96, voltages Vgate(Pch), Vch (Pch), Vd(Pch), Vgc(Pch) and Vgd(Pch) also change similarly to those in the fourth embodiment shown in FIGS. 24 and 25.

According to the eleventh embodiment, the organic EL display supplies the fixed potential Vbb (about −2 V) to the n-channel transistor shielding film 98 (see FIG. 44) provided under each n-channel transistor 101, thereby fixing the potential Vback of the n-channel transistor shielding film 98 to Vbb (about −2 V). The potential Vch of a channel region 101d of the n-channel transistor 101 changes in the range of about 3.5 V to about 6.5 V.

Therefore, the effective voltage (potential difference) Vbc=⅓(Vback−Vch) between a shielding portion 98a of the n-channel transistor shielding film 98 and the channel region 101d of the n-channel transistor 101 changes in the range of about −1.8 V to about −2.8 V. Thus, the effective voltage Vbc (about −1.8 V to about −2.8 V) between the shielding portion 98a of the n-channel transistor shielding film 98 and the channel region 101d of the n-channel transistor 101 is regularly at a level (not more than about 0.5 V) in the OFF-region of the n-channel transistor 101. Consequently, the organic EL display inhibits a lower channel of the n-channel transistor 101 from entering an ON-state while holding an upper channel of the n-channel transistor 101 in an OFF-state. Thus, the organic EL display inhibits current from flowing between a drain region 101b and a source region 101c through the lower channel of the n-channel transistor 101 in this period.

According to the eleventh embodiment, the organic EL display supplies the potential Vbb (about −2 V) to the analog switch shielding film 131a provided under the n-channel transistor 121 (see FIG. 42) of the analog switch 112. Therefore, the organic EL display fixes the potential Vback of the analog switch shielding film 131a to about −2.0 V. Further, the organic EL display supplies the potential PVdd (about 8 V) to the analog switch shielding film 131b provided under the p-channel transistor 122 (see FIG. 42) of the analog switch 112. Therefore, the organic EL display fixes the potential Vback(Pch) of the analog switch shielding film 131b to about 8 V. The potentials of the channel regions of the n-channel transistor 121 and the p-channel transistor 122 of the analog switch 112 change in the range of about 3.5 V to about 6.5 V (signal potential Vsig of a video signal).

According to the eleventh embodiment, therefore, the effective voltage (potential difference) Vbc=⅓(Vback−Vch) between the analog switch shielding film 131a and the channel region of the n-channel transistor 121 changes in the range of about −2.8 V to about −1.8 V. Thus, the effective voltage Vbc (about −2.8 V to about −1.8 V) between the analog switch shielding film 131a and the channel region of the n-channel transistor 121 is regularly at a level (not more than about 0.5 V) in the OFF-region of the n-channel transistor 121. The effective voltage (potential difference) Vbc(Pch)=⅓(Vback (Pch)−Vch(Pch)) between the analog switch shielding film 131b and the channel region of the p-channel transistor 122 changes in the range of about 0.5 V to about 1.5 V. Thus, the effective voltage Vbc(Pch) (about 0.5 V to about 1.5 V) between the analog switch shielding film 131b and the channel region of the p-channel transistor 122 is regularly at a level (at least about −2 V) in the OFF-region of the p-channel transistor 122. Consequently, the organic EL display inhibits lower channels of the n-channel transistor 121 and the p-channel transistor 122 from entering ON-states while holding upper channels of the n-channel transistor 121 and the p-channel transistor 122 in OFF-states respectively. Thus, the organic EL display inhibits current from flowing between drain regions and source regions through the lower channels of the n-channel transistor 121 and the p-channel transistor 122 in this period.

According to the eleventh embodiment, as hereinabove described, the organic EL display can fix the n-channel transistor shielding film 98 and the analog switch shielding film 131a to the potential Vbb while fixing the analog switch shielding film 131b to the potential PVdd by supplying the potential Vbb to the n-channel transistor shielding film 98 corresponding to the n-channel transistor 101 of each pixel part 96 and the analog switch shielding film 131a corresponding to the n-channel transistor 121 of the analog switch 112 while supplying the potential PVdd to the analog switch shielding film 131b corresponding to the p-channel transistor 122 of the analog switch 112. Thus, the organic EL display can inhibit the threshold voltages Vth of the n-channel transistor 101 of the pixel part 96 as well as the n-channel transistor 121 and the p-channel transistor 122 of the analog switch 112 from fluctuation following potential fluctuation in the n-channel transistor shielding film 98 and the analog switch shielding films 131a and 131b. Therefore, the organic EL display can stabilize operations of the n-channel transistor 101 of the pixel part 96 and the n-channel transistor 121 and the p-channel transistor 122 of the analog switch 112 respectively.

According to the eleventh embodiment, as hereinabove described, the organic EL display can prevent the effective voltages Vbc between the channel region 101d of the n-channel transistor 101 of the pixel part 96 and the n-channel transistor shielding film 98 and between the channel region of the n-channel transistor 121 (p-channel transistor 122) of the analog switch 112 and the analog switch shielding film 131a (analog switch shielding film 131b) from exceeding the threshold voltages Vth of the n-channel transistor 101 and the n-channel transistor 121 (p-channel transistor 122) respectively by supplying the potentials Vbb and PVdd to the n-channel transistor shielding film 98 corresponding to the n-channel transistor 101 of the pixel part 96 and the analog switch shielding film 131 corresponding to the n-channel transistor 121 of the analog switch 112 and to the analog switch shielding film 131b corresponding to the p-channel transistor 122 of the analog switch 112 respectively. Therefore, the organic EL display can inhibit the n-channel transistor 101 of the pixel part 96 and the n-channel transistor 121 (p-channel transistor 122) of the analog switch 112 from entering ON-states when supplying the potentials Vbb and PVdd to the n-channel transistor shielding film 98 and the analog switch shielding film 131a and to the analog switch shielding film 131b respectively. Thus, the organic EL display can suppress occurrence of such inconvenience that operations thereof are destabilized due to turn-on of the n-channel transistor 101 and the n-channel transistor 121 (p-channel transistor 122) resulting from potentials supplied to the n-channel transistor shielding film 98 and the analog switch shielding film 131a (analog switch shielding film 131b) while holding the n-channel transistor 101 of the pixel part 96 and the n-channel transistor 121 (p-channel transistor 122) of the analog switch 112 in OFF-states.

According to the eleventh embodiment, as hereinabove described, the organic EL display, provided with the analog switch shielding films 131a and 131b arranged under the analog switch 112 in correspondence to the n-channel transistor 121 and the p-channel transistor 122 respectively for supplying the potentials Vbb and PVdd to the analog switch shielding films 131a and 131b respectively, can further reduce the effective voltage Vbc between the channel region of the n-channel transistor 121 and the analog switch shielding film 131a with respect to the threshold voltage Vth of the n-channel transistor 121. Further, the organic EL display can more increase the effective voltage Vbc(Pch) between the channel region of the p-channel transistor 122 and the analog switch shielding film 131b with respect to the threshold voltage Vth of the p-channel transistor 122. Thus, the organic EL display can improve OFF-characteristics of the n-channel transistor 121 and the p-channel transistor 122 of the analog switch 112. In this case, the organic EL display may not generate an intermediate potential (½(Vdd+Vbb)) between the positive and negative potentials Vdd and Vbb, whereby the circuit structure of the external circuit part 92 can be simplified.

The remaining effects of the eleventh embodiment are similar to those of the aforementioned ninth and tenth embodiments.

Twelfth Embodiment

Figure 45:
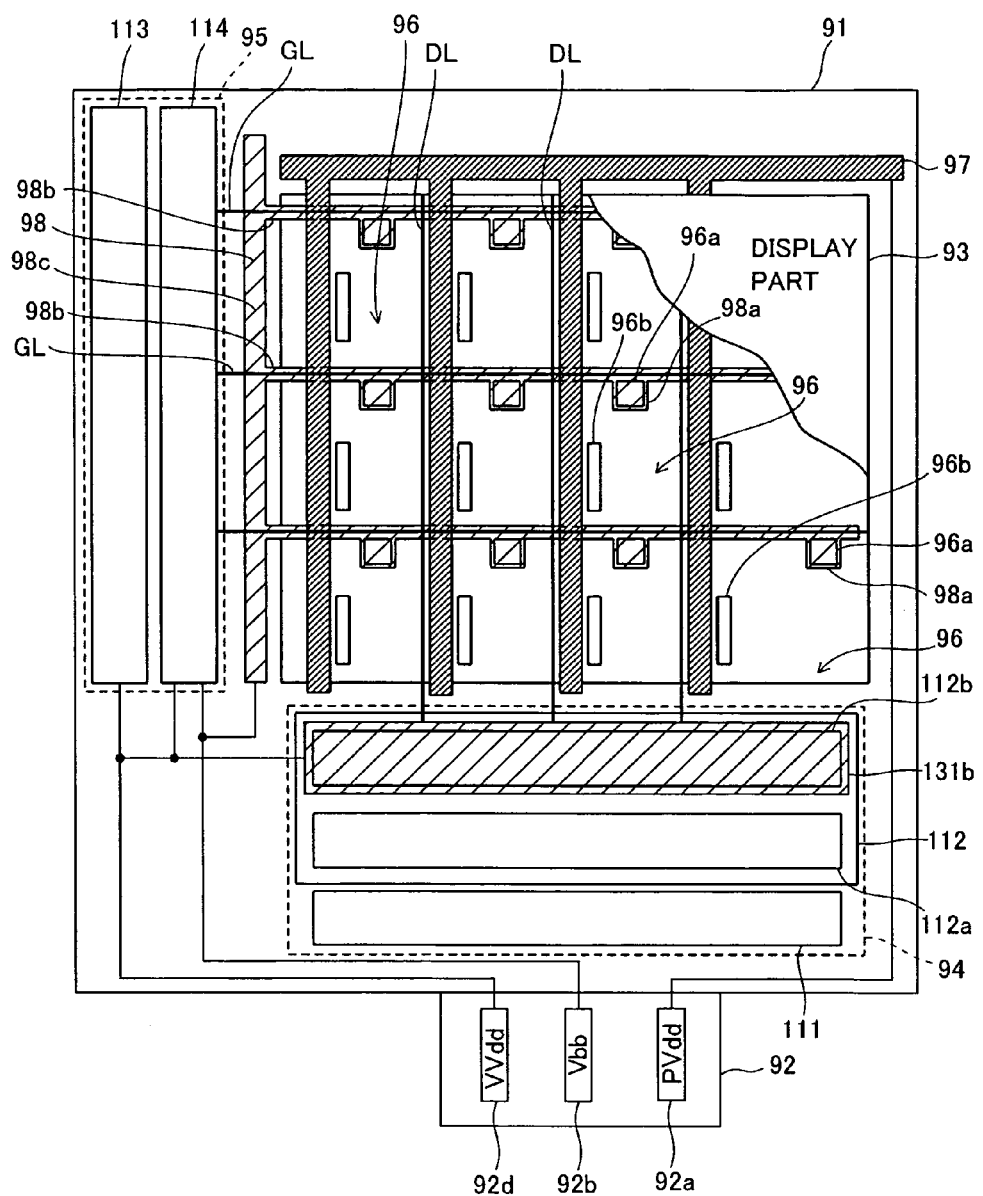
FIG. 45 is a plan view showing the overall structure of an organic EL display according to a twelfth embodiment of the present invention.

Referring to FIG. 45, an organic EL display according to a twelfth embodiment of the present invention is provided with no shielding film covering a lower portion of an n-channel transistor 121 (see FIG. 42) located on a region 112a, but with only an analog switch shielding film 131b covering a lower portion of a p-channel transistor 122 (see FIG. 42) located on a region 112b on a region corresponding to an analog switch 112. A potential generation circuit part 92d for generating a positive potential VVdd supplied to a V driver 95 is connected to the analog switch shielding film 131b. The remaining structure of the twelfth embodiment is similar to that of the aforementioned eleventh embodiment.

According to the twelfth embodiment, as hereinabove described, the organic EL display provided with only the analog switch shielding film 131b covering the lower portion of the p-channel transistor 122 without a shielding film covering the lower portion of the n-channel transistor 122 on the region corresponding to the analog switch 112 can suppress complication in arrangement of a wire for supplying a potential to the analog switch shielding film 131b. In general, the n-channel transistor 121 having large carrier mobility than the p-channel transistor 122 is formed to have a smaller gate width than the p-channel transistor 122. Thus, the n-channel transistor 121 hardly causes a malfunction resulting from incidence of light upon its active layer due to the small gate width thereof. Therefore, operations of the analog switch 112 are hardly destabilized also when no shielding film is arranged under the n-channel transistor 121. When arranging the analog switch shielding film 131b to cover only the lower portion of the p-channel transistor 122 of the analog switch 112, therefore, the organic EL display can suppress instable operations of the analog switch 112 while suppressing complication in arrangement of the wire for supplying the potential to the analog switch shielding film 131b.

The remaining effects of the twelfth embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

While each of the aforementioned embodiments has been described with reference to a liquid crystal display or an organic EL display employed as an exemplary display, for example, the present invention is not restricted to this but is also applicable to a display other than the liquid crystal display and the organic EL display. For example, the present invention can also be applied to a surface-conduction electron-emitter display (SED) or the like.

While the crystalline silicon film constituting the TFT is subjected to channel doping in the aforementioned embodiments, the present invention is not restricted to this but the crystalline silicon film 17 may not be subjected to channel doping.

While both of crystalline silicon films constituting n- and p-channel transistors employed for the organic EL display are subjected to channel doping in the aforementioned fourth to seventh and ninth to twelfth embodiments, the present invention is not restricted to this but only the crystalline silicon film constituting either the n-channel transistor or the p-channel transistor may alternatively be subjected to channel doping. In this case, the organic EL display may control the threshold voltage Vth of the n-channel transistor or the p-channel transistor by the aforementioned channel doping with allowance for dispersion of the threshold voltages Vth of the n-channel transistor and the p-channel transistor so that no leakage current flows when applying various potentials to shielding films.

While the present invention is applied to a bottom emission type organic EL display displaying images by emitting light downward through a glass substrate arranged under a display panel in each of the aforementioned fourth to seventh and ninth to twelfth embodiments, the present invention is not restricted to this but is also applicable to a top emission type organic EL display emitting light toward a gate electrode.

While the crystalline silicon film 17 entirely constituted of transversely grown column crystal silicon (pseudo-single crystals) is formed by applying an infrared laser beam and heating the overall surface of the amorphous silicon film formed on the substrate under a uniform irradiation condition in the aforementioned embodiments, the present invention is not restricted to this but a crystalline silicon film of polysilicon having small crystal grains may be formed on a pixel part while forming another crystalline silicon film of transversely grown column crystal silicon on a region other than the pixel part by adjusting infrared laser beam irradiation conditions. Thus, uniformity of performance of transistors provided on the pixel part is improved while high-performance transistors can be formed on a peripheral circuit part.

While the level conversion circuit 36 is provided in the V driver 5 in each of the aforementioned embodiments, the present invention is not restricted to this but no level conversion circuit may be provided in the V driver 5.

While the crystalline silicon film is formed by applying the infrared laser beam to the amorphous silicon film for serving as the active layer of the transistor in the aforementioned embodiments, the present invention is not restricted to this but the crystalline silicon film 17 may alternatively be formed by applying an ultraviolet laser beam such as an excimer laser beam to the amorphous silicon film, for serving as the active layer of the transistor 8.

While the drain regions of the n-channel transistors of the pixel parts and the corresponding pixel part shielding regions of the display part shielding film are connected with each other in each of the aforementioned third and sixth embodiments, the present invention is not restricted to this but the source regions of the n-channel transistors of the pixel parts may alternatively be connected with the corresponding pixel part shielding regions of the display part shielding film.

While the threshold voltage Vth of the n-channel transistors can be adjusted with the variable resistor in each of the aforementioned first to seventh embodiments, the present invention is not restricted to this but the threshold voltage Vth of the n-channel transistors may alternatively be adjusted by means other than the variable resistor.

While the variable resistor is provided in the external circuit part in each of the aforementioned first to seventh embodiments, the present invention is not restricted to this but the variable resistor may alternatively be provided in the display panel. Further, the number of the variable resistor is not restricted to one but a plurality of variable resistors may alternatively be set.

While the drain regions of the n-channel transistors of all pixel parts are connected with the corresponding pixel part shielding regions of the display part shielding film in each of the aforementioned third and sixth embodiments, the present invention is not restricted to this but the drain regions of the n-channel transistors of partial pixel parts may alternatively be connected with the corresponding pixel part shielding regions of the display part shielding film while the liquid crystal display or the organic EL display may supply the potential ½(Vdd+Vbb) to the pixel part shielding regions of the display part shielding film corresponding to the n-channel transistors of the remaining pixel parts.

While the liquid crystal display applies the high- and low-level potentials Vdd and Vbb to the CMOS circuit in the aforementioned eighth embodiment, the present invention is not restricted to this but the liquid crystal display may alternatively apply high- and low-level potentials Vdd and Vss to the CMOS circuit. Further, the liquid crystal display according to the eighth embodiment may adjust the potential applied to the shielding film with the variable resistor 41 according to the first embodiment shown in FIG. 1.

While the liquid crystal display applies the fixed potential ½(Vdd+Vbb) to the shielding film corresponding to the CMOS circuit included in the peripheral circuit part in the aforementioned eighth embodiment, the present invention is not restricted to this but the liquid crystal display may alternatively adjust the potential applied to the shielding film with the variable resistor 41 according to the first embodiment shown in FIG. 1 or the like. According to this structure, the liquid crystal display can adjust the threshold voltages of the n-channel transistor and the p-channel transistor constituting the CMOS circuit. Thus, the liquid crystal display can adjust the effective voltages Vbc between the shielding film and the n-channel transistor and the p-channel transistor of the CMOS circuit in the voltage ranges of the OFF-regions of the n-channel transistor and the p-channel transistor respectively also when the effective voltages Vbc between the shielding film and the n-channel transistor and the p-channel transistor of the CMOS circuit are out of the voltage ranges of the OFF-regions of the n-channel transistor and the p-channel transistor respectively.

While Vbb is set to about −2 V in each of the aforementioned ninth to twelfth embodiments, the present invention is not restricted to this but Vbb may alternatively be set to about 0 V. When Vbb is set to about 0 V, the potential Vback supplied to the analog switch shielding film 131 provided under the n-channel transistor 121 and the p-channel transistor 122 of the analog switch 112 is ½(VDD+Vbb)=½(7.5−0)=3.75 V in the structure according to the tenth embodiment (see FIG. 43), for example. Thus, the effective voltage (potential difference) Vbc=⅓(Vback−Vch) between the analog switch shielding film 131 and the channel region of the n-channel transistor 121 (p-channel transistor 122) changes in the range of about −0.917 V to about 0.083 V. Vch≈3.5 V to 6.5 V. In other words, the effective voltage Vbc between the analog switch shielding film 131 and the channel region of the n-channel transistor 121 is regularly at a level (not more than about 0.5 V) in the OFF-region of the n-channel transistor 121, while the effective voltage Vbc(Pch) between the analog switch shielding film 131 and the channel region of the p-channel transistor 122 is regularly at a level (at least about −2 V) in the OFF-region of the p-channel transistor 122. Thus, no potential generation circuit part may be provided for generating the potential Vbb (about −2 V) when Vbb is set to about 0 V, whereby the structure of the external circuit part can be simplified.

While the n-channel transistors are employed as switching transistors and the p-channel transistors are employed as drive transistors in the aforementioned ninth to twelfth embodiments, the present invention is not restricted to this but p-channel transistors and n-channel transistors may alternatively be employed as switching transistors and drive transistors respectively.

While the organic EL display applies the same potential PVdd as that supplied to the drain region of the p-channel transistor of the pixel part to the analog switch shielding film corresponding to the p-channel transistor of the analog switch in the aforementioned eleventh embodiment, the present invention is not restricted to this but the organic EL display may alternatively apply the same positive potential supplied to the H driver or the V driver to the analog switch shielding film corresponding to the p-channel transistor of the analog switch. When applying the same positive potential supplied to the H driver to the analog switch shielding film corresponding to the p-channel transistor of the analog switch, the organic EL display can suppress complication in arrangement of a wire for supplying the potential to the analog switch shielding film arranged under the H driver (analog switch). When applying the same positive potential supplied to the V driver to the analog switch shielding film corresponding to the p-channel transistor of the analog switch, the organic EL display can suppress destabilization of the applied potential due to the operation of the V driver at a speed lower than the operating speed of the H driver.

While the organic EL display applies the same potential VVdd as that supplied to the V driver to the analog switch shielding film in the twelfth embodiment, the present invention is not restricted to this but the organic EL display may alternatively supply the same potential PVdd as that supplied to the drain region of the p-channel transistor of the pixel part or the same positive potential as that supplied to the H driver.

What is claimed is:

1. A display comprising:
a first region having a prescribed function and including a first transistor;
a first shielding film provided on said first region, arranged on a region corresponding to said first transistor and supplied with a first potential;
a second region having a prescribed function and including a second transistor; and
a second shielding film provided on said second region, arranged on a region corresponding to said second transistor and supplied with a second potential, wherein
said first region including said first transistor includes a first circuit part having said prescribed function,
said second region including said second transistor includes a second circuit part having said prescribed function,
said first circuit part includes a pixel part having said first transistor,
said second circuit part includes a peripheral circuit part, provided around a display part including said pixel part, having said second transistor,
said first shielding film includes a pixel part shielding film arranged under said first transistor included in said pixel part,
said second shielding film includes a peripheral circuit part shielding film arranged under said second transistor included in said peripheral circuit part, and
said first potential supplied to said pixel part shielding film is identical to a potential applied to the gate electrode of corresponding said first transistor.

2. The display according to claim 1, wherein
said pixel part shielding film is electrically connected to the gate electrode of said first transistor.

3. A display comprising:
a first region having a prescribed function and including a first transistor;
a first shielding film provided on said first region, arranged on a region corresponding to said first transistor and supplied with a first potential;
a second region having a prescribed function and including a second transistor; and
a second shielding film provided on said second region, arranged on a region corresponding to said second transistor and supplied with a second potential, wherein
said first region including said first transistor includes a first circuit part having said prescribed function,
said second region including said second transistor includes a second circuit part having said prescribed function,
said first circuit part includes a pixel part having said first transistor,
said second circuit part includes a peripheral circuit part, provided around a display part including said pixel part, having said second transistor,
said first shielding film includes a pixel part shielding film arranged under said first transistor included in said pixel part,
said second shielding film includes a peripheral circuit part shielding film arranged under said second transistor included in said peripheral circuit part, and
said first potential supplied to said pixel part shielding film is identical to a potential applied to either the source region or the drain region of corresponding said first transistor.

4. The display according to claim 3, wherein
said pixel part shielding film is electrically connected to either the source region or the drain region of said first transistor.

5. A display comprising:
a first region having a prescribed function and including a first transistor;
a first shielding film provided on said first region, arranged on a region corresponding to said first transistor and supplied with a first potential;
a second region having a prescribed function and including a second transistor; and
a second shielding film provided on said second region, arranged on a region corresponding to said second transistor and supplied with a second potential, wherein
said first region including said first transistor includes a first circuit part having said prescribed function,
said second region including said second transistor includes a second circuit part having said prescribed function,
said first circuit part includes a pixel part having said first transistor,
said second circuit part includes a peripheral circuit part, provided around a display part including said pixel part, having said second transistor,
said first shielding film includes a pixel part shielding film arranged under said first transistor included in said pixel part,
said second shielding film includes a peripheral circuit part shielding film arranged under said second transistor included in said peripheral circuit part,
said pixel part includes a p-channel transistor, and
said first potential supplied to said pixel part shielding film arranged under said p-channel transistor of said pixel part is a positive potential applied to the drain region of said p-channel transistor.

6. A display comprising:
a first region having a prescribed function and including a first transistor;
a first shielding film provided on said first region, arranged on a region corresponding to said first transistor and supplied with a first potential;
a second region having a prescribed function and including a second transistor;
a second shielding film provided on said second region, arranged on a region corresponding to said second transistor and supplied with a second potential;
a first gate insulating film of said first transistor having a first thickness;

a first insulating film, provided between said first transistor and said first shielding film, having a second thickness of at least three times said first thickness of said first gate insulating film;

a second gate insulating film of said second transistor having a third thickness; and a second insulating film, provided between said second transistor and said second shielding film, having a fourth thickness of at least three times said third thickness of said second gate insulating film.

7. The display according to claim 6, wherein
said first gate insulating film and said first insulating film are made of the same material, and
said second gate insulating film and said second insulating film are made of the same material.

8. A display comprising:
a first region having a prescribed function and including a first transistor;
a first shielding film provided on said first region, arranged on a region corresponding to said first transistor and supplied with a first potential;
a second region having a prescribed function and including a second transistor; and
a second shielding film provided on said second region, arranged on a region corresponding to said second transistor and supplied with a second potential, wherein
said first potential is an intermediate potential between a positive potential and a negative potential supplied to the gate electrode of said first transistor, and
said second potential is an intermediate potential between a positive potential and a negative potential supplied to the gate electrode of said second transistor.

9. The display according to claim 8, further comprising a potential generation circuit part for generating said intermediate potentials between said positive potentials and said negative potentials.

10. The display according to claim 8, wherein
at least either said first region or said second region includes both of an n-channel transistor and a p-channel transistor.

11. A display comprising:
a first region having a prescribed function and including a first transistor;
a first shielding film provided on said first region, arranged on a region corresponding to said first transistor and supplied with a first potential;
a second region having a prescribed function and including a second transistor; and
a second shielding film provided on said second region, arranged on a region corresponding to said second transistor and supplied with a second potential, wherein
said first region includes a pixel part having said first transistor and a first peripheral circuit part having said first transistor,
said second region includes a second peripheral circuit part having said second transistor,
said first shielding film is arranged under said first transistor included in said pixel part and said first transistor included in said first peripheral circuit part, and
said second shielding film is arranged under said second transistor included in said second peripheral circuit part.

* * * * *